US008589282B1

(12) United States Patent
Jackson et al.

(10) Patent No.: US 8,589,282 B1
(45) Date of Patent: Nov. 19, 2013

(54) SYSTEM AND METHOD AND FOR VALUING LOANS AND SETTLEMENT OFFERS ASSOCIATED WITH SECURITY INTEREST ENFORCEMENT ACTIONS

(75) Inventors: Robert J. Jackson, Irvine, CA (US); Paul Jackson, Forth Worth, TX (US); Scott Jackson, Ladera Ranch, CA (US)

(73) Assignee: OneDemand.com, Inc., Irvine, CA (US)

( * ) Notice: Subject to any disclaimer, the term of this patent is extended or adjusted under 35 U.S.C. 154(b) by 1965 days.

(21) Appl. No.: 11/519,588

(22) Filed: Sep. 11, 2006

Related U.S. Application Data

(60) Provisional application No. 60/717,084, filed on Sep. 14, 2005, provisional application No. 60/765,539, filed on Feb. 6, 2006.

(51) Int. Cl.
| | |
|---|---|
| *G06Q 40/02* | (2012.01) |
| *G06Q 40/08* | (2012.01) |
| *G06Q 30/02* | (2012.01) |
| *G06Q 10/10* | (2012.01) |
| *G06Q 10/06* | (2012.01) |
| *G06Q 50/22* | (2012.01) |
| *G06K 19/00* | (2006.01) |
| *G06Q 40/00* | (2012.01) |

(52) U.S. Cl.
CPC ............... *G06Q 40/00* (2013.01); *G06Q 40/02* (2013.01); *G06Q 40/08* (2013.01); *G06Q 10/10* (2013.01); *G06Q 10/06* (2013.01); *G06Q 10/067* (2013.01); *G06Q 50/22* (2013.01); *G06K 19/00* (2013.01)
USPC ..................................... 705/38; 705/4; 705/35

(58) Field of Classification Search
CPC ....... G06Q 40/02; G06Q 40/08; G06Q 10/10; G06Q 10/06; G06Q 10/067; G06Q 30/02; G06Q 50/22; G06K 19/06196; G06K 19/07749
USPC .................................................. 705/4, 35, 38
See application file for complete search history.

(56) References Cited

U.S. PATENT DOCUMENTS

| | | |
|---|---|---|
| 5,182,705 A | 1/1993 | Barr et al. |
| 5,329,447 A | 7/1994 | Leedom et al. |

(Continued)

OTHER PUBLICATIONS

Charles Grinstead, Introduction to Probability, chapter 6, (revised edition 1997) American Mathematical Society, pp. 240-243,http://www.dartmouth.edu/~chance/teaching_aids/books_articles/probability_book/Chapter6.pdf.*

(Continued)

*Primary Examiner* — Ella Colbert
(74) *Attorney, Agent, or Firm* — Knobbe, Martens, Olson & Bear LLP

(57) ABSTRACT

A legal process management system facilitates simultaneous dynamic dialogs between legal process managers and networked attorneys and contractors providing services in connection with security interest enforcement actions. The legal process managers submit queries and deadlines selected to timely guide the attorneys and contractors through the requirements of the security interest enforcement actions. The attorneys and contractors submit responsive answers revealing the status of their enforcement actions. The legal process management system allows the monitored attorneys to share in the information provided by the monitored contractors. The legal process management system further includes mechanisms for reminding the attorneys and contractors about impending deadlines. The system also allows the attorneys and contractors to be assessed on their success in complying with the queries and deadlines submitted by the legal process managers. An events based management system is also disclosed to aid in the completion of an SIEA event. The events based management system follows and calculates completion times for an SIEA and its subparts by providing a flexible system for managing SIEA milestones and events. A reporting system is also provided for keeping track of event and milestone completion.

20 Claims, 57 Drawing Sheets

(56) References Cited

U.S. PATENT DOCUMENTS

| | | | |
|---|---|---|---|
| 5,381,332 | A | 1/1995 | Wood |
| 5,875,431 | A | 2/1999 | Heckman et al. |
| 5,956,687 | A | 9/1999 | Wamsley et al. |
| 5,991,745 | A * | 11/1999 | Kiritz .............................. 705/38 |
| 6,067,533 | A | 5/2000 | McCauley et al. |
| 6,119,097 | A | 9/2000 | Ibarra |
| 6,366,925 | B1 | 4/2002 | Meltzer et al. |
| 6,519,763 | B1 | 2/2003 | Kaufer et al. |
| 6,549,894 | B1 | 4/2003 | Simpson et al. |
| 6,643,625 | B1 | 11/2003 | Acosta et al. |
| 6,694,315 | B1 | 2/2004 | Grow |
| 6,810,383 | B1 | 10/2004 | Loveland |
| 7,107,072 | B1 | 9/2006 | Smith |
| 7,162,428 | B1 | 1/2007 | Rosenthal et al. |
| 7,197,716 | B2 | 3/2007 | Newell et al. |
| 8,055,529 | B1 | 11/2011 | Jackson et al. |
| 8,244,572 | B1 | 8/2012 | Jackson et al. |
| 8,335,739 | B1 * | 12/2012 | Bol et al. .......................... 705/38 |
| 2001/0041995 | A1 | 11/2001 | Eder |
| 2002/0002469 | A1 | 1/2002 | Hillstrom |
| 2002/0046144 | A1 | 4/2002 | Graff |
| 2002/0069079 | A1 | 6/2002 | Vega |
| 2002/0083092 | A1 | 6/2002 | Simpson |
| 2002/0103669 | A1 | 8/2002 | Sullivan et al. |
| 2003/0004866 | A1 * | 1/2003 | Huennekens et al. .......... 705/38 |
| 2003/0065669 | A1 | 4/2003 | Kahn et al. |
| 2004/0019496 | A1 | 1/2004 | Angle et al. |
| 2004/0044696 | A1 | 3/2004 | Frost |
| 2004/0243507 | A1 | 12/2004 | Deane et al. |
| 2005/0203814 | A1 | 9/2005 | Derry et al. |
| 2005/0262016 | A1 | 11/2005 | Hill et al. |
| 2006/0015449 | A1 | 1/2006 | Underwood et al. |
| 2007/0136194 | A1 * | 6/2007 | Sloan .............................. 705/41 |
| 2007/0282579 | A1 | 12/2007 | Dempster |
| 2008/0120129 | A1 | 5/2008 | Seubert et al. |
| 2008/0281649 | A1 | 11/2008 | Morris |

OTHER PUBLICATIONS

William Apgar, The Municipal Cost of Foreclosures, A Chicago Case Study, Feb. 27, 2005, Homeownership Foundation, pp. 1-56, http://www.995hope.org/content/pdf/Apgar_Duda_Study_Full_Version.pdf.*
LenStar product offering on www.mortgagemag.com (2 pages).
LenStar product description on www.lenstar.com/products.asp (3 pages).
Press Release "Technology Revolution Hits Legal Profession as Leading Providers of Legal Software and Services Form World's First Legal ASP." Dated Sep. 30, 1999, from www.elite.com (6 pages).
Press Release "Serengeti Law Releases Version 5.2 of Serengeti Tracker." Dated Dec. 16, 2002, from www.prweb.com (3 pages).
Web page "A Brief Introduction to Serengeti Tracker" from www.serengetilaw.com (1 page).
Harnett, Donald L. and Soni, Ashok K., "Statistical Methods for Business and Economics," Jun. 1991.
"SEC Enforcement—What Chief Legal Officers of SEC Reporting Companies Should be Focused on," Sep. 2004.
U.S. Appl. No. 10/614,419, including its ongoing prosecution history, filed Jul. 3, 2003, Jackson, et al.
U.S. Appl. No. 11/005,190, including its ongoing prosecution history, filed Dec. 6, 2004, Jackson, et al.
U.S. Appl. No. 11/519,486, including its ongoing prosecution history, filed Sep. 11, 2006, Jackson, et al.
U.S. Appl. No. 11/519,736, including its ongoing prosecution history, filed Sep. 11, 2006, Jackson, et al.
U.S. Appl. No. 11/519,705, including its ongoing prosecution history, filed Sep. 11, 2006, Jackson, et al.
U.S. Appl. No. 11/519,589, including its ongoing prosecution history, filed Sep. 11, 2006, Jackson, et al.
U.S. Appl. No. 11/519,422, including its ongoing prosecution history, filed Sep. 11, 2006, Jackson, et al.

Office Action issued to U.S. Appl. No. 10/614,419 dated Sep. 19, 2008.
Response to Office Action filed in U.S. Appl. No. 10/614,419 dated Dec. 8, 2008.
Response to Notice of Non-Compliant Amendment filed in U.S. Appl. No. 10/614,419 dated Mar. 2, 2009.
Office Action issued to U.S. Appl. No. 10/614,419 dated Jun. 26, 2009.
Response to Office Action filed in U.S. Appl. No. 10/614,419 dated Sep. 28, 2009.
Office Action issued to U.S. Appl. No. 10/614,419 dated Dec. 18, 2009.
Response to Office Action filed in U.S. Appl. No. 10/614,419 dated Apr. 16, 2010.
Office Action issued to U.S. Appl. No. 10/614,419 dated Jul. 21, 2010.
Response to Office Action filed in U.S. Appl. No. 10/614,419 dated Dec. 21, 2010.
Office Action issued to U.S. Appl. No. 11/005,190 dated Jun. 26, 2009.
Response to Office Acton filed in U.S. Appl. No. 11/005,190 dated Sep. 28, 2009.
Office Action issued to U.S. Appl. No. 11/005,190 dated Jan. 21, 2010.
Response to Office Action filed in U.S. Appl. No. 11/005,190 dated Apr. 20, 2010.
Office Action issued to U.S. Appl. No. 11/519,486 dated Aug. 10, 2010.
Response to Office Acton filed in U.S. Appl. No. 11/519,486 dated Nov. 10, 2010.
Office Action issued to U.S. Appl. No. 11/519,486 dated Dec. 30, 2010.
Response to Office Action filed in U.S. Appl. No. 11/519,486 dated Mar. 30, 2011.
Office Action issued to U.S. Appl. No. 11/519,736 dated Aug. 10, 2010.
Response to Office Acton filed in U.S. Appl. No. 11/519,736 dated Nov. 10, 2010.
Office Action issued to U.S. Appl. No. 11/519,736 dated Dec. 30, 2010.
Response to Office Acton filed in U.S. Appl. No. 11/519,736 dated Mar. 30, 2011.
Office Action issued to U.S. Appl. No. 11/519,705 dated Oct. 28, 2010.
Response to Office Action filed in U.S. Appl. No. 11/519,705 dated Apr. 27, 2011.
Office Action issued to U.S. Appl. No. 11/519,589 dated Aug. 28, 2009.
Response to Office Action filed in U.S. Appl. No. 11/519,589 dated Dec. 15, 2009.
Office Action issued to U.S. Appl. No. 11/519,589 dated Mar. 18, 2010.
Appeal Brief filed in U.S. Appl. No. 11/519,589 dated Aug. 18, 2010.
Examiner's Answer for U.S. Appl. No. 11/519,589 dated Nov. 15, 2010.
Reply Brief filed in U.S. Appl. No. 11/519,589 dated Jan. 14, 2011.
Office Action issued to U.S. Appl. No. 11/519,422 dated Sep. 4, 2009.
Response to Office Action filed in U.S. Appl. 11/519,422 dated Dec. 15, 2009.
Office Action issued to U.S. Appl. No. 11/519,422 dated Mar. 18, 2010.
Response to Office Action filed in U.S. Appl. No. 11/519,422 dated Jun. 18, 2010.
U.S. Department of Housing and Urband Development, Mortgagee Letter 2002-13, Jun. 7, 2002.
Eviction—the Unlawful Detainer Process, http://web.archive.org/web/20030208044537/http://www.caltenantlaw.com/Eviction.htm, Wayback Machine Feb. 8, 2003.
Tsiakis et al., "Trust and Security in Electronic Payments: What We Have and Need to Know?" Apr. 2005.
U.S. Appl. No. 13/572,254, including its prosecution history, filed Aug. 10, 2012, Jackson et al.

\* cited by examiner

OnDemand

| property management | users | reporting | | logged in as: test1 | JACKSON and Associates Inc. |
|---|---|---|---|---|---|
| | | | | | LOG OUT |

Welcome Pennant & Company!
|| Instructions || User Guide || Email the System Administrator ||

EVICTIONS: ACTIVE CASES

| J&A Number | Former Owner | Eviction Status |
|---|---|---|
| TESTCA001 | Tim Fish | eviction, start |
| TESTCA002 | Greg Anderson | problems |
| TESTCA003 | David Stad | eviction, jgmt obtained |

Records 1 to 3 of 3 see all active cases >>> see closed cases >>>

EVICTIONS: THIS WEEK'S SCHEDULE

| J&A Number | Former Owner | Update Needed |
|---|---|---|
| TESTCA001 | Tim Fish | Title docs received |
| TESTCA002 | Greg Anderson | Motion filed? |
| TESTCA003 | David Stad | Appeal filed? |

Records 1 to 3 of 3 see this weeks schedule >>>

FIG. 6A

OnDemand

*property management   users   reporting* logged in as: test1

JACKSON and Associates Inc.

LOG OUT

— 98

Property Search

Drew Brees

[Keyword] [Search]

EVICTIONS: OCCUPANCY STATUS NEEDED
<u>all active cases >>></u>

Records 1 to 2 of 2

| Loan Number (J&A Number) | Former Owner | Address | Update Occupancy Status |
|---|---|---|---|
| <u>12903784</u> (TESTCA001) | Tim Fish | 1 Channel Street Los Angeles, Ca. 92307 | <u>update >>></u> |
| <u>123701</u> (TESTCA003) | David Stad | 78 Disco Drive Sugar Loaf, Ca. 92053 | <u>update >>></u> |

OnDemand

*property management* | *users* | *reporting* logged in as: test1

JACKSON
and
Associates Inc.

LOG OUT

This page is for updating the occupancy status of a property ONLY.
Please fill in all fields and click the "Submit" button.
<<< go back

100

| Property Information | Upgrade Occupancy Status |
|---|---|
| 12903784<br>(TESTCA001)<br><br>Tim Fish<br>1 Channel Street<br>Los Angeles, Ca. 92307 | SELECT CURRENT OCCUPANCY STATUS:<br>[Occupied ▶] — 102<br>*SELECTING "VACANT & SECURED" WILL CLOSE THE EVICTION<br>Only select if you have secured the property and the eviction should be stopped<br><br>DATE OF LAST VISIT:<br>[         ] — 104<br><br>COMMENTS/CHANGES:<br>Enter up to 255 characters.<br>[          ▶◀] — 106<br>[255] characters left<br>[Submit] |

EXAMPLE OF THE RELATION OF EVENTS TO STEP MILESTONES

AN EXAMPLE OF STEP PROCESS VARIATIONS IN POST-FORECLOSURE EVEICTIONS

|  | STEP 1: NOTICE TO QUIT | STEP 2: SUMMONS & COMPLAINT | STEP 3: HEARING | STEP 4: JUDGEMENT | STEP 5: WRIT | STEP 6: LOCKOUT |
|---|---|---|---|---|---|---|
| JURISICTION 1 | X | X |  | X | X | X |
| JURISICTION 2 | X |  | X | X |  | X |
| JURISICTION 3 | X | X | X | X | X | X |
| JURISICTION ... | ... | ... | ... | ... | ... | ... |

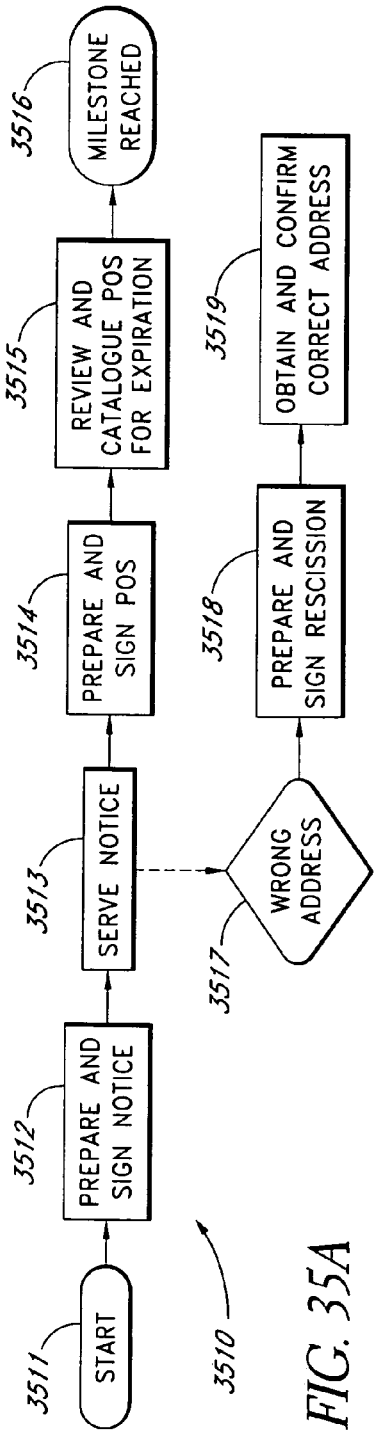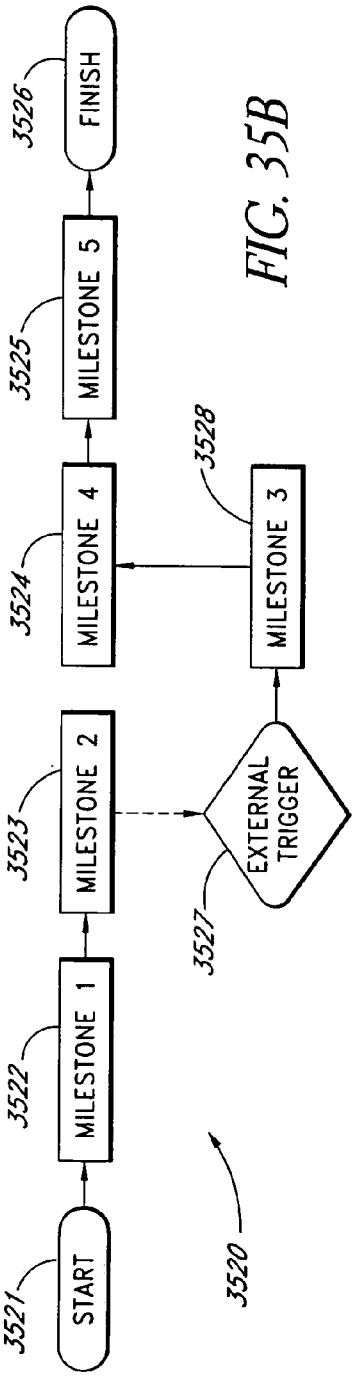

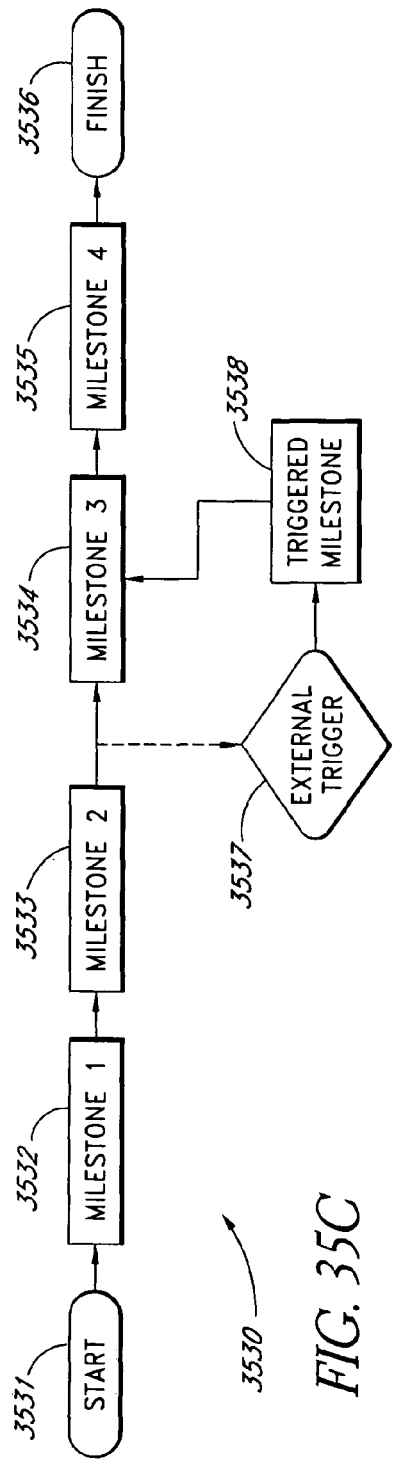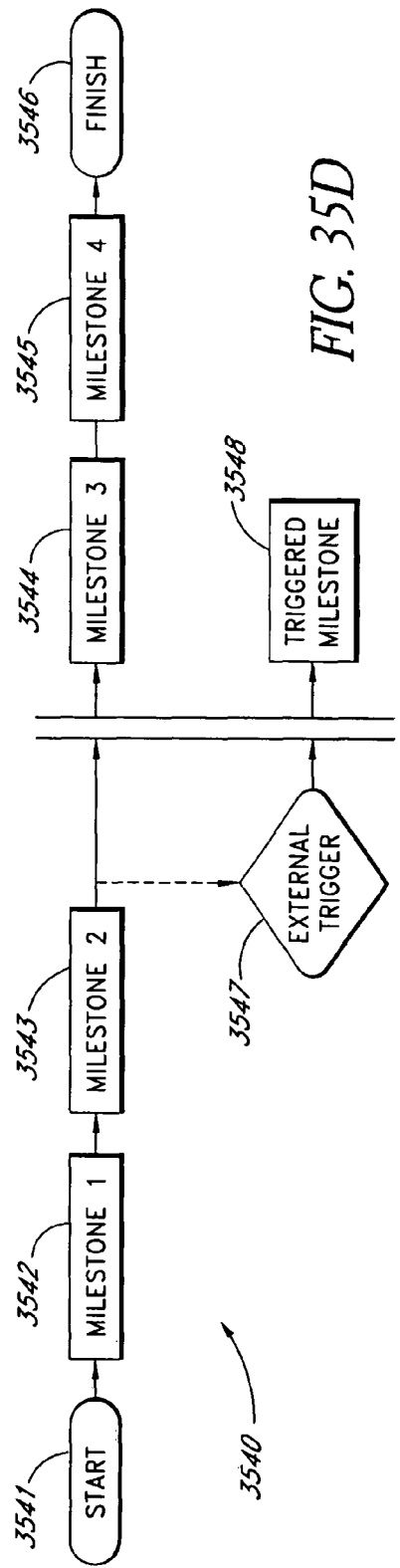

FIG. 36A

Milestone Tracking Module (3601, 3305)

| MILESTONE | $t$ | PROJECTED | COMPLETED |
|---|---|---|---|
| ASSIGNMENT DATE | | | |
| RFS OUT | 2 | | |
| DEFAULT DATE | 20 | | |
| RFS EFFECTIVE DATE | 7 | | |

Event Tracking Module (3602)

| MILESTONE IMPACTED | DAYS ADDED | REASON |
|---|---|---|
| RFS OUT | | |
| DEFAULT DATE | | |
| RFS EFFECTIVE DATE | | |

FIG. 36B

Milestone Tracking Module (3601, 3305)

| MILESTONE | $t$ | PROJECTED | COMPLETED |
|---|---|---|---|
| ASSIGNMENT DATE | | | 10/10/05 |
| RFS OUT | 2 | 10/13/05 | 10/13/05 |
| DEFAULT DATE | 40 | 11/22/05 | 11/22/05 |
| RFS EFFECTIVE DATE | 7 | 11/29/05 | 11/29/05 |

Event Tracking Module (3602)

| MILESTONE IMPACTED | DAYS ADDED | REASON |
|---|---|---|
| RFS OUT | | |
| DEFAULT DATE | 20 | OPPOSITION FILED (TE 6) |
| RFS EFFECTIVE DATE | | |

| MILESTONE TRACKING MODULE | t | PROJECTED | COMPLETED |
|---|---|---|---|
| MILESTONE | | | |
| ASSIGNMENT DATE | | | 10/10/05 |
| RFS OUT | 2 | 10/13/05 | 10/13/05 |
| DEFAULT DATE | 70 | 12/22/05 | 12/22/05 |
| RFS EFFECTIVE DATE | 7 | 12/29/05 | 12/29/05 |

| EVENT TRACKING MODULE | DAYS ADDED | REASON |
|---|---|---|
| MILESTONE IMPACTED | | |
| RFS OUT | | |
| DEFAULT DATE | 50 | OPPOSITION FILED (TE 6)(20)+ COURT DELAY (RE 8) (30) |
| RFS EFFECTIVE DATE | | |

*FIG. 36C*

EXAMPLE OF REPORTING MODULE

| REPORTING TYPE | DATE QUERY POSTED | RESPONSE DUE DATE | DATE RESPONSE POSTED | CONTENT OF QUERY/RESPONSE |
|---|---|---|---|---|
| QUERY#1 | 10/10 | 10/13 | | RFS OUT? |
| RESPONSE#1 | | 10/13 | 10/12 | *RFS OUT* |
| QUERY#2 | 10/13 | 11/04 | | OPPOSITION FILED? IF NOT, DEFAULT REQUEST OUT? |
| RESPONSE#2 | | 11/04 | 11/02 | *OPPOSITION FILED 11/02* |
| QUERY#3 | 11/03 | 11/05 | | HEARING DATE? |
| RESPONSE#3 | | 11/07 | 11/04 | *11/20* |
| QUERY#4 | 11/04 | 11/07 | | DESCRIBE GROUNDS OF OPPOSITION |
| RESPONSE#4 | | | 11/07 | *FORECLOSURE SALE INVALID* |
| QUERY#5 | 11/07 | 11/09 | | WILL JUDGE ENTERTAIN THIS TYPE OF DEFENSE? |
| RESPONSE#5 | | | 11/08 | *NO. JUDGE WILL REQUIRE AN ADVERSARY PROCEEDING* |
| QUERY#6 | 11/08 | 11/10 | | REPLY MEMORANDUM DUE DATE? |
| RESPONSE#6 | | | 11/10 | *11/14* |
| QUERY#7 | 11/10 | 11/14 | | DATE REPLY MEMO FILED. |
| RESPONSE#7 | | | 11/14 | *11/14* |
| QUERY#8 | 11/15 | 11/21 | | OUTCOME OF HEARING? |
| RESPONSE#8 | | 11/21 | 11/20 | *RFS GRANTED* |
| QUERY#9 | 11/20 | 11/28 | | RFS ENTERED? EFFECTIVE DATE |
| RESPONSE#9 | | | 11/28 | *RFS ENTERED 11/23, EFFECTIVE 12/01* |

*FIG. 38*

POST-FORECLOSURE BANKRUPTCY FILING SCREENSHOT

Add Attorney Update

Date*: 12/30/2005 9:50:32 PM

Type*: bk

Update*:

Submit

FIG. 42

LOCK OUT NOTIFICATION AND TRACKING SCREENSHOT

FIG. 43

PERSONAL PROPERTY ADVISE BOX SCREEN SHOT

FIG. 44

SYSTEM AND METHOD AND FOR VALUING LOANS AND SETTLEMENT OFFERS ASSOCIATED WITH SECURITY INTEREST ENFORCEMENT ACTIONS

RELATED APPLICATIONS

The present application claims priority under 35 U.S.C. §119(e) to U.S. Provisional Application No. 60/717,084, filed Sep. 14, 2005, and to U.S. Provisional Application No. 60/765,539, filed Feb. 6, 2006, each of which is hereby incorporated by reference in its entirety.

FIELD OF THE INVENTION

The present invention relates to the field of legal process management. More specifically, the invention relates to systems and methods for valuing loans and settlement offers associated with security interest enforcement actions.

BACKGROUND OF THE INVENTION

Clients retain attorneys to provide needed legal services. Clients often hire managers to supervise the performance of retained attorneys. These "legal process managers" ("LPMs") may be in-house at the client or may operate from outside the client. Traditionally, LPMs have been used primarily to monitor the fees and costs incurred by attorneys in providing legal services. The LPMs strive to ensure that monitored attorneys stay within authorized budgets and do not unnecessarily drive up costs (by, for example, conducting unneeded work). For this purpose, LPM web sites have been used to monitor attorney budgets and invoices.

LPMs may also guide the actions taken and decisions made by the monitored attorneys. Recently, LPM web sites have been used in the field of security interest enforcement actions. The web sites provide a template intended to guide attorneys through the legal processes related to these security interest enforcement actions. The template provides a short static list of predetermined "daisy chain" milestones to the attorneys being managed. An attorney is expected to complete each milestone by a requested date and to indicate that the milestone has been completed by filling in the completion date on the web site.

In addition to the work performed by attorneys, brokers may also be involved in security interest enforcement actions with respect to particular types of property. For example, a broker may enter into a cash-for-keys agreement with a non-paying occupant, such as a tenant, wherein the occupant is given money to voluntarily relinquish occupancy of the property before a specific date. In general, such actions or agreements entered into by the broker are not readily known to the attorney working with the same occupant or property. As a result, situations may arise in which the attorney improperly pursues court action (e.g., eviction) against an occupant who has already voluntarily left the property in accordance with a cash-for-keys agreement.

Systems have been developed that create projections of the amount of time required to complete the prosecution of a security interest enforcement action. Such systems have been used by Fidelity: First American; McCalla Raymer, LLC; DRI Management Systems, Inc.; Indymac Bank; and Fair Isaac Corporation (dba LenStar). Each of these systems is based on a deterministic timeline management model that identifies static "milestones" and that allocates a predetermined unchangeable time to complete each milestone. These static milestones are an inaccurate reflection of the actual timelines followed in prosecuting security interest enforcement actions, and as such provide a poor structure by which to assess the value of loans and settlement offers associated with security interest enforcement actions.

SUMMARY OF THE INVENTION

The present invention provides various features that relate directly or indirectly to the prosecution of security interest enforcement actions. These features may be embodied alone or in combination.

One feature of the invention involves a method for valuing a loan secured by real estate associated with an existing or potential security interest enforcement action. In a preferred embodiment, the method includes generating a plurality of milestones associated with completion of a potential security interest enforcement action in a specified jurisdiction for the real estate securing the loan, determining from the plurality of milestones a total time projected for completing the security interest enforcement action by applying a stochastic model that accounts for the occurrence of one or more fixed-frequency events and one or more random-frequency events associated with completion of the plurality of milestones, determining estimated legal costs associated with prosecuting said plurality of milestones, and adding to the estimated legal costs a first estimated time/carry cost determined by applying an appropriate interest rate to the total time projected for completing the security interest enforcement action.

In a preferred embodiment, the method further includes adding a second estimated time/carry cost associated with property tax costs during the total time projected for completing the security interest enforcement action. In a preferred embodiment, the method further includes adding a third estimated time/carry cost associated with insurance costs during the total time projected for completing the security interest enforcement action.

Another feature of the invention involves a method for valuing an offer to settle a security interest enforcement action in a specified jurisdiction. In a preferred embodiment, the method includes generating a plurality of milestones associated with completion of the security interest enforcement action, determining from the plurality of milestones a total time projected for completing the security interest enforcement action by applying a stochastic model that accounts for the occurrence of one or more fixed-frequency events and one or more random-frequency events associated with completion of said plurality of milestones, determining estimated legal costs associated with completing prosecution of the plurality of milestones, adding to said estimated legal costs a first estimated time/carry cost determined by applying an appropriate interest rate to said total time projected for completing the security interest enforcement action, and determining an offer based on the estimated legal costs and said first estimated time/carry cost.

In a preferred embodiment, the method further includes adding a second estimated time/carry cost associated with property tax costs during the total time projected for completing the security interest enforcement action, and determining the offer based in part on the second estimated time/carry cost. In a preferred embodiment, the method further includes adding a third estimated time/carry cost associated with property insurance costs during the total time projected for completing the security interest enforcement action, and determining the offer based in part on the third estimated time/carry cost.

The features herein may be applied in the context of any security interest enforcement action, including an action to enforce a lien secured by real property, an action to take possession of real property, an action to take possession of personal property, a bankruptcy action, and a real estate foreclosure action.

BRIEF DESCRIPTION OF THE DRAWINGS

These and other features and advantages of the invention will now be described with reference to the drawings of certain preferred embodiments, which are intended to illustrate and not to limit the invention, and in which:

FIG. 6A shows a web page containing general case information provided by a post-foreclosure eviction manager calendar system.

FIG. 8 shows a web page containing a dialog interface that allows a broker to view active requests for updates on the occupancy status of foreclosed properties.

FIG. 9 shows a web page containing a dialog interface that allows a real estate broker to submit updates on the occupancy status of foreclosed properties.

FIG. 23 shows a web page containing information indicative of an assessment of a service provider.

FIG. 29 shows a process for post-foreclosure evictions.

FIGS. 35A, 35B, 35C, 35D, and 35E show event and milestone changes in a security interest enforcement action.

FIGS. 36A, 36B, and 36C show milestone and event reports.

FIG. 38 shows a Reporting module.

FIG. 42 shows a Post-Foreclosure Bankruptcy Filing report.

FIG. 43 shows a Lock Out Notification and Tracking report.

FIG. 44 shows a Personal Property Advice Box.

DETAILED DESCRIPTION OF THE PREFERRED EMBODIMENTS

Figure 1:
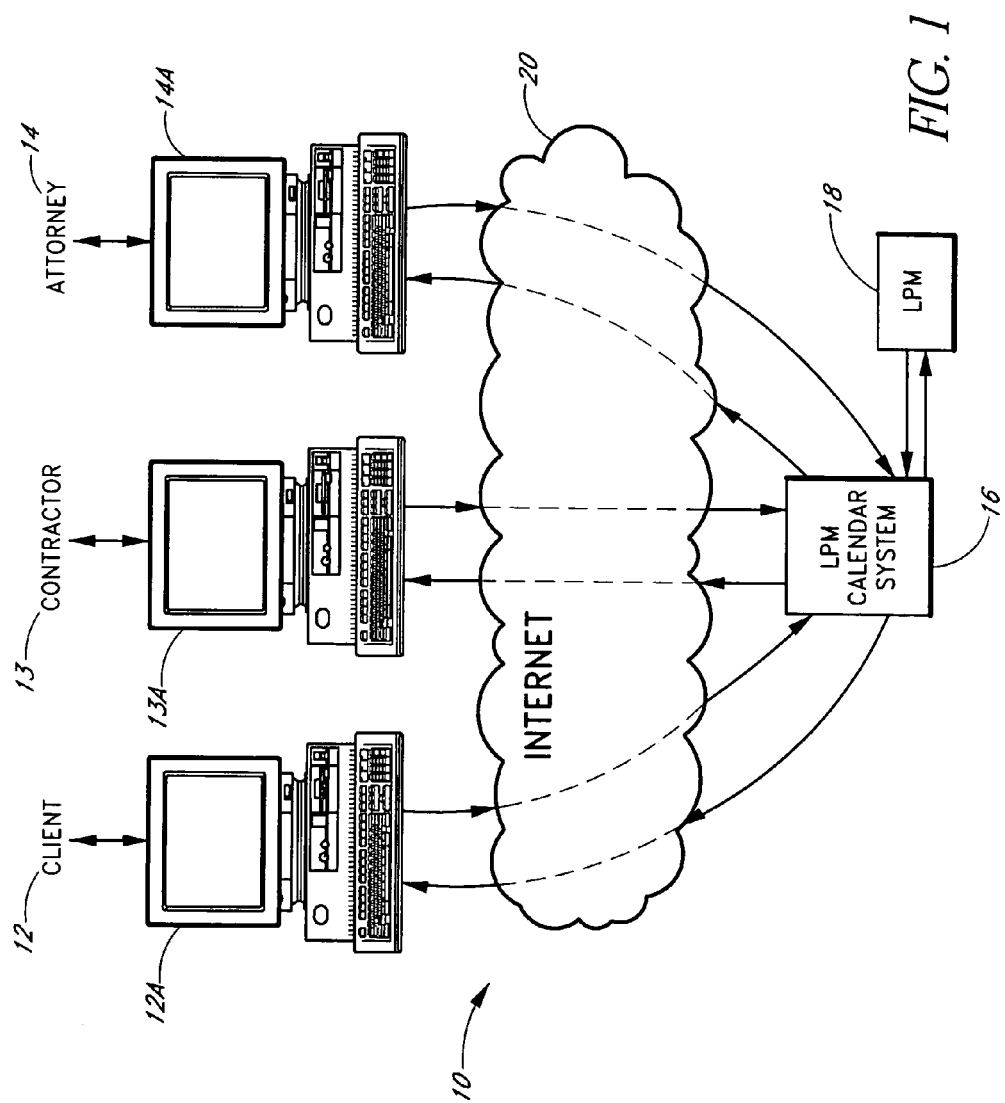
FIG. 1 shows a system with a legal process manager calendar system.

Preferred embodiments and implementations of the invention will now be described with reference to the drawings. These details are set forth in order to illustrate, and not to limit, the invention. The scope of the invention is defined by the appended claims.

To help explain the preferred embodiments and implementations, a discussion will first be provided about security interest enforcement actions, and how such actions differ from most legal actions for purposes of legal process management.

Managing Security Interest Enforcement Actions

A "security interest enforcement action" (or "SIEA") is a legal process used to enforce a security interest. SIEA's include: (1) actions to enforce liens secured by real property (i.e. foreclosures), (2) actions to take possession of real property (i.e. evictions), and (3) actions to take possession of personal property (i.e. "replevin actions"). These actions are generally brought by lenders having a security interest in property.

Lenders lend money secured by real or personal property in exchange for an income stream—i.e. the payment of interest. Lenders are not interested in the secured asset per se, but they are extremely interested in maintaining their income stream. When a borrower defaults, this income stream is interrupted, which causes the lender to lose income as its investment is now tied up in an illiquid non-performing loan.

When the loan is secured by real property, the lender's loss is more than the interest carried. Many homeowners in default also do not pay their property taxes, do not pay for homeowner's insurance, and many times fail to repair the home. Failing to pay any of these expenses can impair the lender's interest in the asset, as the county may foreclose for non-payment of taxes, a fire may destroy the uninsured property, or code violations may cause liability or condemnation issues. Hence, a lender will also have to pick up these expenses in addition to the interest carry. The combination of these factors is known in the mortgage industry as "carry cost", and is generally estimated to run about 1.5% per month of the unpaid loan balance. Hence, the lender is extremely interested in either returning the income stream to performing status quickly, or liquidating the asset as quickly as possible to limit exposure to carry cost. Because of these economic dynamics, SIEA's differ significantly from the vast majority of legal processes.

1. Certainty of a Claim.

In many legal processes, there exists a complex dispute involving questions of law and fact as to which party is liable and for how much. By contrast, in SIEA's the client is generally attempting to enforce a valid interest, and the outcome of the case is usually not in doubt. For example, in a post-foreclosure eviction action, the lender that purchased the property at a foreclosure sale is entitled to possession. Usually the only question in SIEA's is how long the legal process will take to complete.

2. Certainty of Legal Methodology.

In most legal processes, the steps an attorney will follow are impossible to predict because they are heavily influenced by later developments. By comparison, SIEA's involve discrete steps that are mostly predictable.

3. Fee Structure.

Attorneys working in many areas of the law bill based on the time the attorney takes to complete the task (the "billable hour"). By contrast, many SIEA's are completed by attorneys for flat fees negotiated in advance. Accordingly, in SIEA's, the client is far less concerned (or totally unconcerned) with how many billable hours are spent performing a task. Rather, the primary focus of the client is the timely completion of the legal process. As such, attorneys working in the SIEA field are typically judged on how quickly they complete the legal process, rather than (as in other fields) how few billable hours they take to complete a task.

4. Economic Consequences of Failure to Complete in a Timely Manner.

In many fields of law, the client's focus is on achieving a cost-effective solution with a completion date that is usually of minor importance. By contrast, in SIEA's, the client's focus is typically upon completing the legal process as quickly as the law will allow. In essence, SIEA's are filed to protect an income stream. This constraint means that "winning" is not as important as restoring or replacing the income stream as quickly as possible. The overall time to complete any given SIEA will be referred to as T. While there are many components involved in the SIEA, one goal is to minimize T.

5. Importance of Non-Attorney Third Party Contractors.

In many fields of the law, the input needed from independent third party contractors is either non-existent or at least not time-critical. By contrast, in certain types of SIEA's, timely input from independent third parties (e.g., brokers and repossession agents) is needed during the legal process.

6. Volume of Cases.

In many areas of the law, clients need legal services from a relatively small number of attorneys to handle a relatively small number of legal processes. By contrast, the client that retains counsel for SIEA's is often a large institution that simultaneously has an enormous volume (hundreds or thousands) of cases. SIEA's are conducted as if on an assembly line, whereas many legal processes are conducted as one-of-a-kind custom orders, which may have to be designed and built just for that customer.

7. Why the SIEA Exists

The SIEA is part of a structure which provides capital to certain sectors of the American economy, primarily consumer housing and automobiles. In these sectors, the owner of capital is enticed to invest by the pledge of the consumer's right to own or to possess (or both) as collateral for the capital invested in making the loan. The SIEA exists primarily in the secured lending market for home and auto purchase. It also exists in the rental housing market because the cash flow of rent is "secured" by the occupant's right to possess the property—if the occupant fails to pay the rent, the occupant is evicted and replaced by a rent paying tenant.

In the following description, a SIEA will be discussed for the housing lending industry. While this is probably the largest industry for SIEA's, it is not the only one. SIEA's also apply to rental housing and secured automobile financing. The following discussion provides a simplified explanation of the housing lending industry with enough detail to understand the preferred embodiments.

Nearly all home ownership is purchased by means of loans. These loans are, in turn, secured by the purchased homes. In this market, the investor lends the money to the borrower to buy the home in exchange for the borrower's written promise to repay that loan on the agreed terms, usually monthly, at a set interest rate and to protect the Investor's security by paying the property taxes, keeping the property insured, and the like. Thus, the Investor's loan (and cash flow) is protected by the security of the property.

The home lending market has spawned an industry whose function is to assure investors that the monthly payment are made on time, that accurate payment records are kept, that payments are disbursed to the investor, and that the borrower is paying the property taxes and keeping the property insured.

The entities performing these functions are called "Loan Servicers." In addition to collecting payments and monitoring borrower loan compliance on current secured home loans, the Loan Servicer is also charged with liquidating the collateral in the event of a default. Examples of Loan Servicers include government sponsored entities of the Federal National Mortgage Association (FNMA, or Fannie Mae), Federal Home Loan Mortgage Corporation (FHLMC or Freddie Mac). In addition, virtually every major financial institution acts as a Loan Servicer.

Forced Collateral Liquidation

The borrower pledges the residence as collateral for the loan; if the borrower fails to pay the loan, the investor can get "paid" from the proceeds of the forced liquidation of the borrower's house. From the investor's viewpoint, the risk of loan default is protected by adequate security. For example, if an investor lends a borrower $100,000, and if upon the borrower's default, the forced liquidation of that property by foreclosure and resale nets the investor the full $100,000, then the investor was given adequate security. On the other hand, if the forced liquidation nets only $20,000 of the initial $100,000 investment, then the investor would suffer a loss of $80,000 as a result of the borrower's default. In such an instance, the investor was not given adequate security.

As a matter of common sense, if an investor cannot be assured that its investment in the collateralized loan is adequately secured, either the investor will not make the loan at all; or, it will make the loan at a much higher interest rate. Thus, the affordability of home loans depends, in large part, on the protecting the investor's net return from any potential forced liquidation of the collateral. The SIEA is the "enforcer" of a borrower's promise to repay. The SIEAs of foreclosure, post-foreclosure eviction, and REO sale closing are the legal mechanisms that provide the forced liquidation of the residential collateral in the event of loan default. Without these SIEAs, the Borrower's promise to repay is hollow.

The amount of recovery that an investor realizes from the forced resale of the pledged house substantially depends on T. To minimize T is to maximize the amount of forced collateral liquidation proceeds. An increase in T decreases the return from forced loan collateral liquidation. The amount of return from a forced loan collateral liquidation is based upon the collateral liquidation expenses and risks that increase with time, which are:

1. Property taxes. In every jurisdiction in the nation, property taxes are paid from sales proceeds or during the loan liquidation process. Thus, the greater the size of T, the greater the property tax an investor pays from gross resale proceeds.

2. Insurance. To protect the value of the home, the home is insured against damage due to fire, water damage, and the like. The greater the size of T, the greater the amount of insurance premiums an investor pays.

3. Interest. If an investor borrowed the money to lend to the borrower (as is common), that investor makes those payments until the property is liquidated. If that investor did not borrow the money lent to the borrower, then that investor loses the interest which would have been obtained if otherwise invested. Thus, the greater the size of T, the greater the amount of interest lost or paid out.

4. Depreciation in value. There are two types of property value depreciation risks to an investor—property damage, intentional and that caused by the failure to maintain the property, and market conditions. Obviously, the greater the time an occupant resides in a property after default, the greater the risk of intentional and unintentional property damage. An example of a national market condition that can impair value is a general increase in interest rates, i.e. as interest rates increase, the monthly payment a new buyer could afford decreases which will likewise decrease the price at which a home can be resold. An example of a local market condition that can impair value is a plant closing, which greatly increases the unemployment in a local market. Once again, the greater the size of T, the greater the risk to the Investor that the collateral value deceases due to these factors.

Most real estate investors calculate the impact of these factors on value as 1.5% of the unpaid loan balance at default (UPB) for each month from loan default to collateral liquidation. Thus, if completing the SIEA of foreclosure, post-foreclosure eviction, and resale takes 60 months, to "break even" will require the net proceeds from collateral liquidation to be the UPB plus 90% (1.5% times 60 months). If the same collateral liquidation can be completed in 10 months, the "break even" number needed becomes the UPB plus 15%. Break-even is the recovery of the entire UPB plus all additional costs associated with T. Thus, minimizing T maximizes the net return of liquidation proceeds.

The Importance of the SIEA to the Consumer Housing Market

On one level, without the existence of the SIEA for forced collateral liquidation (foreclosure, post-foreclosure eviction, and resale closing), the amount of capital available for the housing market would be greatly reduced; an investor would lack the ability to force repayment. Thus, the SIEA contributes to the health of the American housing market. The speed with which the SIEA is completed is also critical to the consumer housing market. As discussed above, the speed of the collateral liquidation process is as important as the existence of the SIEA. If the SIEA is not structured or managed to provide an appropriate T, investors would be discouraged from making home loans.

All control systems designed to minimize T attempt to control the conduct of the entities responsible for commencement and completion of the SIEA. In virtually every State, an SIEA must be commenced and completed by a state-licensed attorney. Thus, a large component of minimizing T is managing the attorney who controls completion of the SIEA. The commencement, management, and supervision of SIEA forced collateral liquidation process introduces the additional function of the Process Manager (PM). The PM manages each appropriate SIEA so as to minimize T. The PM function can be done either in-house by the loan servicer or it can be done by an independent third party (commonly called an outsourcer). The PM function may be done in-house by the loan servicer or it may be outsourced. Every loan servicer employs a PM (whether in-house or outsourced), which will have process control dedicated to minimizing T for foreclosure, post-foreclosure evictions, related bankruptcy motions, and foreclosed property resale.

SIEA's include the following examples.

1. Post-Foreclosure Evictions

Post-foreclosure eviction actions are taken to remove a former owner, or a tenant of a former owner, from possession of a property after the lender has completed a successful foreclosure action. There are generally no defenses to a post-foreclosure eviction. The longer it takes to complete the eviction, the more it costs the lender in carry cost. For example, on a $200,000 loan, each day's delay typically costs the lender at least $100. Thus, a 30 day delay over the course of a single eviction will cost the lender $3,000. In post-foreclosure eviction actions, a real estate broker commonly provides occupant information, property information and vacancy information. For example, many occupants will vacate a property during the eviction process; if the broker is not regularly checking the property, this vacancy will go unnoticed and unreported, which can result in significant loss to the lender. If an occupant vacated a property and the broker failed to do a vacancy check, leaving the property open and unsecured, the value of the property could be reduced by vandalism by tens of thousands of dollars. In some jurisdictions, tenants must be given a 30-day notice to vacate prior to the commencement of the eviction process. By comparison, former owners are typically entitled to no notice at all. Accordingly, it is important that the broker report whether the occupant is a tenant or an owner. If the property is reported as owner-occupied when it is in fact tenant-occupied, the entire case may be dismissed, and the legal process typically is started anew. Such an error can easily add 60 days to timeline and double the legal fees. For a $200,000 loan, this failure to communicate may cost the lender $6,000 in carry cost. Similarly, if the wrong address is supplied and that error is not discovered until the end of case, another 90 days, or $9,000 in carry cost, may be added to the lender's loss. The steps involved to carry out a post-foreclosure eviction action vary with jurisdiction. The following steps are exemplary for Florida: (1) receive foreclosure documents (statutory requirement); (2) writ out (statutory requirement); (3) writ issued (statutory); (4) forcible eviction by sheriff (statutory).

2. Relief From Stay Motions (Post-Foreclosure Bankruptcy)

Upon the filing for bankruptcy protection, what is known as an "automatic stay" is ordinarily put into effect. In essence, the automatic stay by law prohibits lenders from proceeding with the eviction. Lenders then obtain a Relief from Stay Order from the Bankruptcy Court in order to continue with the eviction. This motion is entirely a creature of statute. Real estate brokers should be advised of a Bankruptcy filing and instructed to cease any contact with the occupant until a Relief from Stay is obtained. Contact with the occupant during this time can expose the lender to liability for violation of the automatic stay. The steps required to carry out a relief-from-stay motion vary with jurisdiction. The following steps are exemplary: (1) file motion for relief from stay (statutory requirement); (2) Court hearing on the motion (statutory requirement); (3) Court Order granted (statutory); (4) Court Order becomes effective (statutory requirement).

3. Objections to Plan (Post-Foreclosure Bankruptcy, Chapter 13)

A Chapter 13 bankruptcy filing allows a borrower to keep his home and pay court-ordered payments to cure any arrearages on a mortgage/deed of trust. The payment of arrearages is called a "Plan." A Chapter 13 Plan is ordinarily available only if the bankruptcy is filed prior to the foreclosure process, which vests title in the lender when completed. It is improper to include property owned by the lender via foreclosure sale in a Chapter 13 Plan. Despite this prohibition, many borrowers will include a home lost in foreclosure in a Chapter 13 Plan. When this occurs, the lender generally files an "Objection to the Plan" on the grounds the home is not an asset of the Bankruptcy Estate. Failure to do so can cause the foreclosure sale to be voided by the Bankruptcy Judge. Real estate brokers should be advised of a Bankruptcy filing and instructed to cease any contact with the occupant until an Objection to Plan has been completed. Contact with the occupant during this time can expose the lender to liability. The steps required to carry out an Objection to Plan varies with jurisdiction. The following steps are exemplary: (1) file Objection to Plan (statutory requirement); (2) Court hearing on the Objection (statutory requirement); (3) Objection granted (statutory requirement); (4) Objection becomes effective (statutory requirement).

4. Foreclosure Actions

Foreclosure actions are taken to liquidate a non-performing real estate asset. These actions may be court actions (i.e. judicial foreclosures), or private actions taken by a private trustee according to the terms of the security instrument (i.e. non-judicial foreclosures). Broker inspections are typically needed to determine value, condition, and if pre-sale legal process is needed to correct any Code violations. In many states, the amount bid at the foreclosure sale by the lender holding the security interest determines a wide range of legal liabilities, such as right to deficiency judgments and insurance proceeds. As an example, a property might have a significant hazardous waste issue that the lender wishes to preserve against the borrower. If the amount bid at the foreclosure sale does not take that issue into account, the lender might lose all rights to seek redress from the borrower for the waste of its security. If the problem is of sufficient magnitude, the lender may wish to forego the foreclosure in total. This information typically can only be obtained by use of a Broker or a real estate inspection service. The steps involved to carry out a foreclosure vary with jurisdiction. The following steps are exemplary for California: (1) send 30-day pre-foreclosure letter (standard requirement in the Deed of Trust used in the industry) (2) Notice of Default (statutory requirement); (3) Notice of Sale (statutory requirement); (4) Foreclosure Sale (statutory requirement); (5) Deed recordation (statutory requirement).

5. Relief from Stay Motions, Unconditional Order (Pre-Foreclosure Bankruptcy)

Before the foreclosure sale is completed, former owners or occupants may file a Chapter 7 or Chapter 13 bankruptcy. As noted above, upon the filing of a bankruptcy, what is known as an "automatic stay" is put into effect. In essence, the automatic stay by law prohibits lenders from moving forward to collect any debt against the debtor. Lenders typically obtain a Relief from Stay Order from the Bankruptcy Court in order to continue with their foreclosure action or a repossession of personal property. There are two type of Orders obtained: (a) an unconditional order that allows the foreclosure process to proceed without any limitation and (b) a conditional order which grants the relief but stays its effectiveness so long as the borrower makes his monthly payments (this is often called an "adequate protection order"). Most bankruptcy Judges require an opinion regarding the value of the home as a precondition to the granting of an unconditional Order. For example, in the Ninth Circuit no unconditional Relief from Stay Order can be granted unless the amount owed on the lien secured by the home exceeds 80% of the value of that home. The steps involved to carry out a Relief from Stay Motion (pre-foreclosure bankruptcy) for an Unconditional Order vary with jurisdiction. The following steps are exemplary: (1) file motion for relief from stay (statutory requirement); (2) Court hearing on the motion (statutory requirement); (3) Court Order granted (statutory requirement); (4) Court Order becomes effective (statutory requirement).

6. Relief From Stay Motions, Conditional Order (Pre-Foreclosure Bankruptcy)

There are two components to a Conditional Order granting Relief from Stay—the obtaining of the Order and its enforcement. A typical Conditional Order will require the borrower to make monthly payments to keep the automatic stay in force. If the payments are missed, the lender gives the borrower and the borrower's attorney written notice of default and if the default is not cured within a set time (often ten days), the Relief from Stay Order is granted upon the Lender's attorney filing a certificate with the Court of the default. The process to obtain a conditional Order is identical to that for obtaining an unconditional Order, it is just the terms of the Order that differ. The steps involved to carry out a Relief from Stay Motion (pre-foreclosure bankruptcy) for an Unconditional Order vary with jurisdiction. As an example, the following steps are exemplary: (1) file motion for relief from stay (statutory requirement); (2) Court hearing on the motion (statutory requirement); (3) Court Order granted (statutory requirement); (4) Court Order becomes effective (statutory requirement); (5) Notice of Default in Payment (per terms of Court Order).

7. Proofs of Claim (Pre-Foreclosure Bankruptcy)

If the debtor files for Chapter 13 bankruptcy protection, the lender will often need to file a Proof of Claim with the Bankruptcy Court to evidence their secured claim to the debtor's assets, in particular the house. The steps involved to carry out a Proofs of Claim (pre-foreclosure bankruptcy) vary with jurisdiction. The following steps are exemplary: (1) Prepare claim (statutory requirement); (2) File claim (statutory requirement).

8. Objections to Plan (Pre-Foreclosure Bankruptcy)

If the debtor files for Chapter 13 bankruptcy protection, the debtor will either at filing or shortly thereafter include a Chapter 13 reorganization plan, which plan will set forth how the debtor plans to emerge from bankruptcy and how debt payments are to be structured. The lender objects to the plan confirmation before the confirmation date if lender believes its security interest or income stream is being unfairly jeopardized or impaired. The steps involved to carry out an Objection to Plan (pre-foreclosure bankruptcy) vary with jurisdiction. The following steps are exemplary: (1) file Objection to Plan (statutory requirement); (2) Court hearing on the Objection (statutory requirement); (3) Objection granted (statutory); (4) Objection becomes effective (statutory requirement).

9. Landlord-Tenant Evictions

Landlord-tenant evictions are actions commenced by a landlord to evict a tenant. The steps involved to carry out a landlord-tenant eviction vary with jurisdiction. The following steps are exemplary in California: (1) 3 day Notice to Pay Rent or Quit (statutory requirement); (2) Complaint (statutory requirement); (3) Default out (statutory requirement); (4) Default entered (statutory requirement); (5) Writ out (statutory requirement); (6) Lock out (statutory requirement).

10. Replevin Actions

A replevin action is an action by a security holder of personal property to obtain possession of that property. The most common use is to obtain possession of an automobile that cannot be repossessed by means of a private repossession company. In replevin actions, an independent contractor is commonly used to provide information on the property and its condition. The steps involved to carry out a replevin action vary with jurisdiction. The following steps are exemplary in California: (1) Notice of default (statutory requirement); (2) Complaint and Motion for Possession (statutory requirement); (3) Complaint and Motion served (statutory requirement); (4) Motion granted (statutory requirement); (5) Order for repossession out (statutory requirement); (6) Default Judgment entered (statutory requirement).

The LPM Calendar System

FIG. 1 illustrates a system 10 wherein a legal process management calendar system ("LPM Calendar System") 16 may be used to facilitate the supervision of service providers (such as attorneys 14 and independent contractors 13) retained by a client 12 to conduct a SIEA through the use of a communication network 20, such as the Internet. The LPM Calendar System 16 facilitates a "learning circle dialogue" comprising a sequence of queries received from a legal process manager (LPM 18) and corresponding responses received from the Users 12-14. The dialog is dynamic, and behaves like an ongoing and unfolding story that is written chapter by chapter, rather than as a static process. This dynamic dialog may be referred to as a "Managed Learning Circle Dialogue," or "MLCD."

The illustration of Client 12 in FIG. 1 is intended to illustrate one or more clients needing simultaneous legal services for multiple legal actions associated with post-foreclosure bankruptcies, post-foreclosure evictions, landlord-tenant evictions, relief-from-stay motions, and/or replevin actions. It is understood that the actions of the Client 12 described herein may be carried out by the Client 12 personally, or by another acting under the direction of the Client 12.

Attorney 14 in FIG. 1 depicts one or more attorneys retained to perform legal services in connection with one or more SIEA's. It is understood that the actions of the Attorney 14 may be carried out either by the attorney personally or by another acting under his or her direction. Contractor 13 in FIG. 1 depicts one or more independent contractors retained to perform services in connection with the SIEA being handled by the Attorney 14. Examples of independent contractors include real estate brokers (for post-foreclosure evictions) and repossessors (for automobile replevin actions). It is understood that the actions of the Contractor 13 may be carried out by the contractor personally or by another acting under his or her direction. For simplicity, reference is made to a single Attorney 14 and a single Contractor 13, although it is understood that multiple attorneys and/or multiple contractors (or, in some instances, no contractors) may be involved.

As shown in FIG. 1, the Client 12, Contractor 13, and Attorney 14, (also referred to as "User" or "Users") are each associated with one or more user devices or systems (12A, 13A, 14A, respectively) that allows access to the communication network 20. As shown by the arrows in FIG. 1, the client 12, contractor 13, and Attorney 14 may exchange information with the LPM Calendar System 16. The system 10 further includes a legal process manager ("LPM") 18 in communication with the LPM Calendar System 16.

By using a sufficiently large communication network, such as the Internet 20, the Client 12, Attorney 14, and Contractor 13 may easily communicate with the LPM Calendar System 16 (described in detail below) through conventional and well-known means. Accordingly, the system can accommodate communications associated with the management of enormous numbers of legal actions distributed over a large geographic area. As such, the Attorney 14 and Contractor 13 may be located remotely from the Client 12 and each other.

The Legal Process Manager

The LPM 18 is an intelligent system that is knowledgeable about the rules, requirements, and procedures of the secured interest enforcement legal process to be managed. The LPM 18 includes a decision-making procedure through which it has the ability to generate queries and transmit them to the LPM Calendar System 16. A query includes a question or instruction directed at a user of the LPM Calendar System 16. A query is chosen by the LPM 18 to monitor and guide the service provider through the legal process in a proper and timely manner. A query may be provided in the form of a question, e.g., "Has a writ been filed?" A query may also be provided in the form of a statement, e.g., "File a writ."

A query is preferably associated with a deadline. A deadline specifies a date (and perhaps time) by which a service provider is expected to provide information to the LPM Calendar System 16 in response to a query. By providing a service provider with a query and a deadline, the LPM 18 provides guidance to the service provider as to what is required of him or her to remain in compliance with the requirements of the legal process.

The details of the queries and deadlines generated by the LPM 18 depend upon the milestones at issue. As discussed at length above, the milestones vary between the various legal areas (e.g., post-foreclosure bankruptcies, post-foreclosure evictions, landlord-tenant evictions, relief-from-stay motions, and/or replevin actions), jurisdiction throughout the United States, and Client 12 instructions. For example, for a post-foreclosure eviction action in California, the LPM 18 recognizes the jurisdiction and generates queries derived from California law, and not from the law of another state. In addition, the queries associated with the milestones for one Client 12 may not be acceptable to another. Finally, legal processes associated with secured instrument enforcement actions each involve well-defined statutory or industry accepted milestones that may be readily incorporated into automated processes.

The details of the queries and deadlines generated by the LPM 18 will also depend upon the specific facts of the case. Which facts are relevant will generally also depend upon which legal action is at issue, as well as the jurisdiction and the procedural posture of the case. These facts will also include the past conduct of the service providers in the case (query responses and timing thereof). For example, when an attorney transmits to the LPM Calendar 16 the answer "Yes" to the query, "Has a writ been filed?" the LPM Calendar 16 transmits that response to the LPM 18 for inclusion in the fact pattern. Based on the attorney's response (and perhaps its timeliness), the LPM 18 can then use its decision-making process to generate the next query and deadline for the attorney.

The LPM 18 may use any of a variety of approaches to derive the queries and deadlines from the appropriate statutory laws, Client instructions, and the facts of the case. The LPM 18 could be entirely automated, generating queries by applying a set of rules, databases, and/or lookup tables designed to handle every contingency of the legal process of interest. Alternatively, the LPM 18 may include automated and manual components. Or, it may be done entirely by a manual component. For example, trained persons could generate the queries and deadlines with the assistance of one or more databases or lookup tables designed for the particular legal process being managed. The services of the LPM 18 may be provided by a third party unassociated with the LPM Calendar System 16. Alternatively, the LPM Calendar System 16 and the LPM 18 may be provided in a single system.

As shown in FIG. 1, information is exchanged between the LPM Calendar System 16 and the LPM 18. This exchange may be provided by any communication means, including a LAN or WAN network or the Internet 20. The LPM Calendar System 16 and LPM 18 communicate with each other through any protocol that allows the communication of a message, such as for example, a text-based message. Preferably the communication from the LPM Calendar System 16 to the LPM comprises e-mail as is well known in the art.

The LPM Calendar System

Figure 2:
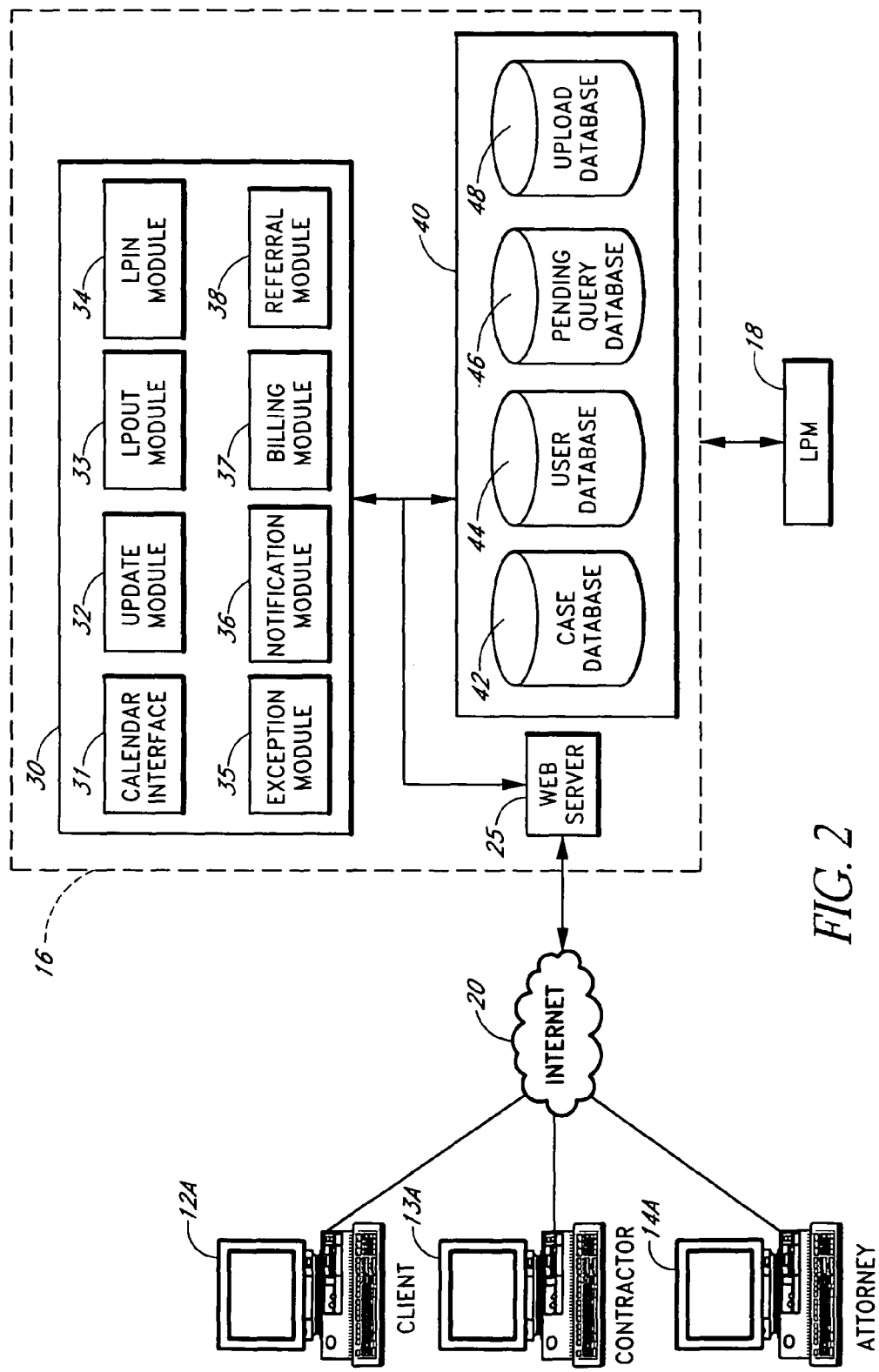
FIG. 2 shows basic components of a legal process manager calendar system.

FIG. 2 illustrates a preferred embodiment for the LPM Calendar System 16. The LPM Calendar 16 includes a web server 25 connected to the Internet 20. As shown in FIG. 2, Clients 12, Contractors 13, and Attorneys 14 can access the LPM Calendar System 16 via the Internet 20. It is to be understood that the web server 25 could be distributed over one or more physical machines networked in a variety of configurations.

FIG. 2 further illustrates that the LPM Calendar System 16 includes a module set 30 and a database set 40 in communication with each other and with the web server 25. The module set 30 includes a Calendar Interface Module 31, an Update Module 32, an LP OUT Module 33, an LP IN Module 34, an Exception Module 35, a Notification Module 36, a Billing Module 37, and a Referral Module 38. The modules 31-38 of the module set 30 are each in communication with one another and with the web server 25 and database set 40. The modules 31-38 provide functionality preferably implemented via computer software and hardware. The functionality may be provided via software or hardware as is well known in the art. A description of the functions provided by each of the modules 31-38 is provided below, after a description of the database set 40. The database set 40 includes a Case Database 42, a User Database 44, a Pending Query Database 46, and an Upload Database 48. The databases 42, 44, 46, 48 of the database set 40 are each in communication with one another and with the web server 25 and module set 30.

The Case Database 42 includes information associated with a particular case. As used herein, "case" refers to a single legal process that is being managed. In a preferred embodiment, the Case Database 42 includes names and contact information for the client, any opposing parties, and any third parties in the case. In a preferred embodiment, the Case Database 42 further includes documentation associated with the case, such as pleadings, Court orders, motions, writs, title documents, and legal memos.

The Case Database 42 further includes a history of the dialogue generated between the Users 12-14 associated with the case and the LPM 18. That history includes queries and deadlines generated by the LPM 18 together with time-stamped answers provided to the LPM Calendar 16 by the Users 12-14 in response to the queries. That history preferably further includes time-stamped text commentary provided by the Users 12-14, if any, that were not responsive to a query from the LPM 18. That history further includes exception reports provided by the LPM 18 containing information on occurrences when a User 12-14 has failed to comply with a requirement (e.g., failed to meet a deadline).

The LPM Calendar preferably may handle multiple cases simultaneously (Case 1, Case 2, . . . Case N). Likewise, the LPM Calendar 16 can handle multiple Users 12-14 per case (Case 1 [User A, User B, . . . ]; Case 2 [User G, User H, . . . ]). Each query stored in the LPM Calendar is preferably associated with a Case, a User, and a deadline: Query (Case, User, Deadline). Likewise, each submission of update information submitted by a User 12-14 into the LPM Calendar 16 is associated with a Case, a User, and a timestamp: Update (Case, User, Time). An update by a User 12-14 responsive to a query is further associated with that query and, optionally, its deadline: Update (Case, User, Time, Query, Deadline).

Preferably, the historical information in a case and the text of stored documents may be searched for a particular text string via a conventional search query based search engine. Through the correlations built into the Case Database 42, the LPM Calendar 16 may selectively retrieve historical information from a case based on User, query, time window, or any combination thereof. Preferably, the historical information in a case and stored documents within Case Database 42 are further associated with identifiers of which Users 12-14 have authorization to view or download the information or documents. Attorneys 14 have authorization to view information associated with Contractors 13 working on the same Case. This sharing of information helps the Attorney 14 obtain up-to-date information when carrying on the legal action.

Referring to FIG. 2, in a preferred embodiment the User Database 44 includes information specific to each User 12-14 who is authorized to use LPM Calendar 16. This information includes contact information, preferably including one or more email addresses. Generally, an initial procedure is used to register a User 12-14. The registration process provides the User 12-14 with a username and password that allows the User to access the nonpublic portions of the LPM Calendar web site. The User Database 44 further includes a pointer to each Case within the Case Database 42 for which the User is associated. The User Database 44 further indicates the status of each User (attorney-type 1, attorney-type 2, ..., contractor-type 1, contractor-type 2, ... ). The User Database 44 further indicates the permission of the User 12-14 to access information stored in connection with information and documents stored in the Case Database 42.

Preferably, the User Database 44 further includes "preferences" associated with each User. Examples of preferences include: the amount of "heads-up" time to use before transmitting a "tickler" notice to a User 12-14 about an upcoming deadline; the amount of time to wait before transmitting a reminder notice to a User about a missed deadline; other recipients to use for reminder notices (e.g., the User's superior). Preferences may optionally be set by the User 12-14, by the Client 12, or by defaults stored within the LPM Calendar 16.

The Pending Query Database 46 includes "pending" queries that have been received by the LPM Calendar System 16 from the LPM 18. A pending query is the next query in the legal process that calls for a response. Each pending query has an associated deadline, and is further associated with a particular Case and one or more particular Users 12-14 from that Case: Query (Deadline, Case, User).

The Upload Database 48 includes information submitted by a User to the LPM Calendar System 16 that has not yet been uploaded to the LPM 18. The information includes responses to queries. Each response has an associated timestamp, and is further associated with a particular Case, the submitting User 12-14, and the query to which it responds: Response (Timestamp, Case, User, Query). The information stored within the Upload Database 48 further includes information submitted by Users 12-14 that is not responsive to queries. Such information has an associated timestamp, and is also associated with a particular Case and the submitting User 12-14: Information (Timestamp, Case, User).

It is to be understood that the database set 40 may be configured in any number of ways as one or more logical descriptors that may include, but are not limited to, databases, tables, views, constraints, processes, procedures, datasets, recordsets, and metadata. The databases 42, 44, 46, 48 are interconnected with each other and with the modules 31-38 so as to allow the storage, transferal, and processing of information as needed to perform the processes described herein. Furthermore, it is understood that the associations between the various types of information in the databases as described above may be provided through pointers or any other means.

The functionality associated with the modules of the module set 30 will now be described.

Referring to FIG. 2, the Calendar Interface Module 31 generates web pages for Users 12-14 navigating the LPM Calendar System 16. As discussed below, the Calendar Interface Module 31 displays in real-time the tasks currently expected of the Users 12-14 within an expected date range (e.g., weekly, bi-monthly, etc.).

The Update Module 32 stores information submitted to the LPM Calendar web site by a User 12-14 in connection with a particular Case into the historical information for that Case within the Case Database 42. The Update Module 32 also stores the information in the Upload Database 48 for subsequent uploading to the LPM 18. When the information is submitted by a User 12-14 in response to a pending query, the Update Module 32 also clears the pending query from the Pending Query Database 46.

The LP OUT Module 33 uploads information stored in the Upload Database 48 to the LPM 18. The LP OUT Module preferably uploads information periodically. The periodicity is a design choice that can be set to be daily, bi-daily, weekly, etc. Alternatively, the timing of an upload may be set to occur more frequently based on the amount of information in the Upload Database 48 awaiting uploading. To upload the information, the LP OUT Module 33 converts the information in the Upload Database 48 into a format suitable for the communication protocol used. If conventional electronic mail is used, the LP OUT Module 33 automatically generates and transmits to the LPM 18 one or more electronic mail messages containing the information from the Upload Database 48.

The LP IN Module 34 downloads new queries from the LPM 18 to the Pending Query Database 46. The LP IN Module may download information periodically from the LPM 18. Alternatively, the timing may be controlled by the LPM 18. Preferably, the LPM 18 transmits electronic mail messages to the LP Calendar System 16. The LP IN Module 33 receives the electronic mail messages, extracts the text information from the bodies of the messages, converts the information into a format suitable for storage in the Pending Query Database 46, and then stores the information accordingly.

The Exception Module 35 includes a real-time clock (including both date and time information). The Exception Module 35 compares its clock output to the deadlines of each of the pending queries in the Pending Queries Database 46 in order to discover "exceptions." As used herein, the term "exception" generally refers to any query that is or was (1) not responded to by the User before the specified deadline; or (2) remains active past the deadline. This type of exception may be detected by comparing the timing of the response of a User 12-14 to the deadline of the associated query.

An example of a type (1) exception: A User 12-14 is requested to file a writ by July 1. The writ is not filed until July 15, as indicated by a message submitted by the User 12-14. The writ file is an "exception." This type of exception may be detected by comparing the date within the substance of the response of the User 12-14 to the deadline of the associated query. Alternatively, this type of exception may be detected by receiving an exception report from the LPM 18 containing the details of the exception.

An example of a type (2) exception: A User is requested to file a writ by July 1. It is now July 2 and the writ has not been filed. This non-filed writ is an "exception." This type of exception may be detected by comparing the timing of the response of the User 12-14 to the deadline of the associated query.

Optionally, the system may define non-time based exceptions based on a failure to meet any requirement placed upon a User. For example, if a User agrees to charge a flat fee of $25.00 for a particular service, but ultimately submits an invoice for $75.00 for his services, the Exception Module 35 would detect the submission of the invoice as an "exception."

The Exception Module 35 further provides one or more "enforcement" procedures triggered by the existence of (or anticipation of) an exception. The details of the enforcement procedure may take on many forms. One example is the transmission of a reminder email to the User 12-14 who needs to take action. A reminder email may be sent as a deadline is being approached (to avoid a missed deadline) or after a deadline has been missed. The enforcement procedure may include sending an email to the Client 12. The enforcement procedure may further include the placing of a telephone call to a superior of the User 12-14. Optionally, records of past performance stored in the Case Database 42 for a particular User 12-14 may be used to identify the amount of supervision (i.e. the number and timing of reminders) needed on a user-by-user basis.

The enforcement procedure of the Exception Module 34 may include an escalating pattern of enforcement. For example, a reminder email may be sent to a User 12-14 just prior to a deadline. A stronger reminder email may be transmitted to the User 12-14 on the deadline date. An even stronger reminder email may be transmitted to the User 12-14 two days after the deadline. If the exception is not remedied within a week of the deadline, a warning email may be sent to the superior of the User 12-14.

The Notification Module 36 allows for notifications to be automatically transmitted, preferably via email, to the Client 12, Users 12-14 and third parties as needed. The recipients of notifications are stored for each User 12-14 as preferences in the User Database 44. Notifications may be transmitted when an update of a "special" nature occurs (such as exceptions), or when any other information needs to be transmitted among the appropriate parties. For example, notifications may be sent to a User 12-14 when an impending deadline is approaching.

The Billing Module 37 is an optional module that manages the billing procedure based on User 12-14 preferences (stored in the User Database 44), including but not limited to (1) triggering the Notification Module 36 to transmit requests for invoices to Users 12-14; (2) receiving invoices submitted by Users 12-14 online; (3) triggering the Notification Module 36 to electronically submit an invoice to a User 12-14; and (4) receiving from the Exception Module 35 exceptions associated with invoice submissions and payments.

The Referral Module 38 is an optional module that receives referrals and supporting documentation at the beginning of a case. The Referral Module 38 automatically transmits the referrals and the supporting documentation to the appropriate Users 12-14 and third parties incident to the legal process. Preferably, the Referral Module 38 also monitors the receipt of the referrals by the intended recipients.

Figure 3:
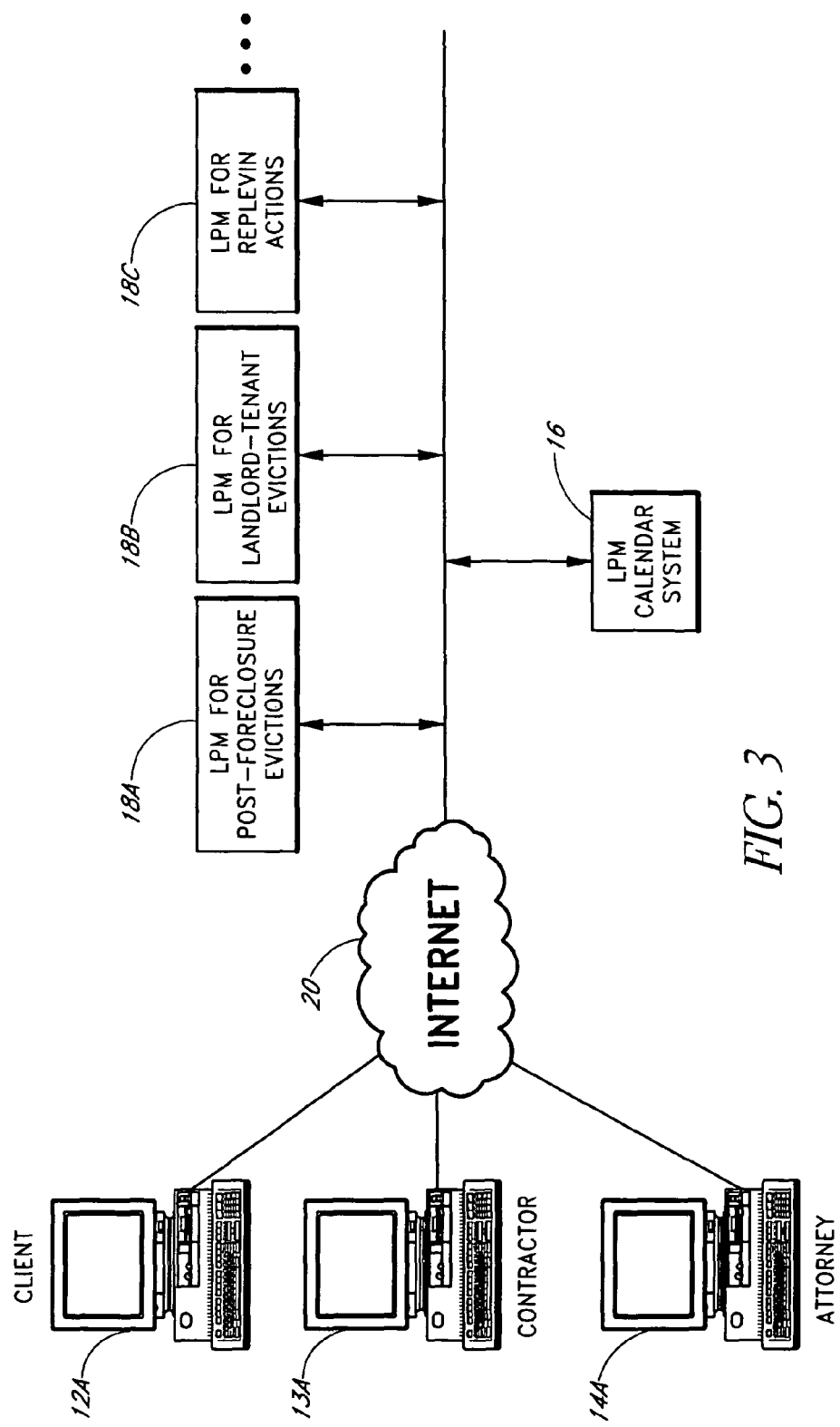
FIG. 3 shows a system in which a legal process manager calendar system is used by multiple legal process managers.

FIG. 3 illustrates an arrangement wherein the LPM Calendar System 16 is used with multiple LPMs 18A, 18B, 18C. As shown, there may be distinct LPMs for post-foreclosure evictions (18A), for landlord-tenant evictions (18B), for replevin actions (18C), and so on. These LPMs 18A, B, C . . . may be located in different physical locations, may be controlled by (or comprise) different third parties, and may employ completely different techniques for generating queries. The LPM Calendar System 16 may interact with each LPM independently of the others.

Visiting the LPM Calendar System Web Site

The use of the LPM Calendar System 16 will now be described in the context of a web site designed for use by Attorneys 14 and real-estate Brokers 13 who participate in the post-foreclosure eviction process. In particular, the Attorney 14 handles the legal aspects of the eviction through the Court system while the Broker 13 handles the tasks associated with the foreclosed property itself. The use of the post-foreclosure eviction process in the following description is exemplary only.

Figure 4:
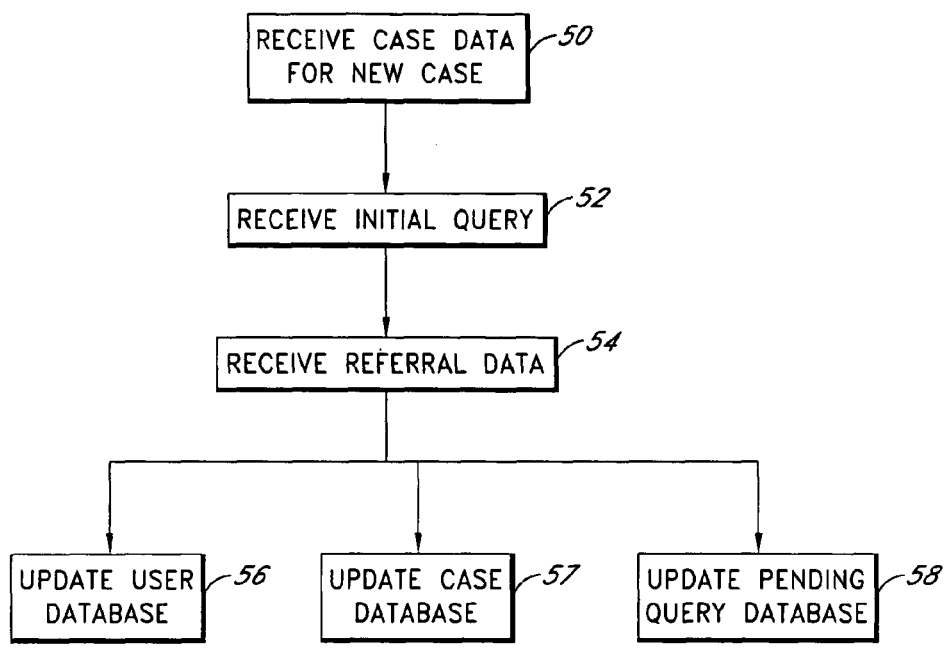
FIG. 4 shows a process followed by the legal process manager calendar system when a new case is initiated.

FIG. 4 illustrates an exemplary sequence of blocks that are performed by the LPM Calendar System 16 when a new Case is started. In Block 50, the LPM Calendar System 16 receives the initial data for the Case. The initial data will include the identities and contact information (including information to enable communication via communication network 20) for the Client 12, any information available on opposing parties and third parties, and any pleadings or other initial documentation. The initial data may also include the identities and contact information for one or more LPMs (including information to enable communication via communication network 20). For Clients 12 and LPMs who are new to the system, the LPM Calendar System 16 generates security information (e.g., usernames and passwords) to permit secure communications.

In Block 52, the LPM Calendar System 16 receives from the LPM 18 an initial query (with deadline, if appropriate) one or more of the Users 12-14 for the new Case. The LPM generates the initial query from the initial Case data. If necessary, the LPM Calendar System 16 can upload the initial Case data to the LPM 18 for use in generating the initial query (not shown in FIG. 4). In (optional) Block 54, the Referral Module 38 of the LPM Calendar System 16 receives the referral data for the Case. This includes receiving confirmations from one or more Attorneys 14 and, possibly, one or more Contractors 13, who have agreed to work on the Case. Blocks 52 and 54 can occur in either order, depending on system configuration or preferences. For retained Attorneys 14 and Contractors 13 who are new to the system, the LPM Calendar System 16 generates security information (e.g., usernames and passwords) to permit secure communications.

In Block 56, the new Case data is used to update the contents of the User Database 44. This may include the creation of entries for new Users, or, if the User(s) associated with the new Case are all already registered with the LPM Calendar System 16, the creation of new Case entries for the existing User(s). In Block 57, the new Case data is used to update the contents of the Case Database 42. This involves the creation of an entry for the new Case, with pointers to the User Database 44 for each User associated with the new Case. Blocks 56 and 57 can occur in either order. In Block 58, the LP In Module 34 stores the initial quer(ies) received in Block 52 in the Pending Query Database 58 in association with the associated User(s) 12-14.

Figure 5:
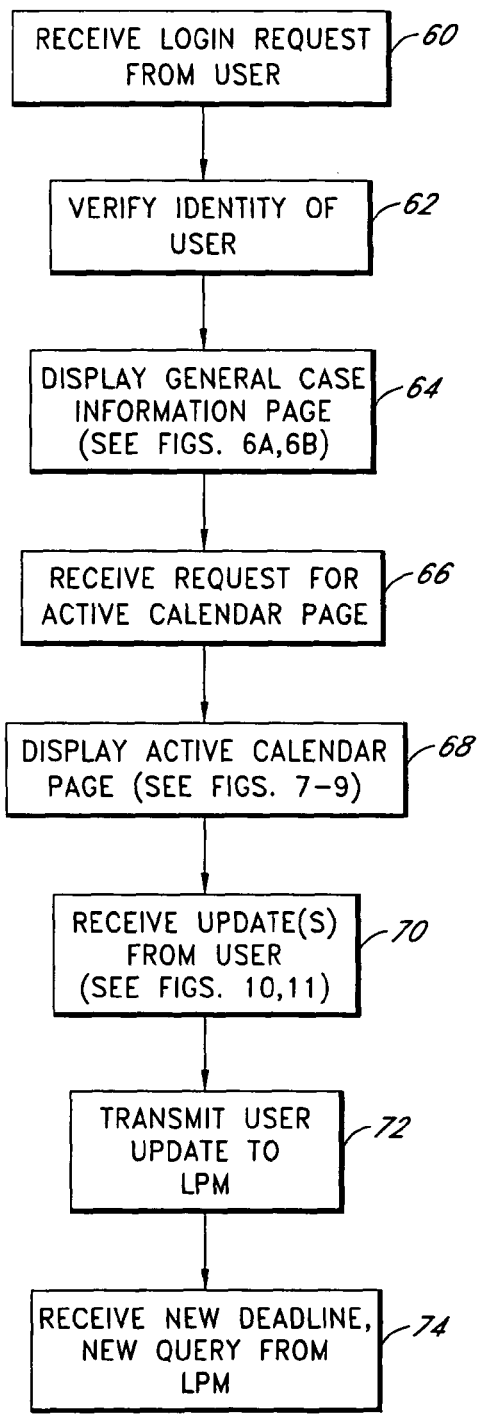
FIG. 5 shows a process followed by the legal process manager calendar system when a user visits a calendar web site.

FIG. 5 illustrates an exemplary sequence of blocks that are performed by the LPM Calendar System 16 when a User 12-14 visits the associated web site. In Block 60, the LPM Calendar System 16 receives a login request from a User 12-14 seeking to access the web site via the Internet 20. For this purpose, the Calendar Interface Module 31 provides a web page with a security feature. For example, the web page may include a field for entering a username and a field for entering a password, as is well known in the art.

In Block 62 of FIG. 3, the LPM Calendar 30 verifies the identity of the User 12-14 using techniques well known in the art. Preferably, username and password information provided by the User 12-14 through the web page generated by the Calendar Interface 31 are compared to correlated username and password information stored in the User Database 44. As shown in Block 64, the LPM Calendar System 16 responds to a successful login by the User 12-14 by displaying a General Case Information web page. The Calendar Interface 31 generates the General Case Information web page by retrieving case information from the Case Database 42 that is associated with the User 12-14 identified through the login process.

FIG. 6A illustrates a sample General Case Information web page 80A generated for an Attorney 14 in accordance with one embodiment. In this embodiment, the General Case Information web page 80 includes a Calendar Section 82A that provides information for each active case associated with the Attorney 14. The Calendar Interface Module 31 identifies and copies the appropriate information from the Case Database 42 through the information's association with Attorney 14. This information includes a case reference number, the name of the former owner of the foreclosed property, the eviction status of the property, and a description of any updates expected from the Attorney 14.

The updates shown on the web page 80A comprise the query with the most imminent deadline submitted by the associated LPM 18 for each Case. For example, FIG. 6A shows three post-foreclosure cases at different stages. Case TESTCA001 is at the "eviction, start" phase, and the pending query for the Attorney 14 is "Title docs received?" For Case TESTCA002, the case is having "problems," and the next query is "Motion filed?" For Case TESTCA003, the eviction status is "eviction, judgment obtained," and the pending query is "Appeal filed?" Each time an Attorney 14 visits the General Information web page 80A he or she will see different information portrayed, depending upon what has transpired since the last visit to the page.

The General Case Information web page 80A further includes three links: an Active Case Summary link 84A, a Closed Case Summary link 86A, and a This Week's Schedule link 88A. Selecting the Active Case Summary link 84A redirects the Attorney 14 to a web page that displays a summary of the attorney's active cases. Selecting the Closed Case Summary link 86A redirects the Attorney 14 to a web page that displays a summary of the attorney's closed cases. Selecting This Week's Schedule link 88A redirects the Attorney 14 to a web page that displays an Active Calendar web page. (see FIG. 5, Block 66A).

Figure 6B:
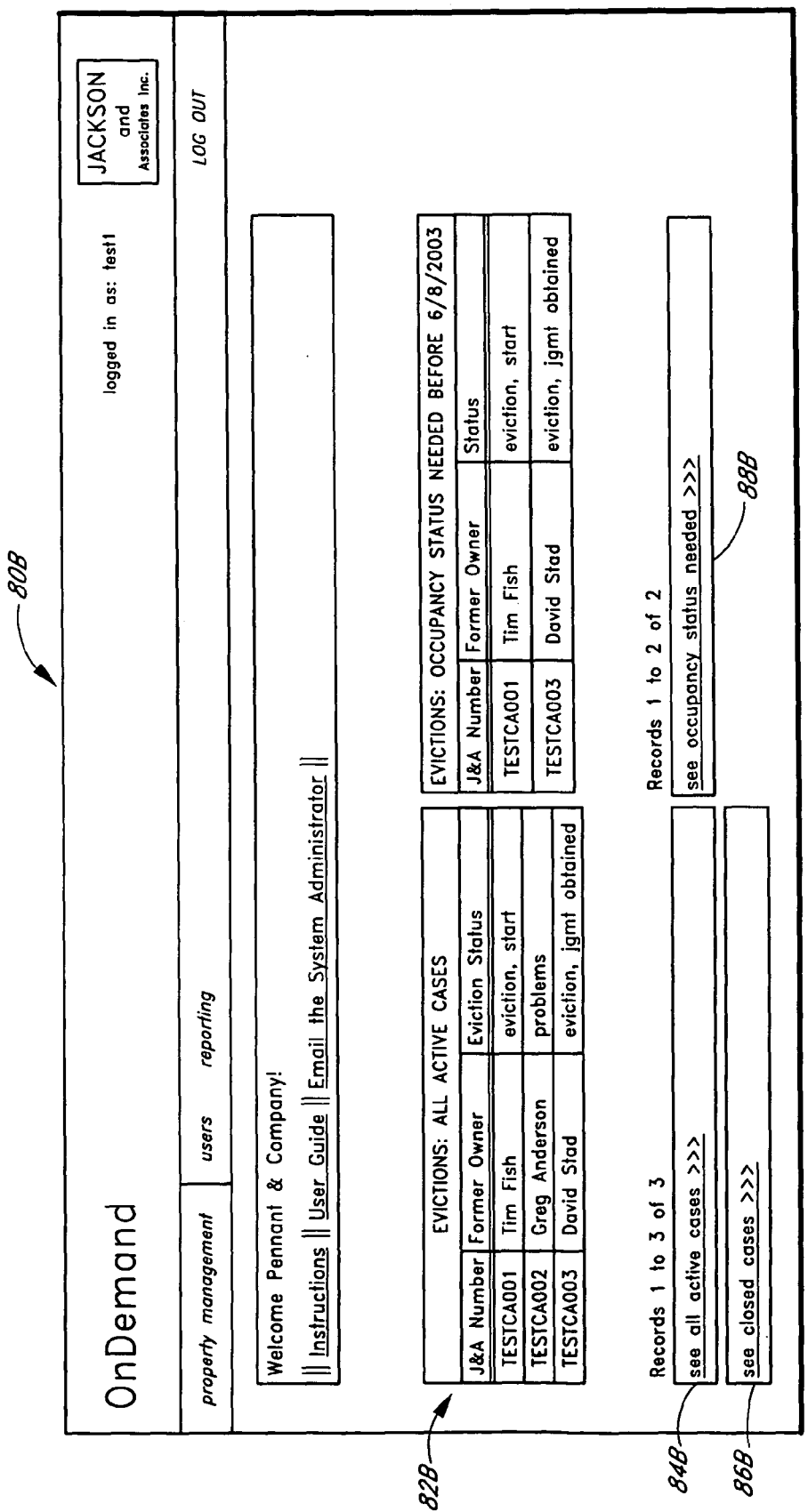
FIG. 6B shows a web page containing general case information provided by a post-foreclosure eviction manager calendar system.

FIG. 6B illustrates a sample General Case Information web page 80B generated for a Broker 13 in accordance with one embodiment. In this embodiment, the General Case Information web page 80B includes a Calendar Section 82B that provides information for each active case associated with the Broker 13. The Calendar Interface Module 31 identifies and copies the appropriate information from the Case Database 42 through the information's association with Broker 13. In the embodiment of FIG. 6B, this information includes a case reference number, the name of the former owner of the foreclosed property, the eviction status of the property, and a description of occupancy status reports expected in the near future from the Broker 13.

In one embodiment, related links may be placed into a case summary section or display. For example, the General Case Information web page 80B includes three links: an Active Case Summary link 84B, a Closed Case Summary link 86B, and an Occupancy Status Needed link 88B. Selecting the Active Case Summary link 84B redirects the Broker 13 to a web page that displays a summary of the broker's active cases. Selecting the Closed Case Summary link 86B redirects the Broker 13 to a web page that displays a summary of the broker's closed cases. Selecting Occupancy Status Needed link 88B redirects the Broker 13 to a web page that displays an Active Calendar web page (see FIG. 5, Block 66B).

Comparison of FIGS. 6A and 6B reveals that important information associated with a Case is provided to the Attorneys 14 and Contractors 13 working on the same Case. This sharing of information helps avoid the situation where the Attorney 14 delays carrying out a task because he is unnecessarily waiting for the Contractor 13 to complete a task that has in fact been completed, for example, determining whether the occupant of a foreclosed property is an owner or tenant. The sharing of information provided by the LPM Calendar System 16 eliminates delay caused by proceeding with the incorrect type of eviction process, thus saving the Client 12 money.

As shown in Block 68 of FIG. 5, the LPM Calendar System 16 responds to the request from a User 12-14 in Block 66 by displaying an Active Calendar web page. The Active Calendar web page displays to User the "active" queries associated with the Cases of the user 12-14. In the context of the illustrated embodiment, an "active" query is a pending query with a sufficiently close deadline. The time period to use for "sufficiently close" is a matter of design, and may optionally vary with User 12-14 and may also optionally vary with the nature of the query. For example, the Attorneys 14 may be provided a two-week window of active queries while the Contractors 13 may be provided a one-month window of active queries. In one embodiment, queries associated with time-consuming tasks are associated with a longer lead-time to trigger active status than queries associated with simple tasks.

Figure 7:
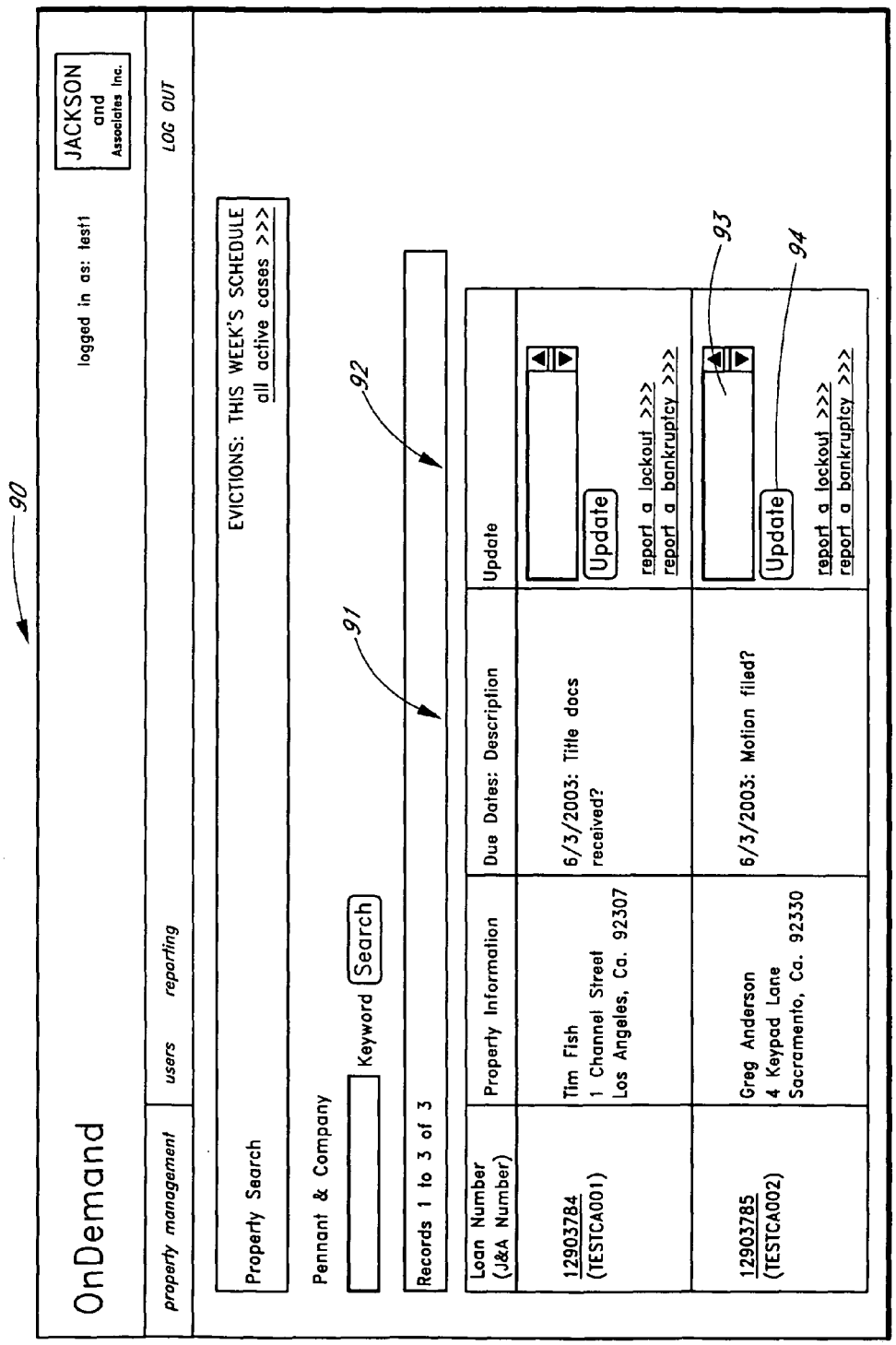
FIG. 7 shows a web page containing a dialog interface that allows an attorney to view queries and submit responsive information.

Exemplary Active Calendar web pages will now be described for a visiting Attorney 14 and Broker 13. FIG. 7 illustrates an Active Calendar web page 90 generated by the LPM Calendar Interface Module 31 for an Attorney 14. In this embodiment, the Attorney's Active Calendar web page 90 includes a list of all cases with "active queries." As used herein, an active query is a prompt requiring a response from the Attorney 14 within a relative short time frame (as discussed in greater detail below). In this example, a one-week period is used to determine active queries. Only queries for the Attorney 14 with deadlines falling within the next week appear on the Active Calendar web page 90. Referring to FIG. 7, the web page displays the queries (with associated deadlines) 91, and provides an interface 92 for submitting responses. The web page includes an Update field 93 that allows the Attorney 14 to enter a text string responsive to the corresponding query, and an Update button 94 that allows the Attorney 14 to submit the response.

When the Attorney 14 clicks the Update button 94, the Update Module 32 stores the text string from the Update field 93 into the Case Database 42, stores the text string into the Upload Database 48 (for uploading to the LPM 18), removes the Attorney's active query from the Pending Query Database 46, and emails that response to the LPM 18. This is illustrated in FIG. 5 at Block 70.

FIG. 8 illustrates an Active Calendar web page 98 generated by the LPM Calendar Interface Module 31 for a Broker 13. In this embodiment, the Broker's Active Calendar web page 100 includes a list of all cases with active queries. Comparing FIG. 7 with FIG. 8 reveals that in this embodiment the Active Calendar web page of the Broker 13 differs from that of the Attorney 14. While the Attorney's active query varies with the circumstances, the Broker's active query is the same each time: a request for an update in the occupancy status of the foreclosed property. In this embodiment, the Broker's Active Calendar web page 98 includes an Update link 99 that allows the Broker to provide information on the occupancy status of the foreclosed property. Like with the Attorney's Active Calendar web page, the Broker's web page only provides queries (i.e. requests for occupancy updates) for "active" queries. In this example, a two-week period is used to determine active queries for the Broker 13. Only occupancy updates requested within the next two weeks appear on the Broker's Active Calendar web page 100.

FIG. 9 illustrates an Occupancy Update web page 100 presented to the Broker 13 upon selecting the Update link 99 within the Active Calendar web page 98 of FIG. 8. The Occupancy Update web page 100 allows the Broker 13 to submit occupancy information by selecting from an Occupancy Status menu 102 with a limited number of selections. In this embodiment, the Broker's web page also includes a Date field 104 that allows the Broker 13 to enter the date of last visit to the property. In this embodiment, the Broker's web page also includes a Comments field 106 that allows the Broker 13 to enter a text string, and an Update button 108 that allows the Broker 13 to submit the responses.

When the Broker 13 clicks the Update button 108, the Update Module 32 stores the submitted information from the Occupancy Status menu 102, the Date field 104, and the Comments field 106 into the Case Database 42, stores the same information into the Upload Database 48 (for uploading to the LPM 18), removes the Broker's active query from the Pending Query Database 46, and emails either the LPM or the Client, depending on Client 12 preference. The occupancy information submitted by the Broker 13 (and stored in the Case Database 42) becomes viewable by the Attorneys 14 working on the same case during their next visit to the LPM Calendar System 16 web site.

Figure 10:
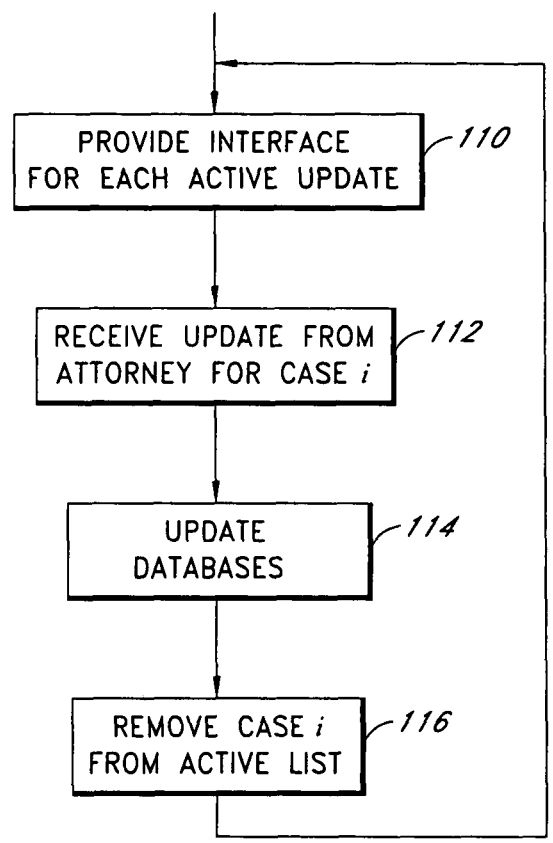
FIG. 10 shows a process followed by the legal process manager calendar system when a user submits information responsive to an active query.

FIG. 10 illustrates the sequence of blocks that are performed by the Calendar Interface Module 31 when an Attorney 14 enters information via the Active Calendar web page 90 in response to an active query. In Block 110, the Calendar Interface Module 31 generates an Active Calendar web page containing an update field (element 93) for each case having an active query. In Block 112, the LPM Calendar 30 receives an information update from the Attorney 14 for one of the cases with an active query ("Case i"), in the manner discussed above. In Block 114, the Update Module 32 stores the information in the Upload Database 48 and Case Database 42, as discussed above. In Block 116, the Update Module removes the active query for Case i from the Pending Query Database 46, as discussed above and also emails the response to the LPM. Following the completion of Block 116, control is passed back to Block 110, where the Calendar Interface Module 31 regenerates the Active Calendar web page 90 without the Case i entry (which is no longer active). At this point the Attorney 14 is in a position to enter another information update for any remaining active cases.

Furthermore, one embodiment allows for reporting of particular milestone events ("Special Updates"). For example, the filing of a bankruptcy during a post-foreclosure eviction invokes an automatic stay, which makes any further legal process and/or contact with the Borrower illegal. Acts taken in violation of the automatic stay can subject the foreclosing lender to legal liability. Hence, it is important for the Broker to be advised of the Bankruptcy filing so as to avoid the Broker contacting the occupant in violation of the automatic stay. Likewise, it is important that the eviction attorney be advised to cease all legal process until either the Bankruptcy is dismissed or an Order Granting Relief from Stay is entered, which allows the eviction to proceed. Moreover, it is also important that the LPM 18 be advised or updated such that the Relief from Stay Motion can be filed, which will allow the post-foreclosure eviction to continue.

In one embodiment, Special Updates are entered in such a way to provide the proper notice to the proper parties. Referring back to FIG. 7, the Attorney's Active Calendar web page 90 includes two Special Update features: a Report a Lockout link 95 and a Report a Bankruptcy link 96. These "special" links provide a simple mechanism for the Attorney 14 to submit information that is of particular importance to the legal process (in the present example, information that is of particular importance to post-foreclosure evictions). Selecting either of these links redirects the Attorney 14 to a Special Update web page within which the attorney can submit the appropriate information. In other embodiments, other types of milestone events may be used depending on the type of enforcement action involved. In yet other embodiments, the LPM 18 may determine which types of milestone events are accorded Special Update status.

Figure 12:
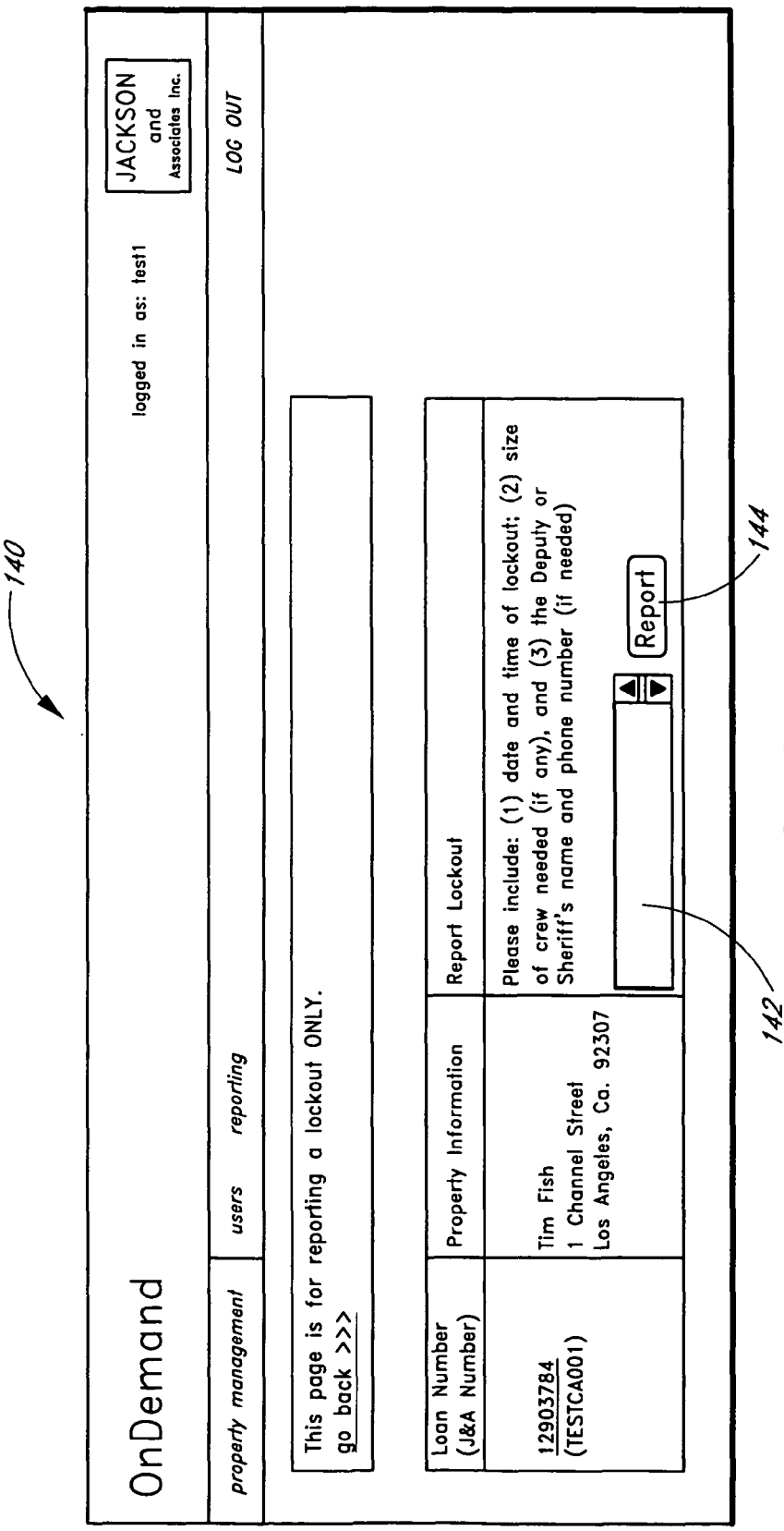
FIG. 12 shows a web page containing an interface that allows an attorney to submit special reports.

FIG. 12 illustrates an exemplary Special Update web page 140 generated for a visiting Attorney 14. The example in FIG. 12 illustrates a web page generated by the Calendar Interface Module 31 in response to the Attorney 14 selecting the Report a Lockout link 95 from the Active Calendar web page 90. In this embodiment, the Special Update web page 140 provides a Special Report field 142 within which the Attorney 14 may type the relevant information. The Special Update web page 140 further provides guidance for the attorney as to what information to enter. The attorney is instructed to "Please include: (1) date and time of lock out, (2) size of crew needed (if any), and (3) the Deputy or Sheriff's name and phone number (if needed)." The Special Update web page 140 further provides a Report button 144 for submitting the report once entered into the Special Report field 142.

When the Attorney 14 clicks the Special Report button 144, the Update Module 32 stores the text string from the Update field 93 into the Case Database 42 and stores the text string into the Upload Database 48, while emailing the Broker 13, the LPM 18 and the Client 12 with the information. Although not depicted, the Report a Bankruptcy link 96 generates a web page for receiving reports analogous to the Special Update web page 140 illustrated in FIG. 12. In the case of a Bankruptcy notice, this feature alerts the Broker to the existence of the Bankruptcy and instructs the Broker not to contact the Occupant until the Relief from Stay order is effective.

Figure 11:
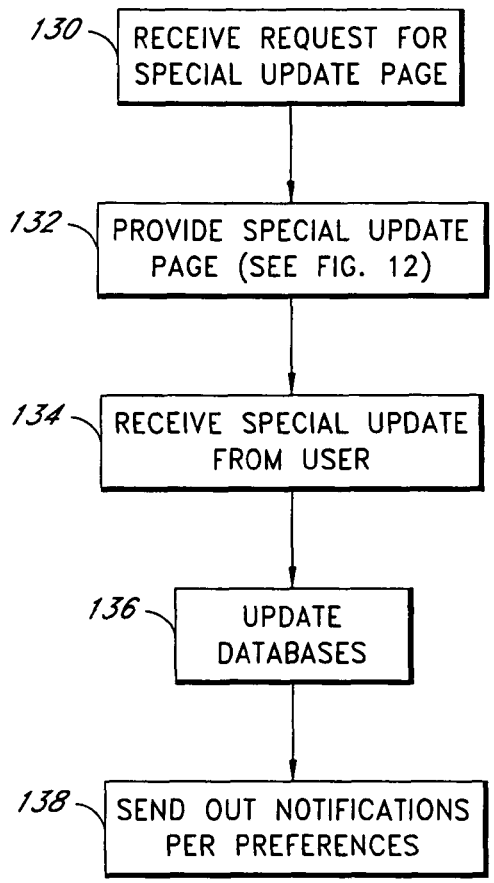
FIG. 11 shows a process followed by the legal process manager calendar system when a user submits a special report.

FIG. 11 illustrates the sequence of blocks that are performed by the LPM Calendar 16 when an Attorney 14 uses the Special Update web page 140. In Block 130 of FIG. 6B, the Calendar Interface 31 receives a request for a special update in response to the Attorney 14 selecting either the Report a Lockout link 95 or Report a Bankruptcy link 96 on the Active Calendar web page 90. In Block 132, the Calendar Interface Module 31 generates a Special Update page as discussed above. In Block 134, the Update Module 32 stores the information in the Upload Database 48 (for uploading to the LPM 18) and in the Case Database 42. In Block 136, the Update Module 32 stores the special update in the Case Database 142 where it becomes accessible to the Users 12-14 defined by the preferences set for the Case. In Block 138, the Notification Module 33 sends out notifications in compliance with the preferences stored in the User Database 44 for the appropriate Users 12-14 in the case. Following completion of Block 138, the Calendar Interface Module 31 regenerates the Active Calendar web page 90 (not shown in FIG. 11). At this point the Attorney 14 is in a position to enter another information update for any remaining active cases.

The preferred embodiments discussed above include examples of web sites. It is understood that other embodiments could utilize other types of interactive, multi-user systems, including but not limited to telephone-based systems in which users listen to queries and then respond by voice or by using a telephone key pad. Both web and telephone interfaces may be provided. In web-based embodiments, it is understood that various combinations of text fields, check boxes, drop-down menus, and other well-known interface tools may be provided to users for the purpose of receiving information. The preferred embodiments discussed above discuss using electronic mail messages to send notifications. It is understood that other embodiments could utilize other types of message systems, including but not limited to a pager and a telephone call with a computer generated message.

The Automated Dialog

Figure 13:
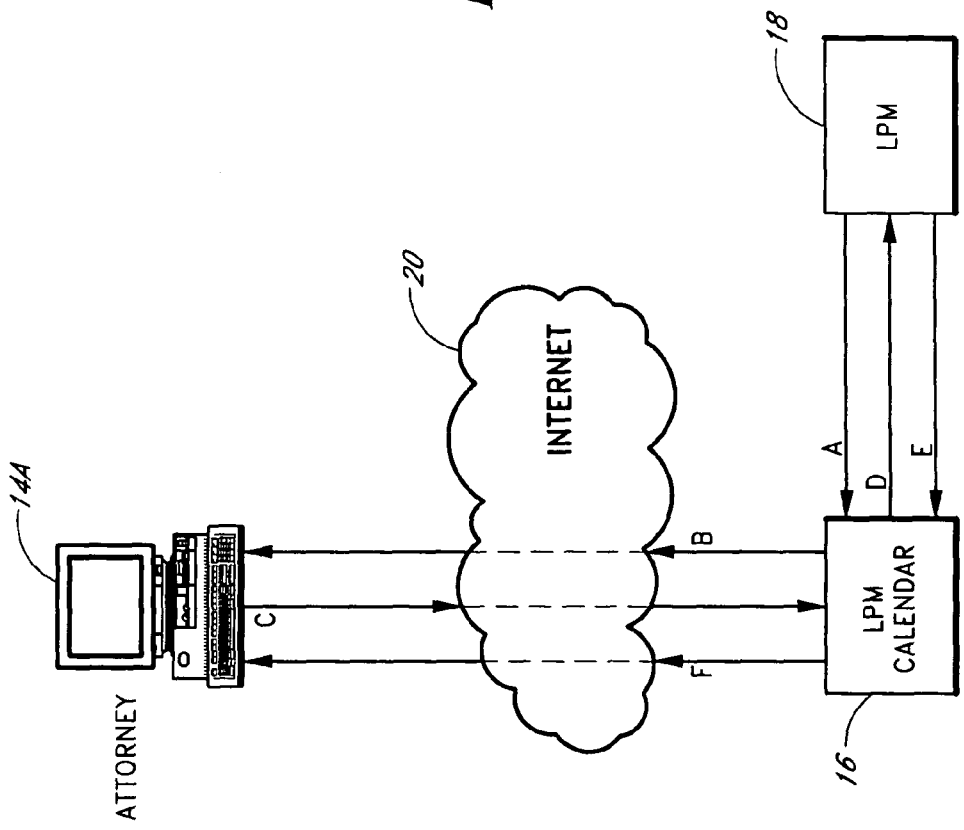
FIG. 13 shows communications between a legal process manager and an attorney facilitated by a legal process manager calendar system.

As discussed above, the LPM 18 manages and monitors Users 12-14 through an automated dynamic dialog facilitated by the Calendar System 16. FIG. 13 illustrates an example dialog between the LPM 18 and an Attorney 14 being managed via the LPM Calendar System 16. The communication labeled A represents a Query (with an associated deadline, if appropriate) received by the LPM Calendar System 16 from the LPM 18 via an automated communication protocol. The communication labeled B represents a transmission of the Query by the LPM Calendar System 16 to the Attorney 14 upon his visiting the LPM Calendar 16 web site. The communication labeled C represents a Response (with an associated date and time stamp, if appropriate) transmitted by the Attorney 14 to the LPM Calendar System 16 through the web page interfaces discussed above. The communication labeled D represents an automated transmission of the Response from the LPM Calendar 16 web site to the LPM 18. The transmissions A through D comprise one iteration of the dialog. The second iteration follows the pattern of the first. Namely, the LPM Calendar System 16 receives a "follow up" Query (with associated deadline, if appropriate) from the LPM 18, as shown by the communication labeled E. As with the first iteration, the LPM Calendar System 16 then transmits the new Query to the Attorney 14 upon his visitation to the web site, as shown in the communication labeled F. The exchanges illustrated in FIG. 13 continue as needed throughout the legal process of interest.

Two sample dialogs facilitated by the LPM Calendar System 16 are shown below. The sample dialogs come from post-foreclosure evictions in Florida. Messages received by the LPM Calendar System 16 from the LPM 18 are labeled "LPME." Messages received by the LPM Calendar System 16 from the Attorney 14 are labeled "Attorney."

Example 1 - Simple Florida Eviction

| Source | Send Date | Queries and Responses | Deadline |
|---|---|---|---|
| LPME | June 27 | "Title docs received? Writ app out?" | July 2 |
| Attorney | June 30 | "Title docs received 6/30; Writ expected out 7/02" | |
| LPME | July 1 | "Writ issued?" | July 2 |
| Attorney | July 2 | "Writ out 7/02, awaiting issuance and Lock Out" | |
| LPME | June 3 | "Writ issued? Lockout completed?" | July 10 |
| Attorney | July 9 | "Lock Out completed 7/08" | |

Example 2 - Florida Eviction With a Title Problem

| Source | Send Date | Queries and Responses | Deadline |
|---|---|---|---|
| LPME | June 27 | "Title docs received? Writ app out?" | July 2 |
| Attorney | June 30 | "Title problems discovered; address on CT is incorrect; motion is required to correct error prior to eviction proceeding" | |
| LPME | July 1 | "Motion filed?" | July 7 |
| Attorney | July 10 | "Motion filed 7/09; hearing date is 8/06" | |
| LPME | July 11 | "Results of 8/06 hearing" | August 7 |
| Attorney | August 8 | "Motion granted. New CT issued 8/08. New writ to be out by 8/12" | |
| LPME | August 8 | "Writ issued?" | August 13 |
| Attorney | August 12 | "Writ out 8/11, awaiting Lock Out" | |
| LPME | August 13 | "Writ issued? Lock Out completed?" | August 20 |
| Attorney | August 22 | "Rural area. Sheriff is slow to proceed with Lock Out. Investigating status of lock out, will report status by 8/26" | |
| LPME | August 22 | "If lock out not completed, please advise as to reasons Sheriff has given and Sheriff contact name and number" | August 30 |
| Attorney | August 27 | "Lock Out completed 8/26" | |

The above examples demonstrate the dynamic nature of the dialog allowed by the LPM Calendar System 16. The LPM 18 in the second example had the flexibility to vary from the expected line of queries (as depicted in Example 1) in order to address the unanticipated problem that was encountered. Rather than providing the query "Writ issued?" which may have been generated by a static legal process management system, the LPM 18 in the second example customized the query to fit the circumstances: "Motion filed?" This provides proper guidance for the Attorney 14, and avoids the problem of the attorney appearing to be out of compliance when he or she is not.

In Example 2 above, the LPM Calendar System 16 received a query on July 11 with a deadline of August 8. Because of the relatively long time available before the deadline, it is advantageous to distinguish this query from other queries with closer deadlines that may be provided to the same Attorney 14 in connection with the same or other cases. Accordingly, in one embodiment the LPM Calendar System 16 distinguishes between "active" queries (with short deadlines) and "non-active" queries (with longer deadlines).

Figure 14:
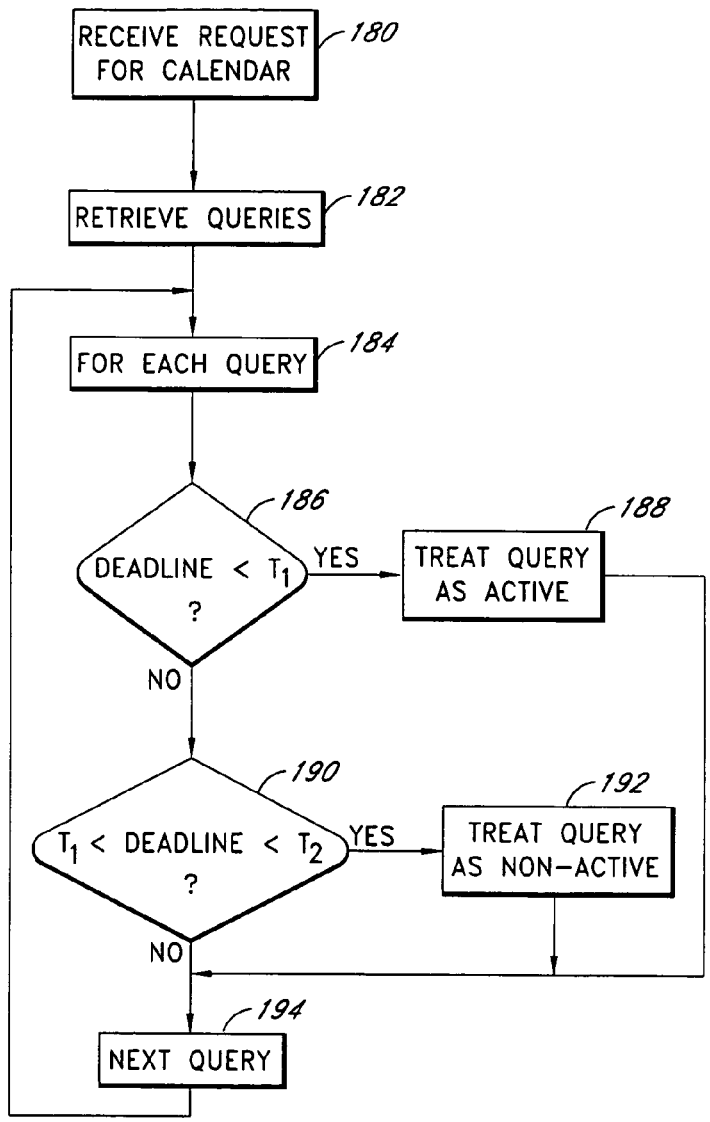
FIG. 14 shows a process followed by the legal process manager calendar system.

FIG. 14 illustrates blocks performed by the LPM Calendar System 16 when a User 12-14 accesses the Active Calendar web page (see FIGS. 7 and 8). In Block 180, the User 12-14 selects an appropriate link within the web site. In Block 182, the Calendar Interface Module 31 retrieves the pending queries for the User 12-14 from the Pending Query Database 46. In Block 184, the Calendar Interface Module 31 selects one of the pending queries. In Block 186, the Calendar Interface Module 31 compares the time remaining for completing the pending query before its associated deadline with a time, $T_1$. The time variable $T_1$ may be set at whatever time frame is deemed proper for the legal process at interest. In one embodiment $T_1$ is set at one week for all Attorneys 14 and two weeks for all Contractors 13. In another embodiment, the time variable $T_1$ may be adjusted for different Users 12-14 based on their past performance or for other reasons. For example, Users 12-14 with a history of missing deadlines may be given a longer variable $T_1$, lengthening the window in which a query appears as "active" and giving the User 12-14 greater time for response. In another embodiment, the variable $T_1$ varies with the nature of the query, such that more demanding queries are associated with larger $T_1$ values.

As shown in Block 188 in FIG. 14, queries with deadlines closer in time than the variable $T_1$ are treated as active. Accordingly, those queries are displayed on the User's Active Calendar web page. In Block 190, the Calendar Interface Module 31 optionally makes a second comparison with a second time variable $T_2$. As shown in Block 192, in this embodiment queries with deadlines falling in the window between $T_1$ and $T_2$ are treated as pending "non-active" queries. These queries are not displayed on the User's Active Calendar, but may be accessed by viewing a web page that shows both active and non-active queries. For queries with deadlines farther off in the future than $T_1$, the query is not treated as active or non-active, and is not viewable by the User 12-14. In Block 194, control is passed back to Block 184, where the analysis is repeated for another pending query. In this manner, the LPM Calendar System 16 can generate an Active Calendar web page displaying only the active queries for the User 12-14.

In one embodiment, $T_2$ is set at two weeks for all Attorneys 14 and four weeks for all Contractors 13. In another embodiment, the second variable $T_2$ and Block 190 are not utilized. Rather, all pending queries that are not "active" are deemed "non-active" and are viewable on a web page that shows both active and non-active queries.

Figure 15:
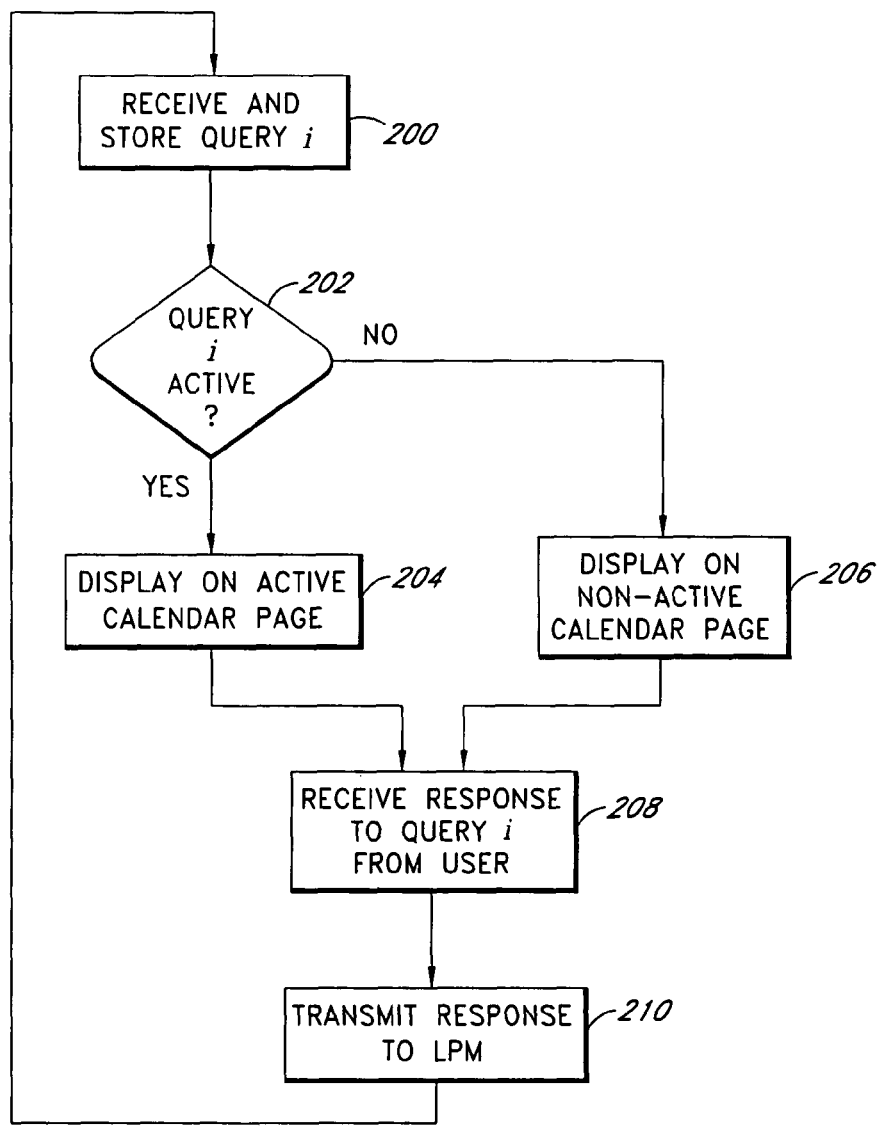
FIG. 15 shows a process followed by the legal process manager calendar system when facilitating a dialog between a legal process manager and a user.

FIG. 15 illustrates blocks performed by the LPM Calendar System 16 when facilitating an automated dialog between the LPM 18 and a User 12-14. In Block 200, the LPM Calendar System 16 receives a query (and associated deadline, if appropriate) from the LPM 18 and stores it as discussed above. In Block 202, the Calendar Interface Module 31 assesses whether the query is active or non-active, as discussed above in connection with FIG. 14. As shown in FIG. 15, active queries are displayed on the Active Calendar web page (Block 204) while non-active queries are displayed on a web page that includes both active and non-active queries (or, optionally, just non-active queries) (Block 206).

In Block 208, the LPM Calendar System 16 receives a response to the query from the User 12-14 as discussed above. While not depicted, this query is then removed from the active calendar and emailed to the LPM 18. In Block 210, the LPM Calendar System 16 uses an automated protocol to transmit the response to the LPM 18. Following the completion of Block 210, control is passed back to a waiting state until Block 200 is repeated with a follow up query.

Because of the importance of time, it is advantageous to have procedures in place for reminders and enforcement procedures for Users 12-14 who fail to comply with the deadlines of their queries. Referring to Example 2, the LPM 18 issued a query on July 1 asking for the filing of a motion with a deadline of July 7. As shown in the example, the Attorney 14 did not respond until July 10, when he informed the LPM 18 that a motion was filed on July 9. Because the Attorney 14 did not respond until after July 7, the LPM Calendar System 16 generates an exception report (i.e. a record of a missed reporting deadline). Because the motion was ultimately filed on July 9, also after the deadline, the LPM Calendar System 16 may receive a second exception report from the LPM 18 (i.e. a record of a missed performance deadline). With the July 7 deadline nearing, the LPM Calendar System 16 may send out a "tickler" e-mail to the Attorney 14 to remind him of the impending deadline. The processes for generating exceptions and reminders are discussed below.

Figure 16:
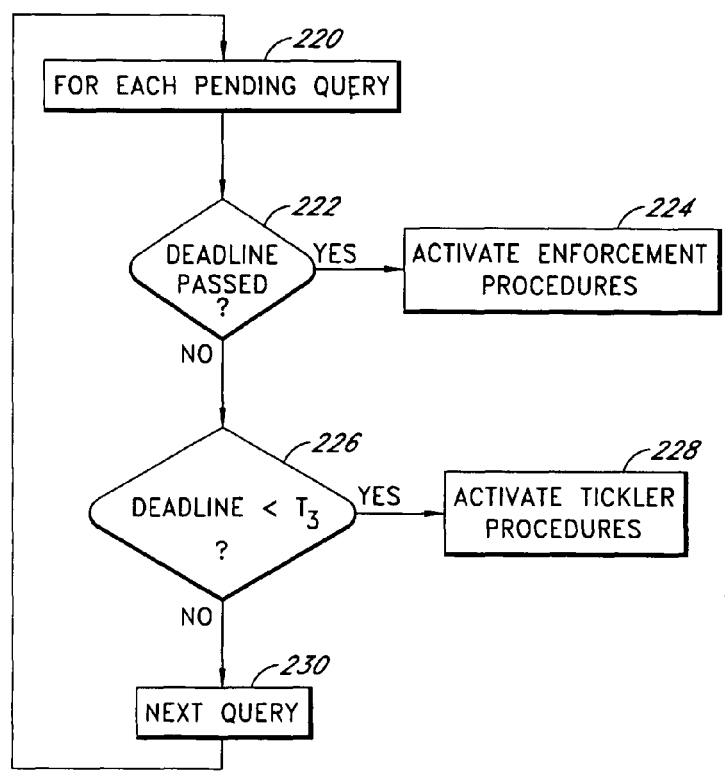
FIG. 16 shows a process followed by the legal process manager calendar system when determining whether to send a reminder notice or take enforcement action in connection with a pending query.

FIG. 16 shows blocks performed by the Exception Module 35 of the LPM Calendar System 16 to provide reminders and enforcement procedures for Users 12-14 who fail to comply with their pending queries and deadlines. In Block 220, the Exception Module 35 retrieves the pending queries for the User 12-14 from the Pending Query Database 46 and selects one. In Block 222, the Exception Module 35 compares the deadline of the query to the internal clock of the LPM Calendar System 16. If the deadline is in the past, in Block 224 the Exception Module 35 activates enforcement procedures, as discussed above. These may include automated e-mails to the User 12-14 and the User's superior(s).

In Block 224, the Exception Module 35 also stores a record of the exception (i.e. the failure to comply with the deadline). The exception record data includes the Case, the User 12-14, the query, and the deadline. When (if ever) the query is later answered, the date (and, optionally, time) of the (untimely) response is also stored with the exception record data. In one embodiment, the LPM Calendar System 16 distinguishes between reporting exceptions and performance exceptions. A reporting exception is the reporting of an act after the deadline (whether or not the act itself was performed late). A performance exception is the reporting of an act as occurring after a deadline.

If the deadline for the query is not in the past, in Block 226 the Exception Module 35 compares the time remaining before the query deadline with a time variable $T_3$. As shown in Block 228, if the time remaining is less than $T_3$, the Exception Module 35 actives reminder (or "tickler") procedures, as discussed above. These may include automated emails to the User 12-14 and the User's superior(s). The time selected for $T_3$ may be constant for all Users 12-14, or it may be adjusted for different Users 12-14 based on their past performance or for other reasons. In one embodiment, $T_3$ is set for two days. In another embodiment, Users 12-14 with a history of missing deadlines are given a longer variable $T_3$, lengthening prompting an earlier warning message (e.g. a tickler email) thus providing the User 12-14 with more time for response. The variable $T_3$ may also vary with the nature of the query, such that more demanding queries are associated with larger $T_3$ values.

Compiling Compliance Data

As discussed above in connection with FIG. 16, the LPM Calendar System 16 maintains a record of each instance for each exception (e.g. each failure to comply with a deadline) triggered by a User 12-14.

Clients 12 may also be using the LPM Calendar System 16 with hundreds of Contractors 13. The LPM Calendar System 16 allows the Client 12 to access the exception data records for the Contractors 13 working on cases for the Client 12. The exception records are maintained over time so that a Client 12 may view the history of exceptions for all of the Contractors 13 who have ever worked on their cases. In one embodiment, the Client 12 may view the history of exceptions for all Contractors 13 whether or not they worked on the Client's cases. Using well-known statistical techniques applied to the exception record data, Clients 12 can compare Contractors 13 on the basis of the time frequency of exceptions, the average lateness of exceptions (e.g., how many days late), and the frequency that different queries result in exceptions.

A Client 12 may utilize the historical data generated by the EBMS to guide their future hiring decisions for Attorneys 14 and Contractors 13. In addition to using the historical data to assess Attorneys 14 and Contractors 13, the Client 12 may also use the historical data to assess the queries themselves. As discussed above, the queries used by the LPM 18 are customarily influenced by the preferences of the Client 12. Upon reviewing the historical data generated by the LPM Calendar System 16, a Client 12 may discover a systematic trend that Attorneys 14 consistently trigger exceptions in response to a completion time for a random frequency event. One explanation for such a result may be that the deadline associated for completion of that event is unrealistic. Accordingly, the Client 12 may consider lengthening the deadline to better fit the realities of the process. In this manner, the historical exception data provides a feedback mechanism whereby Clients 12 may fine-tune and improve the management process over time. For example, the Client 12 may discover from the statistical data that total SIEA, milestone or event completion times should be lengthened during certain times of year (e.g. during the December holiday season).

Alternative LPM System

Figure 17:
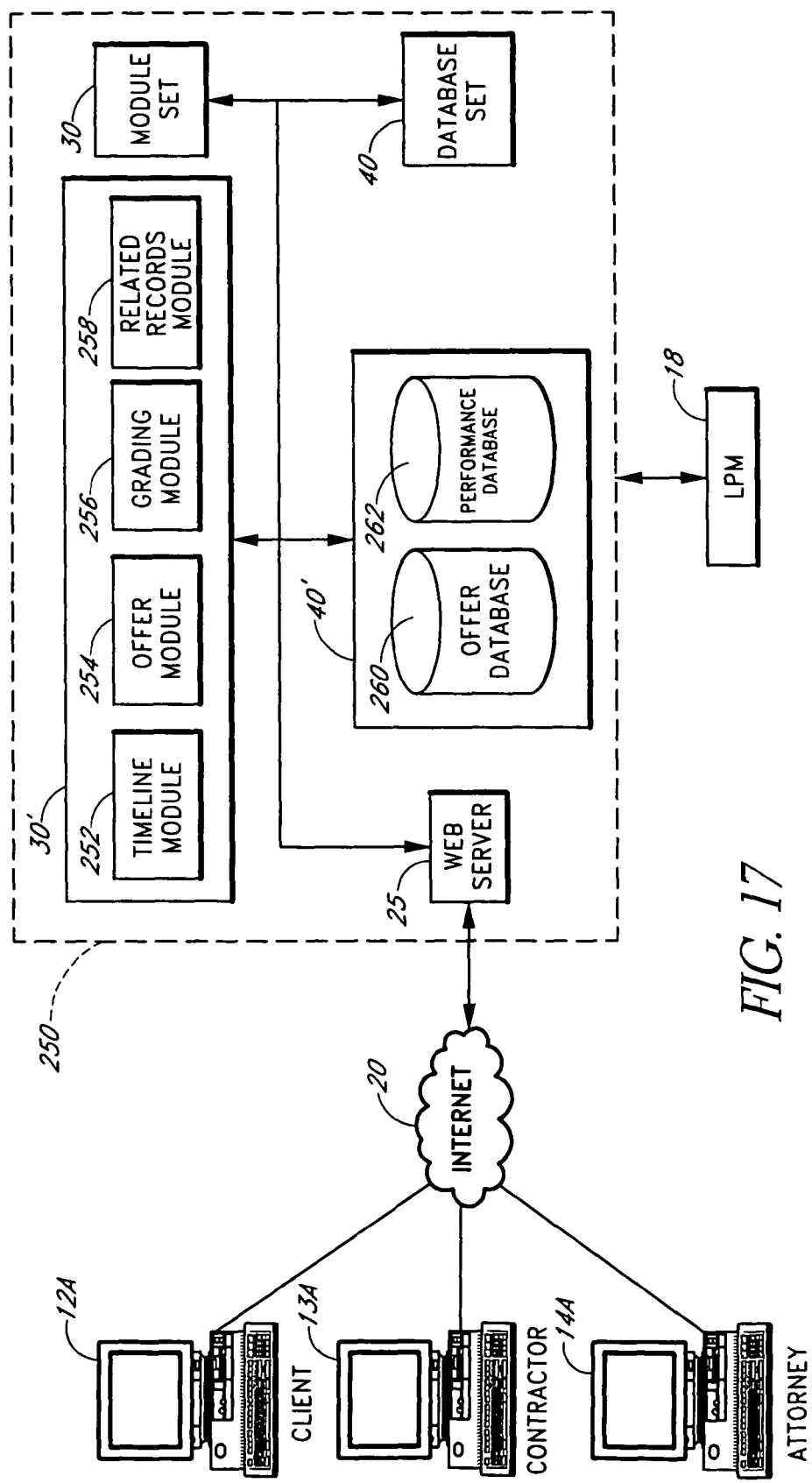
FIG. 17 shows a system in which a service provider may access via a network a web site associated with a legal process manager.

FIG. 17 illustrates a LPM System 250 according to another embodiment. Similar to the LPM Calendar System 16 depicted in FIG. 2, the LPM System 250 includes the web server 25 in communication with the Internet 20. As shown in FIG. 17, Clients 12, Contractors 13, and Attorneys 14 may access the LPM System 250 via the Internet 20 through one or more of the user devices 12A, 13A, or 14A. It is to be understood that the web server 25 may be distributed over one or more physical machines networked in a variety of configurations. In addition, other suitable communication networks may be used in combination with, or in place of, the Internet 20. For example, in other embodiments, local area networks (LANs) and/or wide area networks (WANs) may be used.

FIG. 17 further illustrates the LPM System 250 including the module set 30, the database set 40, a second module set 30', and a second database set 40' in communication with each other and with the web server 25. The illustrated second module set 30' includes a Timeline Module 252, an Offer Module 254, a Grading Module 256, and a Related Records Module 258. The modules 252, 254, 256, and 258 of the second module set 30' are each in communication with each other, the module set 30, the database set 40, the second database set 40', and the web server 25. The modules 252, 254, 256, and 258 provide functionality preferably implemented via computer software and/or hardware. A description of the functions provided by each of the modules 252, 254, 256, and 258 is provided below following a description of the second database set 40'.

In other embodiments, the second module set 30' includes fewer modules than those depicted in FIG. 17. For example, the second module set 30' may function without the Grading Module 256. In yet other embodiments, other modules may be used that work in combination with, or in place of, one or more of the modules 252, 254, 256, and 258. Furthermore, in other embodiments the LPM System 250 may function without one or more modules of the 31-38 of the module set 30 illustrated in FIG. 2. The illustrated second database set 40' includes an Offer Database 260 and a Performance Database 262. The databases 260 and 262 of the second database set 40' are each in communication with each other and with the web server 25, the database set 40, the module set 30, and the second module set 30'.

In one embodiment, the Offer Database 260 includes information associated with offers relating to the occupancy of a particular property. For example, in one embodiment, the Offer Database 260 contains information relating to "cash-for-keys" offers. The term "cash-for-keys" as used herein is a broad term that refers to, without limitation, payment to an occupant of a property in exchange for the voluntary surrendering possession of, and the removing of personal items from, that property. For example, a broker may offer cash to an occupant who is to be evicted in exchange for the keys to the property. "Cash-for-trash" refers to a similar arrangement as the cash-for-keys offer except that the occupant has the option of surrendering possession of the property without having to remove personal items or other items from the property.

The Offer Database 260 may also include the status of any offers relating to the property. For example, the Offer Database 260 may store updated information as to whether an offer has been accepted or rejected, has expired or closed, or is currently pending. Furthermore, the Offer Database 260 may include information relating to the amount of the offer, dates associated with the offer, and/or other terms or details of the offer.

The illustrated Performance Database 262 includes information associated with the performance of service providers, such as Contractors 13 and/or Attorneys 14. For example, the Performance Database 262 may include historical data relating to a service provider's compliance with deadlines. The Performance Database 262 may also include information regarding the completeness, accuracy, and/or timeliness of a service provider's response to particular queries. In addition, the Performance Database 262 may store various algorithms usable to evaluate the performance of one or more service providers.

In other embodiments, the second database set 40' includes fewer modules than those depicted in FIG. 17. For example, the second database set 40' may function without the performance database 262. In yet other embodiments, the second database set 40' may include other databases that work in combination with, or in place of, one or both of the databases 260 and 262. Furthermore, in other embodiments, the LPM system 250 may function without one or more of the databases 42, 44, 46, and 48 of the database set 40 illustrated in FIG. 2. The second database set 40' may be configured in any number of ways as one or more logical descriptors that may include, but are not limited to, databases, tables, views, constraints, processes, procedures, datasets, recordsets, and metadata. One or both of the databases 260 and 262 may communicate with each other and/or with one or more of the modules 252, 254, 256, and 258 so as to allow the storage, transfer, and processing of information as needed to perform the processes described herein. Furthermore, it is to be understood that the associations between the various types of information in the databases as described above may be provided through pointers or other means.

The functionality associated with the modules 252, 254, 256 and 258 of the second module set 30' will now be described. Referring to FIG. 17, the Timeline Module 252 receives and displays information associated with the status and/or service provider performance in a particular matter. For example, the Timeline Module 252 may generate a web page that displays to the user time-lined tasks associated with a particular matter. In one embodiment, the matter may involve an eviction, a post-foreclosure action, a litigation-related matter, and like matters that include a set of tasks that may be performed in an established sequence and/or in accordance with specified dates. In one embodiment, the Timeline Module 252 communicates with the Case Database 42 to retrieve stored task information for a particular matter.

The Offer Module 254 receives and displays information related to offers associated with the occupancy of a particular property. In one embodiment, the Offer Module 254 may retrieve and/or store such information in the Offer Database 260. Preferably, the Offer Module 254 generates a web page, or other graphical user interface, that displays to the user information associated with particular offers, such as for example, the status and/or the deadlines of outstanding offers. In other embodiments, the Offer Module 254 may search for files or matters in need of an offer, search for files or matters in which a response to an offer is needed, search for files or matters in which an accepted offer's vacate date has passed, and/or the like.

The Grading Module 256 processes and/or displays information associated with the performance of one or more service providers. In one embodiment, the Grading Module 256 assesses the performance of a service provider, such as the Contractor 13 or the Attorney 14, according to a mathematical algorithm that takes into account multiple variables. For example, the Grading Module 256 may process data relating to the timeliness of a service provider's responses. For instance, the Grading Module 256 may process data relating to the timeliness of: (1) an attorney's responses to particular queries or (2) occupancy status updates provided by a broker. The Grading Module 256 may also take into account the performance of a service provider against aggregate timelines and/or against discrete procedural milestone timelines. Furthermore, the Grading Module 256 may take into account requested extensions of time due to "legitimate" reasons, such as for unforeseen complications with the enforcement action process.

In one embodiment, the Grading Module 256 assesses an individual's performance in a single matter. In a further embodiment, the Grading Module 256 assesses an individual's performance in a particular task within a matter. In yet other embodiments, the Grading Module 256 assesses a group of related service providers. For example, the Grading Module 256 may assess a particular firm of attorneys or brokers. Such an assessment may assist clients in selecting service providers who best fit the client's needs or who have favorable performance ratings.

The Related Records Module 258 links and displays records that are associated with a particular property. In one embodiment, the Related Records, Module 258 associates records that are related through a common property identification, such as a property loan number. For example, the Related Records Module 258 may link together and display all the records having the same unique loan number. Such records may relate to, for example, one or more of the following: a post-foreclosure eviction, a post-foreclosure bankruptcy relief-from-stay motion, a post-foreclosure bankruptcy objection-to-plan action, pre-foreclosure bankruptcy relief-from-stay motion, a pre-foreclosure bankruptcy objection-to-plan action, a foreclosure action, a pre-foreclosure proof of claim action, a landlord-tenant eviction action, a replevin action, a cash-for-keys offer, a cash-for-trash offer, and the like.

In one embodiment, the related records are associated with each other through at least one relational database. In other embodiments, the related records are associated through data structures, such as tables and/or linked lists, or through pointers.

In one embodiment, the Records Module 258 may link and/or display records that are input by multiple service providers, including multiple types of service providers. For example, the Records Module 258 may link and/or display a first record input by a broker and a second record input by an attorney. Such an embodiment allows a service provider (e.g., an attorney) to have access to information concerning another type of service provider (e.g., a broker).

Figure 18:
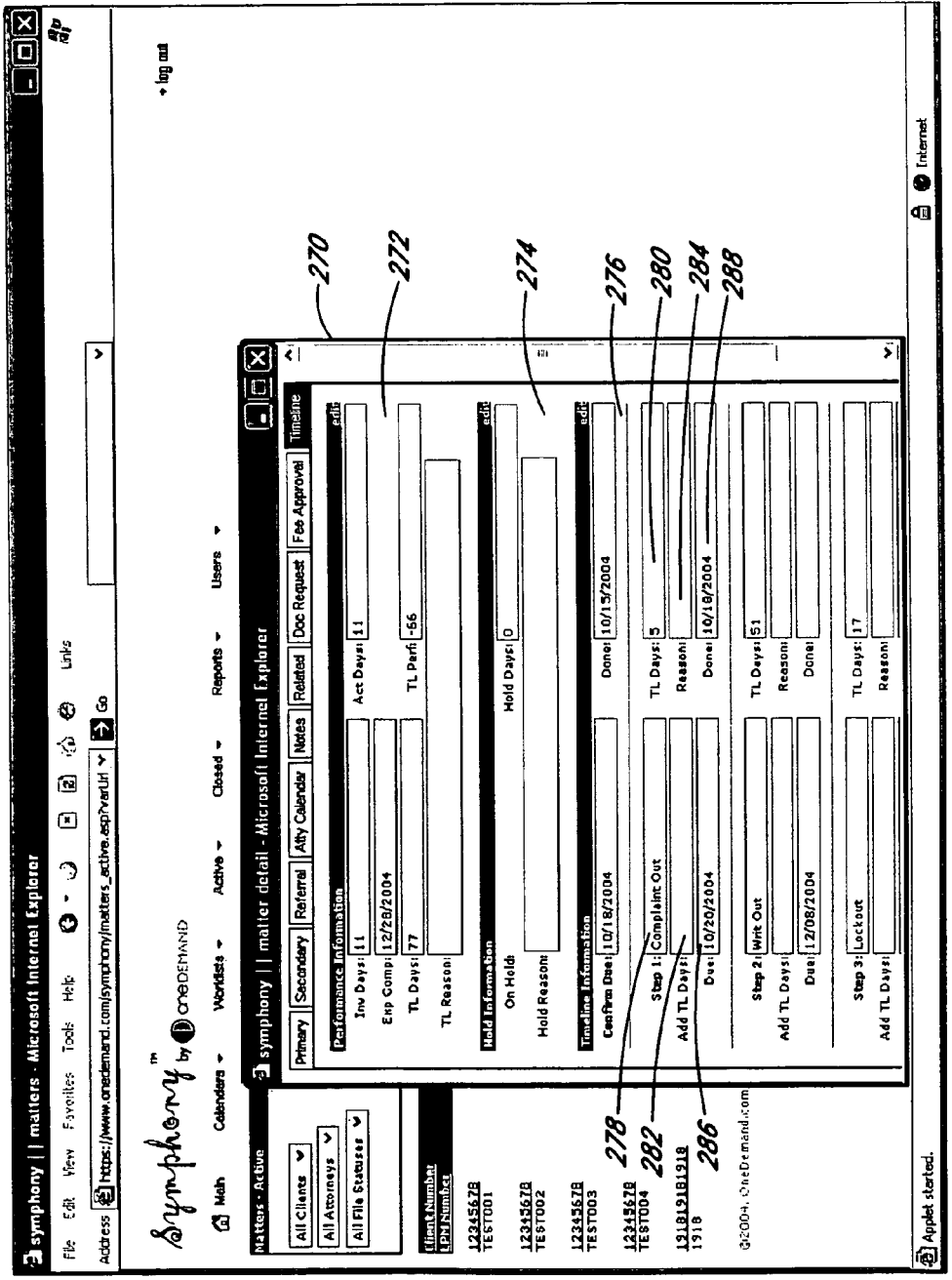
FIG. 18 shows a web page containing a dialog interface that allows a service provider to view queries and submit responsive information.

FIG. 18 illustrates an exemplary Timeline web page 270 allows a service provider to view queries and information associated with timelined tasks for a particular matter. In one embodiment, the user accesses the Timeline web page 270 through a link, such as a hypertext link, a drop-down menu, a tab, or the like. The web page 270 includes a Performance Information section 272, a Hold Information section 274, and a Timeline Information section 276. In other embodiments, other types of information or sections may be included. The Timeline Information section 276 further includes data relating to the performance of particular tasks (identified as numbered steps) for the selected matter. For example, in the illustrated Timeline Information section 276, "Step 1" is associated with a "Complaint Out" task, which is identified in a Task window 278. A Timeline window 280 identifies how much time has been allotted for the particular task. For example, the illustrated Timeline window 280 displays a task period in units of one (1) day. Other units of time may be used.

The Timeline Information section 276 further includes an Extend Timeline window 282 and an associated Reason window 284. In one embodiment, the Extend Timeline window 282 allows the LPM 18, in response to a request for an extension of time, to extend the number of days given to complete a particular task. For example, the LPM 18 may input a particular number of days to be added to the number of days displayed in the Timeline window 280. The LPM 18 may also input in the Reason window 284 the reasons given for the requested extension. In one embodiment, the Extend Timeline window 282 and corresponding Reason window 284 allow the LPM 18 to increase the number of allotted days for legitimate reasons. For example, the LPM 18 may be able to request a time extension due to unforeseen complications, such as a local natural disaster, or due to unforeseen extra steps required in the particular enforcement action process.

In one embodiment, the Timeline Module 252 automatically adjusts the number of days displayed in the Timeline window 280 if the deadline initially falls on a weekend or a holiday. For example, if the initial deadline falls on a Sunday, the Timeline Module 252 may add a day to the number in the Timeline window 280 such that the new deadline falls on a Monday. In other embodiments, inputting an extension of time in the Extend Timeline window 282 causes the Timeline Module 252 to adjust other dates, including the projected completion date for the entire mater.

The illustrated Timeline Information section 276 further includes a Due Date window 286 and a Task Done window 288. In one embodiment, portions of the Due Date window 286 and/or the Task Done window 288 are highlighted based on the current status of the task. For example, the Due Date window 286 may be highlighted a particular color, such as yellow, when the particular task is the current task to be completed by a service provider. As another example, the Task Done window 288 may be highlighted red when a particular task is overdue. In other embodiments, other colors and/or methods may be used to indicate the status of a particular task.

In other embodiments, other information may be displayed or collected by the Timeline web page 270. In yet other embodiments, not all of the information depicted in FIG. 18 is available to and/or modifiable by all types of users. For example, a service provider, such as the Contractor 13 or the Attorney 14, may be prevented from inputting information in the Extend Timeline window 282. In a further embodiment, neither the Extend Timeline window 282 nor the Reason window 284 is displayed to certain service providers, such as brokers. In other embodiments, the Timeline Module 252 may list on the Timeline web page 270 the files or matters that need to be closed.

Figure 19:
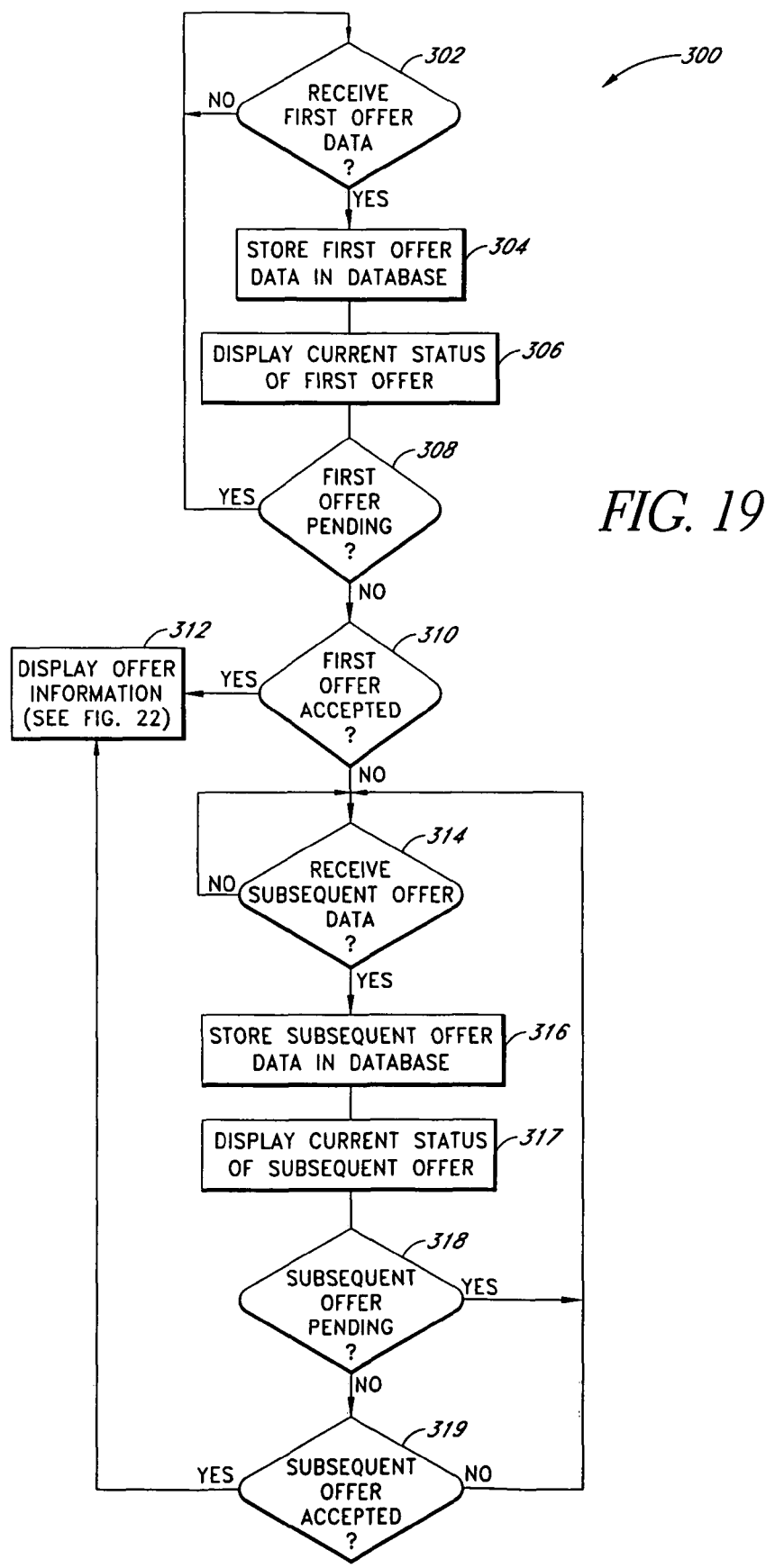
FIG. 19 shows an offer management process executable by the legal process management system of FIG. 17.

FIG. 19 illustrates an exemplary offer management process 300 executable by a legal management system. For exemplary purposes, the blocks illustrated in FIG. 19 will be described with reference to the LPM System 250 of FIG. 17.

At Block 302, the Offer Module 254 waits to receive data indicative of a first offer relating to a particular property. In one embodiment, the offer is a "cash-for-keys" offer. In other embodiments, the offer is a "cash-for trash" offer or the like. Preferably, the Offer Module 254 receives the offer data from a service provider, such as a broker. The offer data may include a wide variety of information including, for example, the offer status, the vacate date, the offer amount, the expiration date of the offer, the type of the offer, combinations of the same, or the like. Furthermore, the Offer Module 254 may automatically update the offer data, such as after the established expiration date of an offer, without the need for user input. When the Offer Module 254 receives the first offer data, the Offer Module 254 then at Block 304 stores the offer data in a database, such as the Offer Database 260. At Block 306, the Offer Module 254 displays the current status of the first offer. For example, the Offer Module 254 may communicate the first offer status through a web page, a text message, or the like. Examples of offer status include: accepted, rejected, expired, cancelled, pending, and the like.

At Block 308, the Offer Module 254 determines if the first offer is pending. If the first offer is pending, the process 300 returns to Block 302 to await additional information relating to the first offer. If the first offer is no longer pending (e.g., accepted, rejected, expired, or cancelled), the Offer Module 254 in Block 310 determines if the first offer was accepted.

If the first offer was accepted, the process 300 proceeds with Block 312, and the Offer Module 254 displays information relating to the accepted offer. In one embodiment, the Offer Module 254 displays information relating to the terms of the agreement resulting from the accepted offer. An exemplary embodiment of a web page that may display such information is illustrated in more detail in FIG. 22. In other embodiments, the Offer Module 254 may display a summary of the terms of the accepted offer.

If the first offer was not accepted, the process 300 continues with Block 314. At Block 314, the Offer Module 254 waits to receive data indicative of a subsequent offer associated with the same property as the first offer. When the Offer Module 254 receives this subsequent offer data, the process 300 continues with Block 316. At Block 316, the Offer Module 254 stores the subsequent offer data in a database, such as the Offer Database 260 of FIG. 17. At Block 317, the Offer Module 254 displays the current status of the subsequent offer. The process 300 then proceeds with Block 318.

At Block 318, the Offer Module 254 determines if the subsequent offer is pending. If the subsequent offer is pending, the process 300 returns to Block 314 to await additional information relating to the subsequent offer. If the subsequent offer is no longer pending, the Offer Module 254 in Block 319 determines if the subsequent offer was accepted. If the subsequent offer was accepted, the process 300 proceeds with Block 312, and the Offer Module 254 displays information relating to the accepted offer. If the subsequent offer was not accepted, the process 300 returns to Block 314 to receive data relating to another offer associated with the same property. Although described with reference to the foregoing embodiments, a wide variety of alternatives exist for the process 300. For example, in one embodiment, the process 300 may be executed without Block 312 such that information with respect to an accepted offer is not displayed to certain classes of users.

Figure 20:
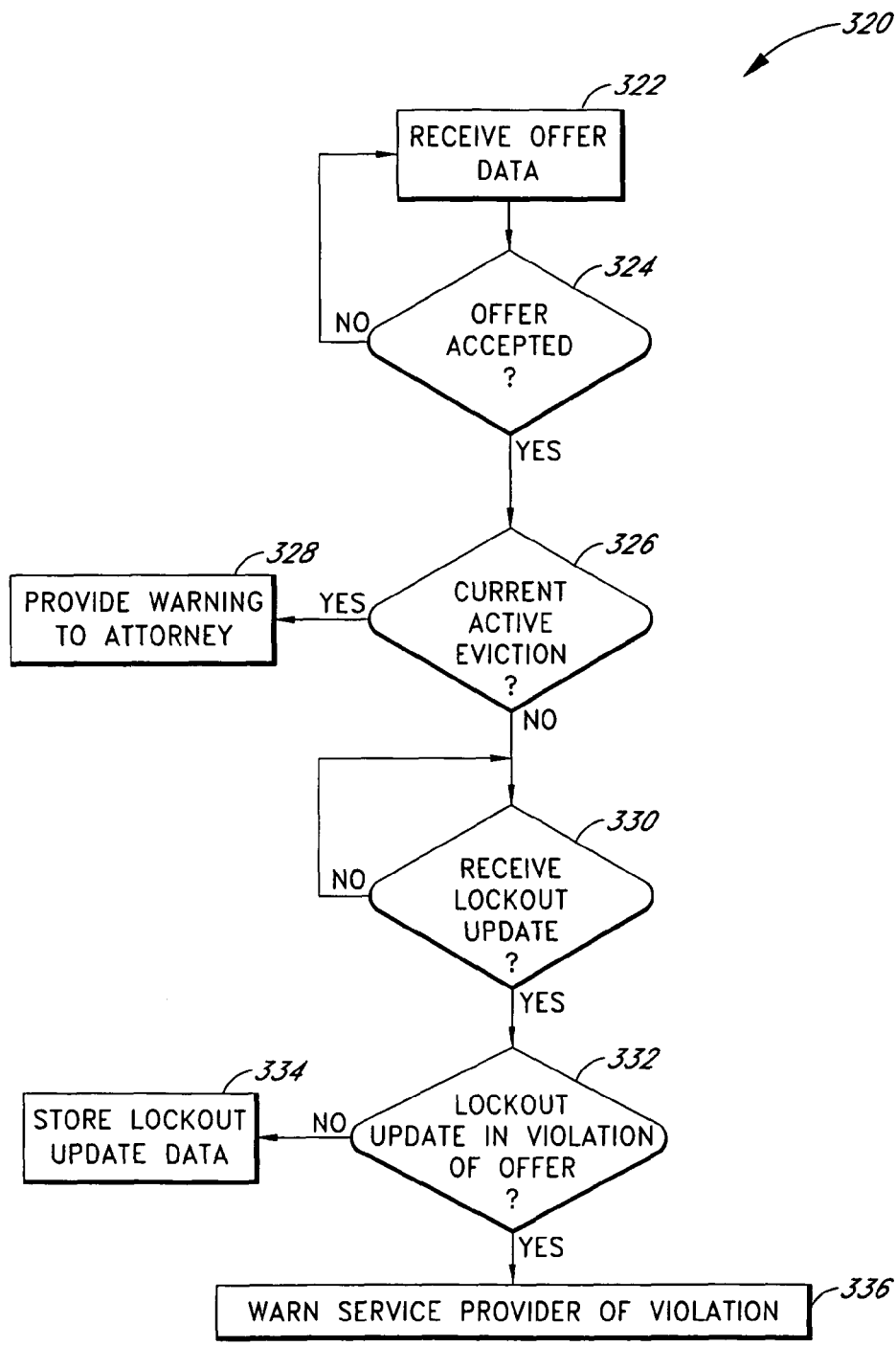
FIG. 20 shows an offer management process executable by the legal process management system of FIG. 17.

FIG. 20 illustrates another exemplary embodiment of an offer management process 320 executable by a legal process management system. For exemplary purposes, the blocks in FIG. 20 will be described with reference to the LPM System 250 of FIG. 17.

The process 320 begins with Block 322 in which the Offer Module 254 receives offer data. In one embodiment, the offer data relates to a cash-for-keys offer, which is described in more detail above. At Block 324, the Offer Module 254 determines if the offer data indicates that an offer was accepted. If the offer was not accepted, the process 320 returns to Block 322.

If the offer was accepted, the Offer Module 254 in Block 326 determines if there is a concurrent active eviction on the property associated with the accepted offer. For example, the Offer Module 254 may access data in the Case Database 42 to determine if there are any active evictions. If there is a concurrent active eviction on the property, the Offer Module 254 warns the Attorney 14 that an offer was accepted on the particular property. Such a warning alerts the Attorney 14 of a possible conflict between the eviction and the terms of the accepted offer and allows the Attorney 14 to take corrective action, if necessary.

If there is no concurrent eviction associated with the property, the process 300 proceeds with Block 330. At Block 330, the Offer Module 254 determines if a lockout update is entered in an eviction matter for the particular property. If a lockout update is received, the Offer Module 254 at Block 332 determines if the lockout update is in violation of the terms of the accepted offer. If the lockout update does not violate the terms of the accepted offer, the Offer Module 254 at Block 334 stores the updated lockout data.

However, if the lockout update does violate the terms of the accepted offer, the process 320 proceeds with Block 336. At Block 336, the Offer Module 254 warns the service provider that the lockout update violates the terms of an accepted offer associated with the occupancy of the property. In one embodiment, the Offer Module 254 does not permit the input of the lockout data that violates the accepted offer terms. This warning allows the service provider to take possible corrective action.

Figure 21A:
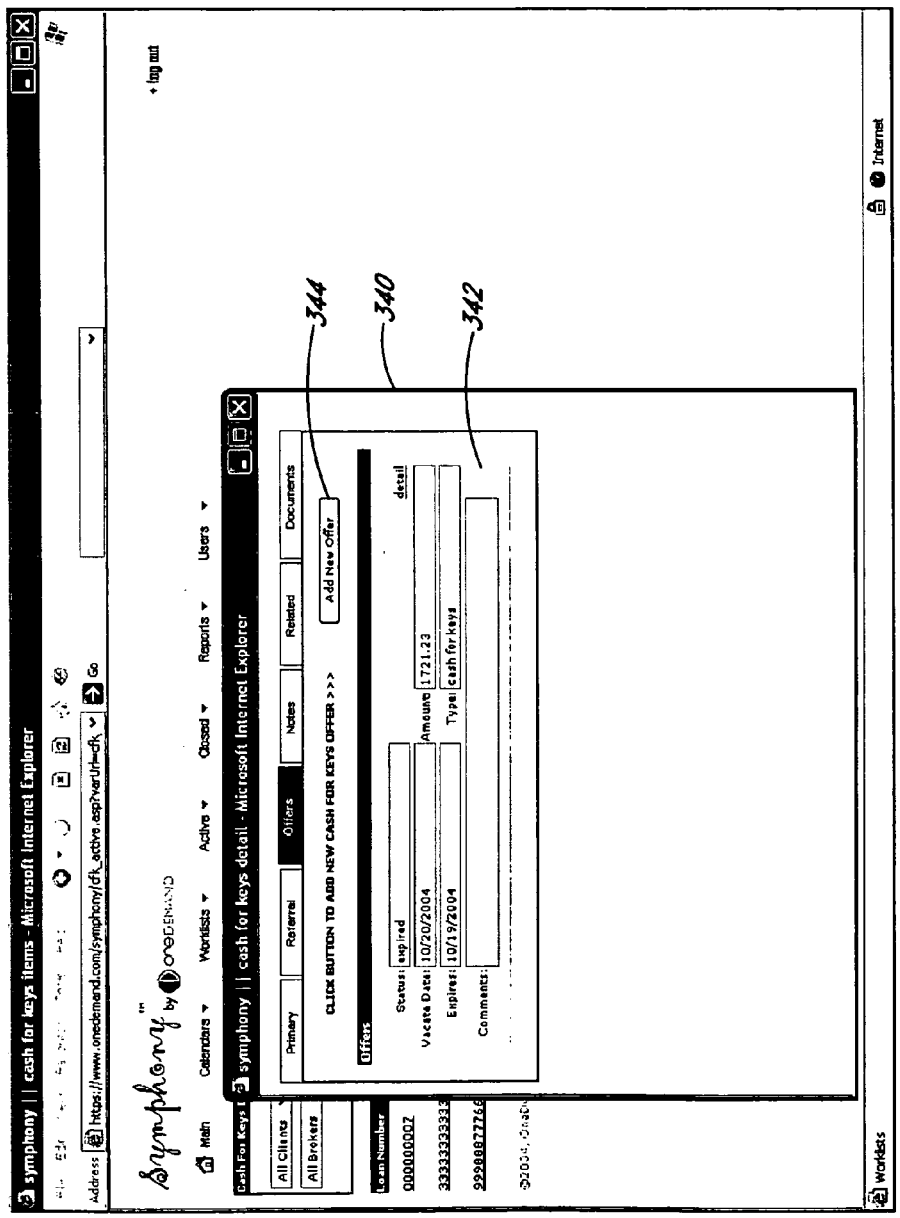
FIG. 21A shows a web page containing a dialog interface that allows for the input and display of information indicative of offers.
Figure 21B:
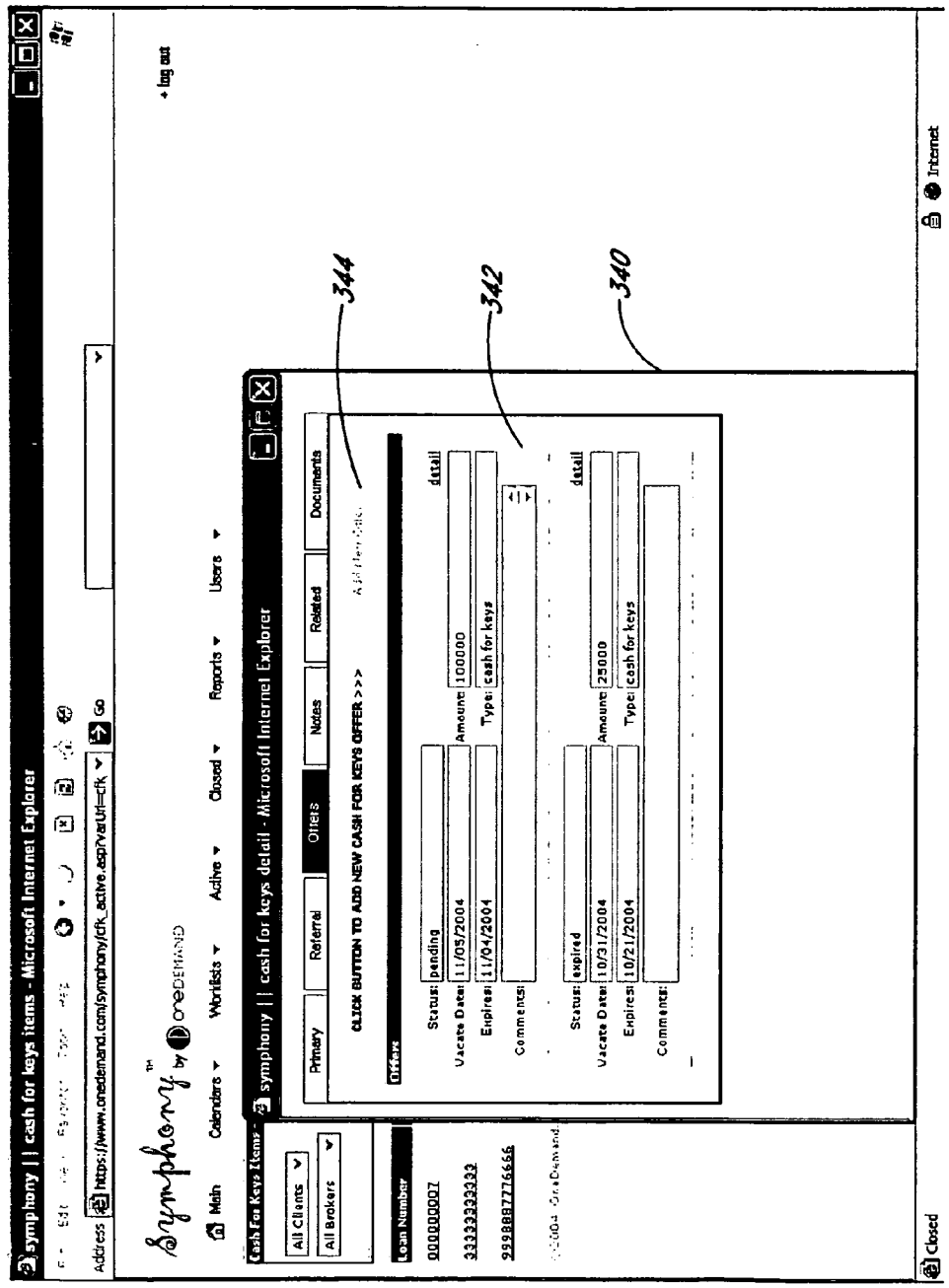
FIG. 21B shows a web page containing a dialog interface that allows for the input and display of information indicative of offers.

FIGS. 21A and 21B illustrate an Offers web page 340 containing a dialog interface that allows for the input and display of offer information. In one embodiment, the Offers web page 340 is controlled and/or updated by the Offer Module 254. The illustrated Offers web page 340 further contains an Offers section 342 and an Add Offer link 344.

The illustrated Offers section 342 displays various details with respect to at least one offer associated with the particular property. For example, the Offers section 342 displays information relating to the status of the offer, the proposed vacate date, the amount offered, the expiration date or time duration of the offer, the type of the offer, and additional comments. The Offers section 342 also includes a "Details" link that allows a user to access further information relating to the particular offer. Other embodiments may display more or less information than what is depicted in FIGS. 21A and 21B. For example, the Offers web page 340 may display information relating to multiple offers for the same property.

The Add Offer link 344 provides the user with the option of adding information related to a new offer, which information may be subsequently displayed in the Offer section 342. The Add Offer link 344 comprises a button. However, in other embodiments, the Add Offer link 344 may comprise a hypertext link, a tab, or the like. In one embodiment, the Add Offer link 344 is active when another offer is not pending for the particular property (see FIG. 21A). This helps prevent multiple, co-pending offers for the same property. In one embodiment, the Add Offer link 344, when selected, opens a new window or dialog box that allows for additional input by the user.

On the other hand, if there is a pending offer for the particular property, the Add Offer link 344 is deactivated. As illustrated in FIG. 21B, the Add Offer link 344, may be grayed out. In such an embodiment, the user is not able to add information relating to another offer until all outstanding offers are no longer pending.

Figure 22:
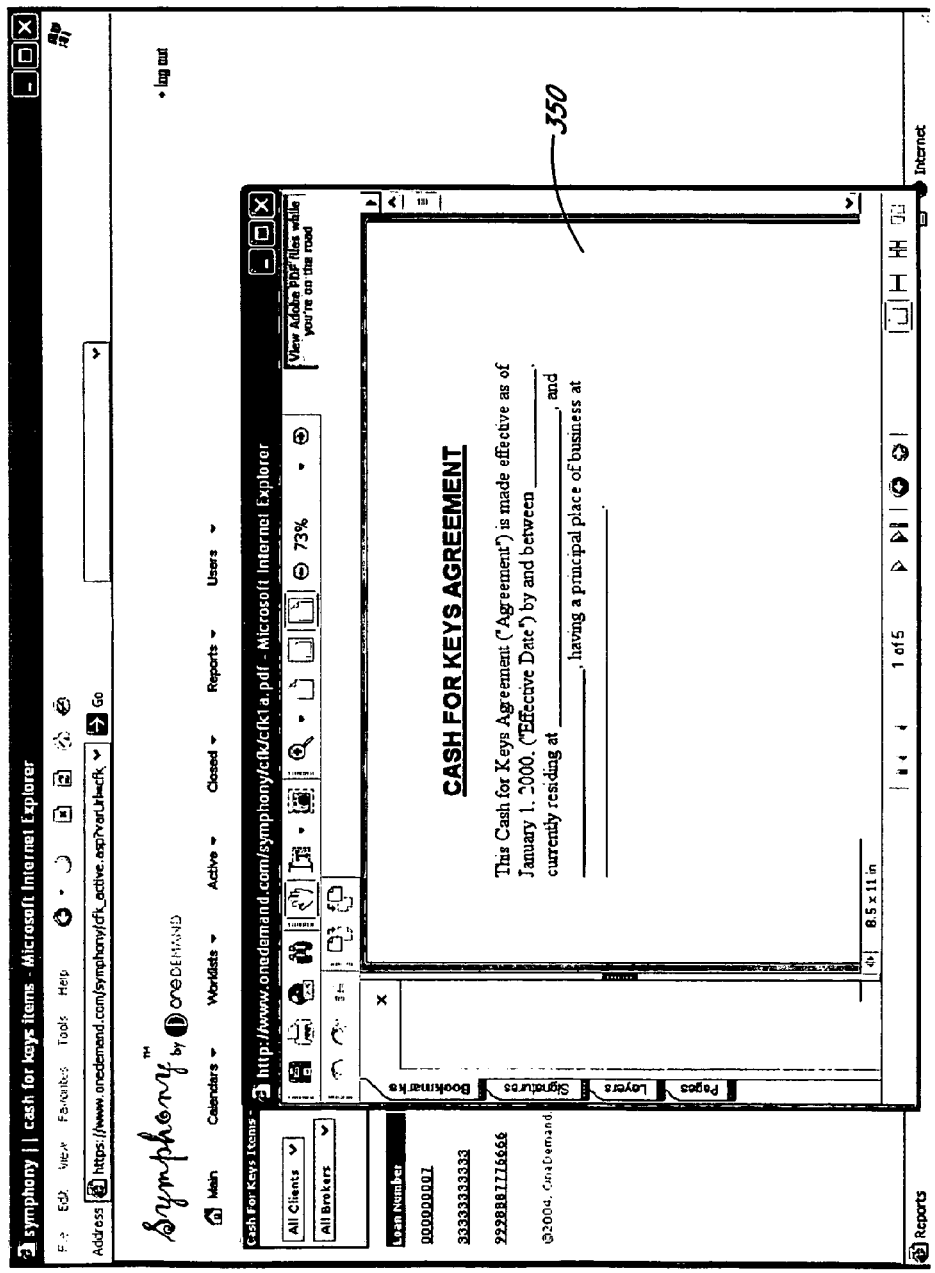
FIG. 22 shows a web page displaying an agreement relating to the occupancy of a particular property.

In one embodiment, if an offer is accepted, the LPM System 250 provides to the user an option to view the accepted offer information. FIG. 22 illustrates an Accepted Offer web page 350 containing information relating to the terms of an accepted offer and/or tax information, such as a W-9 form. For example, the Accepted Offer web page 350 may display a cash-for-keys agreement executed with the property occupant. The agreement may be displayed in any format that is readable by a user of the LPM System 250. For instance, the agreement may be in HTML format, in Word (.DOC) format, in PDF format, or the like.

Figure 23:
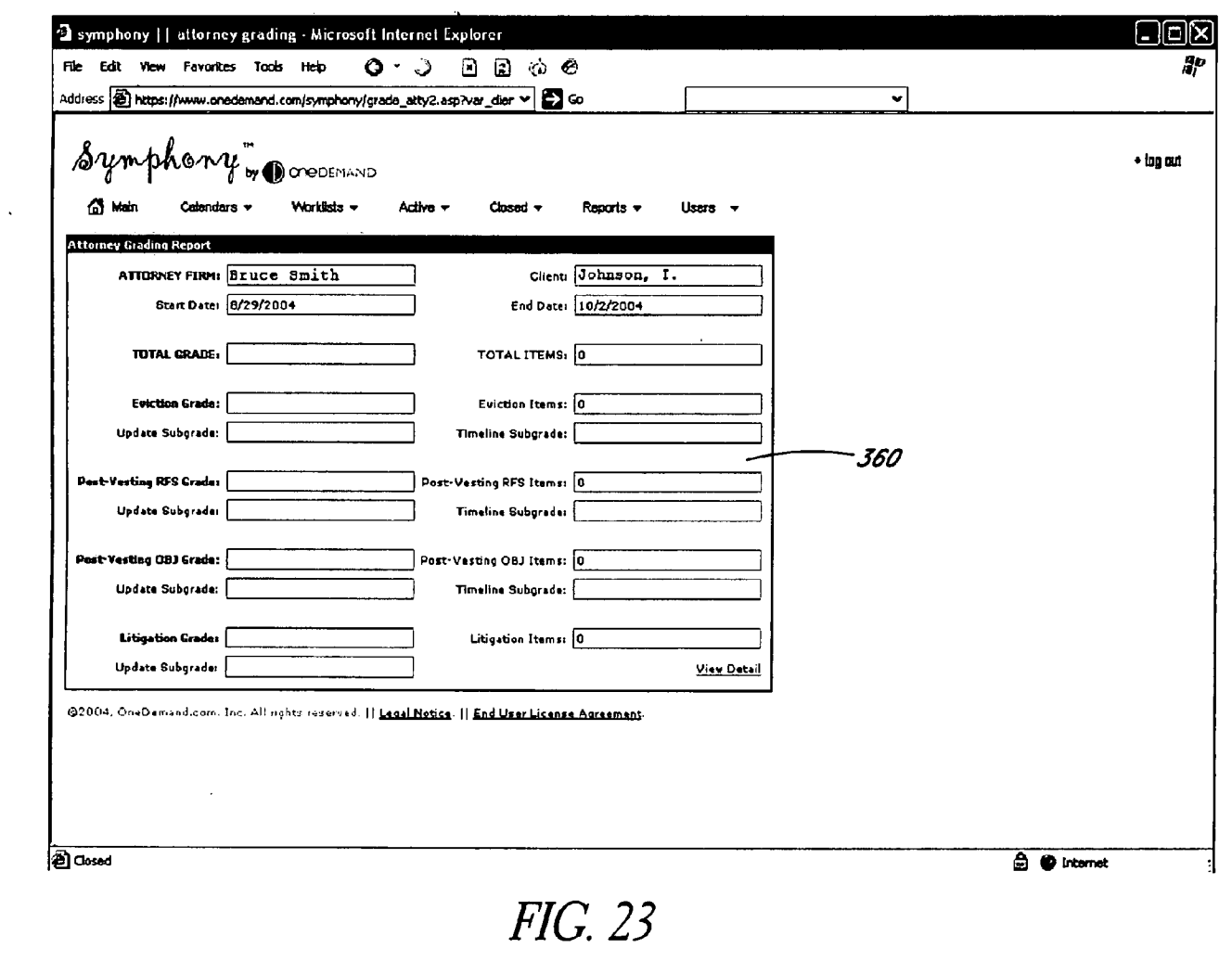

FIG. 23 illustrates a Grading web page 360 that contains assessment information concerning the performance of one or more service providers, according to one embodiment. The illustrated Grading web page 360 provides the user with the option of reviewing the assessment of one or more Attorneys 14. In particular, the performance assessment may relate to a single matter, to multiple related matters (e.g., all evictions), or to all matters handled by one or more Attorneys 14. Preferably, the Grading web page 360 is controlled and/or updated by the Grading Module 256, which may access information stored in the Performance Database 262. In other embodiments, the Grading web page 352 may display more or less information that what is depicted in FIG. 23. In yet other embodiments, the Grading web page 352 is only accessible by certain types of users, such as by Clients 12 and Attorneys 14.

Figure 24:
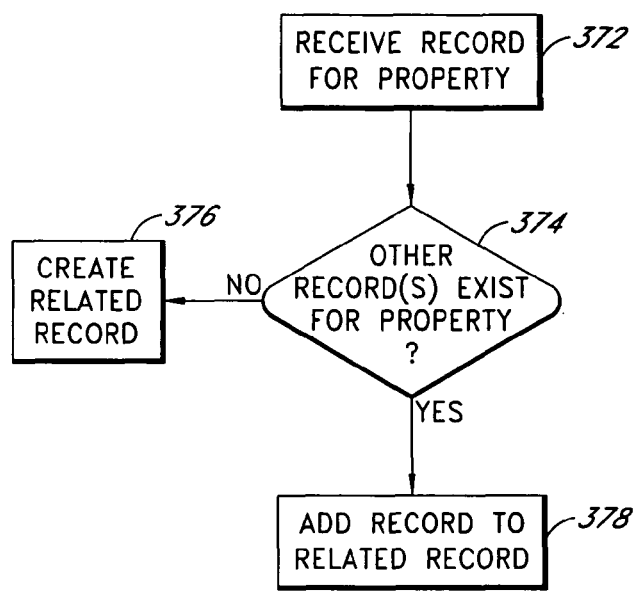
FIG. 24 shows a related records process executable by the legal process management system of FIG. 17.

FIG. 24 illustrates an exemplary embodiment of a related records process 370 executable by a legal process management system. For exemplary purposes, the blocks in FIG. 24 will be described with reference to the LPM System 250 of FIG. 17.

At Block 372, the Related Records Module 258 receives a record for a particular property. Examples of the various types of records receivable by the Related Record Module 258 are described in more detail above. The Related Records Module 258 may receive information from a service provider or from the LPM 18. At Block 374, the Related Records Module 372 determines if there are other existing records that relate to the same property as the received record. In one embodiment, the Related Records Module 258 searches the Case Database 376 and/or the Offer Database 260 to determine if other related records exist or if a relational database has already been established for the particular property associated with the received record.

If no other records exist for the particular property (i.e., the data received is the only information recorded for the property), the process 370 proceeds with Block 376. At Block 376, the Related Records Module 258 creates a related record that includes the information received about the particular property. In one embodiment, the related record is a relational database established to link all records that are associated with a particular property. In other embodiments, the Related Records Module 258 may utilize tables, linked lists, pointers, and/or other means to associate information. Preferably, the records are associated through a common identification, such as a unique loan number. If other records do exist, or if a relational database has already been created, the Related Records Module 258 at Block 378 associates the newly received record with the other related record(s).

Figure 25:
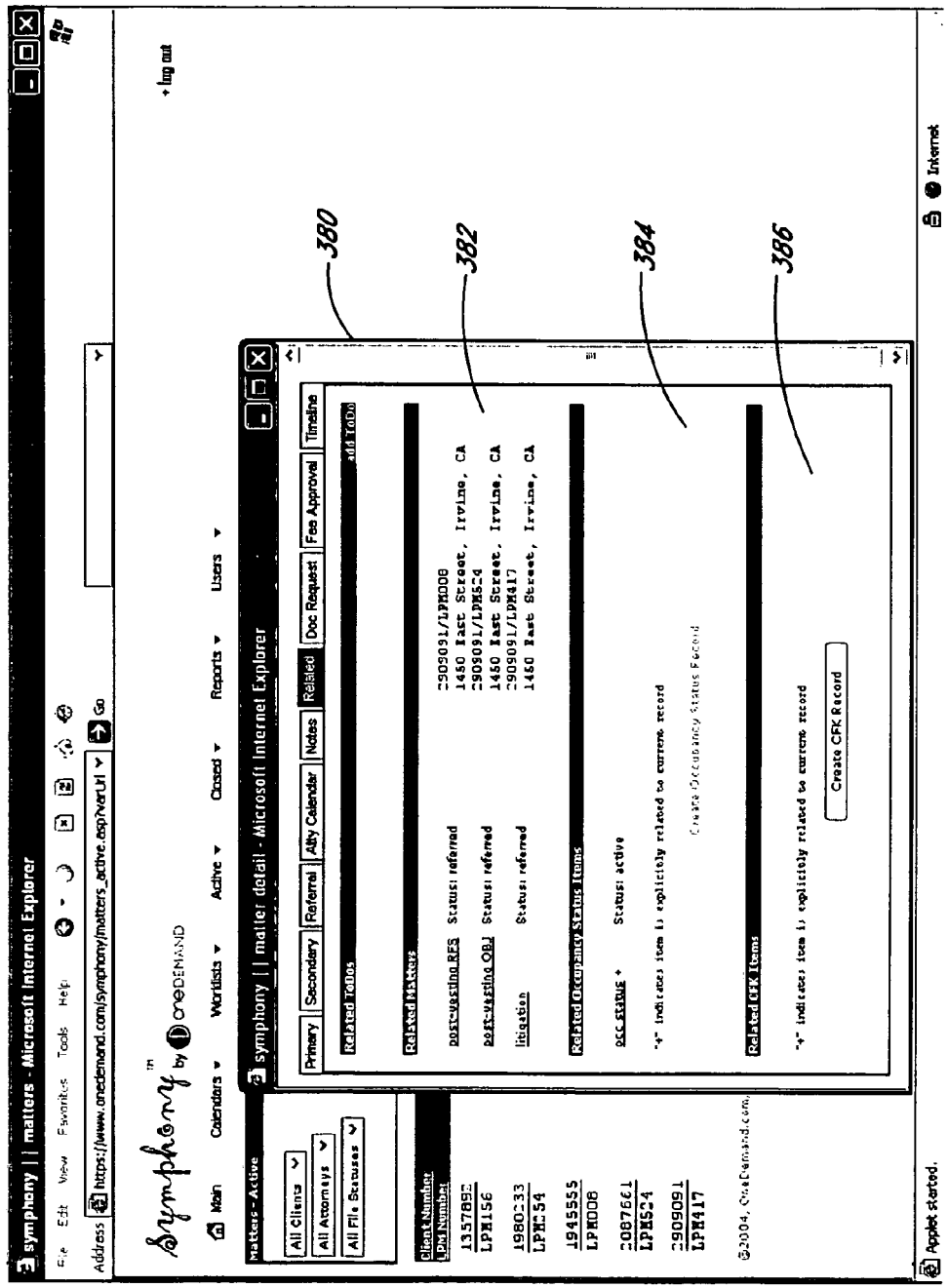
FIG. 25 shows a web page containing information concerning various related records.

FIG. 25 illustrates a Related Records web page 380 that contains information regarding various records associated with a particular property. In particular, the Related Records web page 380 provides the user with a consolidated format wherein the user may access and/or view all the stored records for a particular property. The illustrated Related Records web page 380 contains three sections: a Related Matters section 382, a Related Occupancy Status section 384, and a Related Offers section 386. Each of the sections 382, 384, and 386 displays a brief description of the record, a status of the record, and other information. Users also have the option of creating additional records through the Related Record web page 380. In other embodiments, the Related Records web page 380 may display more or less information than what is depicted in FIG. 25.

In one embodiment, the Related Records web page 380 is accessible by multiple types of service providers. This helps avoid wasted or lost time and/or improper activities. For example, an attorney accessing the Related Records web page 380 may view information regarding any SIEA taken by a broker (such as, for example, a cash-for-keys offer). Such information may keep the attorney apprised of the broker's actions with respect to a particular property and/or tenant. For instance, the Related Records web page 380 may show that a tenant of a particular property has voluntarily left the property in accordance with a cash-for-keys offer made by the broker. Such information informs the attorney that pursuing court action (e.g., eviction) against the tenant would not be proper. Likewise, a broker accessing the Related Records web page 380 may view actions previously taken or concurrently being taken by an attorney.

The Legal Process Management System.

A preferred embodiment for the processes used by LPM 18 will now be discussed. The preferred LPM 18 accounts for the existence of stochastic (random) processes, in which the same input may or may not produce the same output, depending on whether or not certain processes occur, whose frequency of occurrence is random. The preferred LPM 18 is based on a process-based view that focuses on the processes that determine an outcome. By contrast, prior legal process management systems focus on the outcomes themselves. The preferred LPM 18 uses a system characterized as follows: (1) the core processes that determine the total time to complete a particular SIEA (1) in a particular jurisdiction are driven by events; (2) there are four basic types of events and two basic additional process generating mechanisms (called "process triggers"), the existence and occurrence of which are dependent on SIEA type, SIEA jurisdiction, and the conduct of third parties, e.g. an adverse party or the attorney for an adverse party; (3) the SIEA process structure is dynamic and exhibits itself as a set of milestones which contain events, while having the stochastic potential for additional events and milestones; (4) the set of events and process triggers for each SIEA milestone is finite, which means the events and process triggers can be catalogued and their rate of occurrence and impact on T can be estimated; (5) T is minimized by a system of process controls which identify and manage events and process triggers as such occur in a particular SIEA; and (6) the data derived from the control system can be employed (a) to manage parallel process (such as Loss Mitigation) and (b) to prepare reports for Loan Servicers and investors. The process control system can catalogue events and process triggers by SIEA type and jurisdiction, track both frequency of event and process trigger occurrence and impact on T, create controls which identify both the occurrence of an event or a process trigger and the optimal method to minimize T given the occurrence of that specific event or process trigger, and estimate the impact of a given event or process trigger for a specific SEIA, in a given jurisdiction on an ongoing basis using data derived from actual completed SIEA.

The Stochastic Structure Used by the Legal Process Manager

Figure 26:
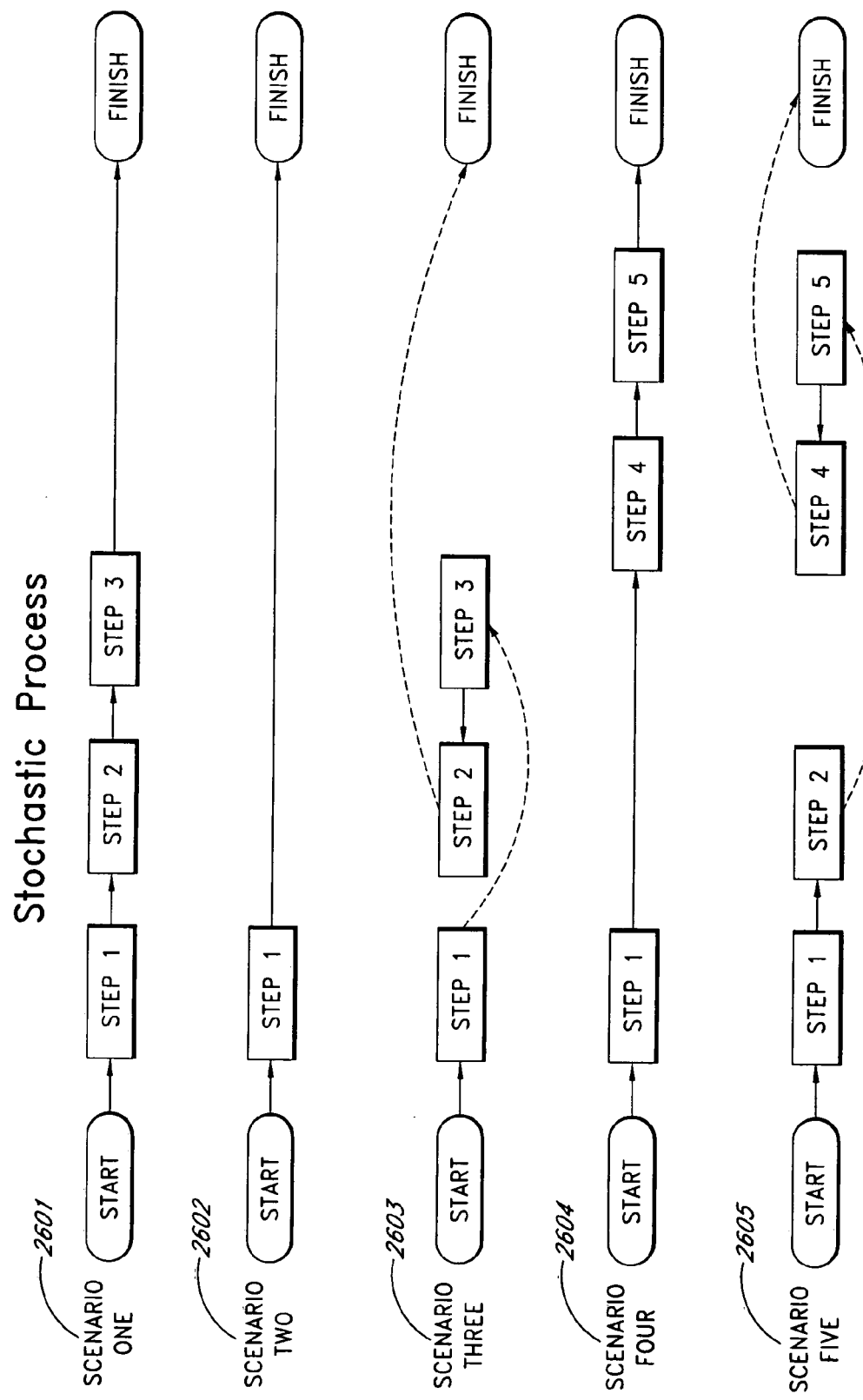
FIG. 26 shows a stochastic security enforcement action system.

Referring to FIG. 26, the preferred LPM 18 uses processes that are stochastic in nature, and are not amendable to illustration through simple process flow diagrams. Rather, the processes used by the preferred LPM 18 are best explained by defining their components, and describing how these components interact, giving snapshots of how the process structure looks at particular times. For stochastic systems, the same inputs, over time, will not produce the same output.

FIG. 26 illustrates examples of how a stochastic system, such as the preferred LPM 18, functions. Scenario One 2601 depicts a process in which step 1 is completed first, then step two, then step three and then steps four and five are skipped. In Scenario Two 2602, only step one is completed and there is no need for steps 2, 3, 4, or 5. In Scenario Three 2603, step 1 is completed first, then step 3, then step 2, and steps 4 and 5 are skipped. In Scenario Four 2604, step 1 is completed first and then step 4 is completed followed by step 5. In Scenario Five 2605, step 1 is completed then step 2, followed by step 5, and then the process moves back to step 4 before finishing. FIG. 26 illustrates only a few examples of how a stochastic process works and is not meant to be exhaustive. A large number of possible combinations exist for how the steps could be completed in a stochastic process. In a stochastic system, the same process flow may be followed for a given number of inputs, but the process flow can then drastically change for another input. The key to designing controls for a stochastic system is to understand its underlying dynamics (i.e., the 'moving parts' and how they interact).

Milestones and Events in the Preferred Legal Process Manager

The milestones employed in the step process structure constitute a finite set of steps completed in some predetermined order, where each milestone is a clear delineation of a new and different step in the process. The nature and type of milestones applied will vary from SIEA type to SIEA type (for example, from a judicial foreclosure action to a post-foreclosure eviction) and within the same type of SIEA, from jurisdiction to jurisdiction (a CA post-foreclosure eviction differs greatly from a PA post-foreclosure eviction). The step process model is implemented in two steps:

Step 1. Identify the relevant milestones for the relevant SIEA within its relevant jurisdiction;

Step 2. Assign a time (t) for each applicable milestone.

Milestone identification (Step 1). The first step identifies a universal set of milestones for specific SIEA types, and then to determines which specific milestones apply. For example, a CA post-foreclosure eviction is commenced by a Notice to Quit (CCP 1161*a*), a Summons and Complaint (CCP 1161), a Judgment, a Writ and a Lock Out. Jurisdictions in other states, for example, may involve a hearing but do not require a Summons and Complaint. FIG. 29 illustrates a table 2901, which is a table of different jurisdictions and their respective steps to complete a post-foreclosure eviction. As illustrated in the table 2901, jurisdictions vary widely in the steps required to complete a post-foreclosure eviction.

Step 2. Assign a time (t) for each assigned milestone. Once the appropriate milestones have been identified for a particular SIEA in a particular jurisdiction, each individual milestone is associated with a specific time for completing it, and this control measure will vary both across and within SIEA types, with the sum of individual step milestones intending to equal T. Because of the increased complexity of the process structure, the process control takes on a more detailed form with the amount of time required to complete each milestone 2702 assigned to its respective milestone.

Figure 28:
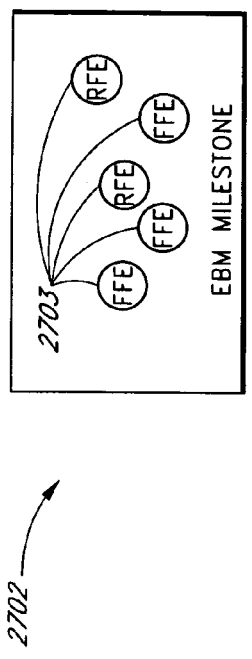
FIG. 28 shows relationships between events and milestones in a stochastic security enforcement action system.

In order to calculate (t) for each milestone, each event is preferably examined. FIG. 28 depicts the relationship between milestones and events. An event is any discrete, identifiable action that needs to be taken by some entity in order for a particular milestone to be achieved; in this way, events provide a roadmap that guides the SIEA from milestone 2702 to milestone 2702A. As can be seen in FIG. 28, Events 2703 are subparts of Milestones 2702. In the event process structure model, milestones 2701 are interpreted as a series of individualized processes that collectively define the SIEA. Milestones 2702 can be thought of as containers and events 2703 as the contents of that container; in this way, a milestone contains any number of events associated with it, as shown in FIG. 28. The system may be referred to as an Event Based Management System (EBMS). The events that occur in an EBMS are both finite and manageable and consist of two distinct sets: fixed-frequency events (which always occur (100% frequency)) and random-frequency events (whose occurrence is stochastic). EBMS interprets the SIEA as a stochastic system and in addition to the two general types of events (fixed-frequency and random-frequency) defines four distinct event types and two types of triggers: fixed frequency/controlled events; fixed frequency/managed events; random frequency/controlled events; random frequency/managed events; external process triggers; and internal process triggers. The sections that follow will define each of these and detail how they interact.

Events can be classified along two distinct dimensions: (1) the frequency of event occurrence and (2) the manner of control over event completion. Events which populate the frequency dimension are of two types: fixed frequency and random frequency. Events which populate the control dimension are also of two types: controlled and managed.

Some events will occur with a fixed frequency, while others will occur with a random frequency throughout the SIEA; and the completion of some events is directly controlled, while others are only indirectly controlled (i.e. "managed"). There are events whose frequency of occurrence will be higher than others and whose incidence of control or lack of control will vary from event to event, depending on contextual details. Thus, events that fill EBMS milestones will consist of one of these four general types: fixed frequency/controlled; fixed frequency/managed; random frequency/controlled; and random frequency/managed.

Fixed frequency events occur in pre-determined and sequential order with 100% frequency. The first event of the set should be completed prior to commencing the second event in the set; the second event should be completed prior to third; and so on. The characteristics of any given set of fixed frequency events will depend upon the SIEA milestone, SEIA type, and SEIA jurisdiction. For example, the fixed frequency events which occur in the "Obtain Judgment" milestone of a Pennsylvania Judicial Foreclosure differ significantly from those which occur in a South Carolina Judicial Foreclosure "Obtain Judgment" milestone, each of which will differ from those which occur in the "Obtain Judgment" milestone of a California post-foreclosure eviction.

Random frequency events occur with random frequency and are generally associated with a process trigger.

A process trigger (also referred to as an "event trigger") is any externally imposed action that either (a) generates addition random frequency evens or an additional set of random frequency events within a particular milestone, or (b) generates an entirely new milestone, with its own unique set of events, within the broader SIEA. There are two types of process triggers: (1) internal triggers and (2) external triggers. An internal process trigger generates additional events within a given milestone, while an external process trigger generates one or more additional milestones. That is, an internal process trigger adds events into a milestone, while an external process trigger creates an entirely new milestone with its own unique set of events.

The occurrence or non-occurrence of a process trigger is not known with certainty in advance, so events associated with a particular trigger are considered to occur with a randomly distributed frequency. The process trigger is responsible for setting a new event or series of events into motion.

Figure 35E:
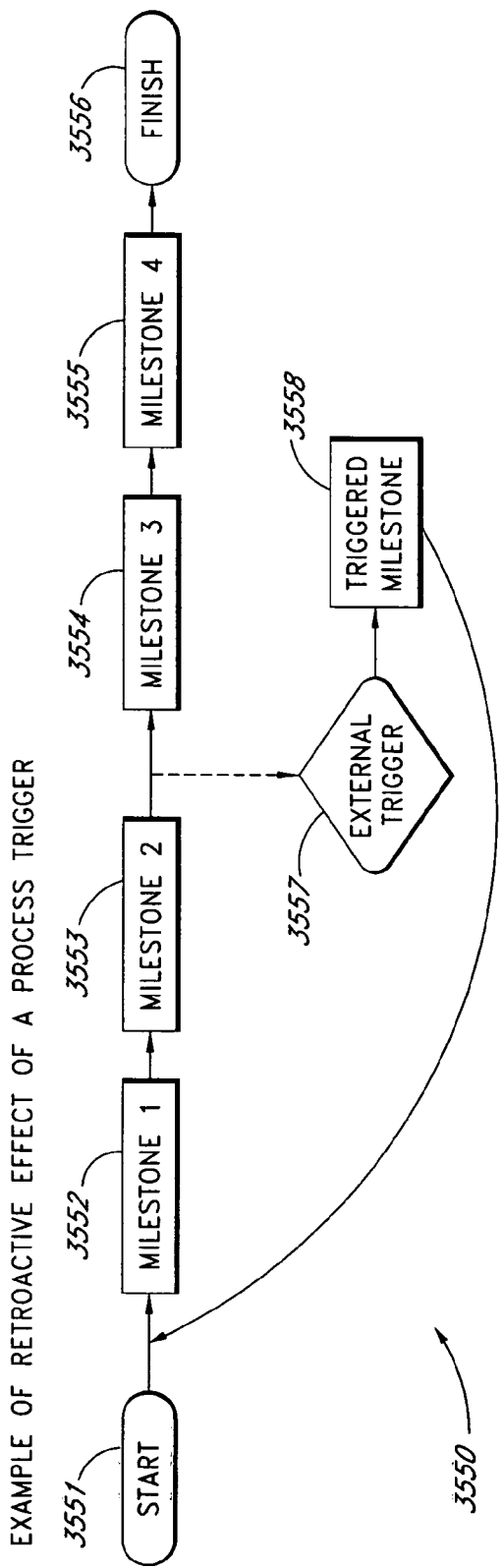

To help illustrate the concept of a process trigger, an internal trigger 3510 is illustrated in FIG. 35A. An internal trigger 3510 can occur when, for example, serving the Notice on the wrong address 3517 which triggers a new set of events 3518, and 3519, associated with the relevant milestone. An example of an external trigger is shown in FIG. 35B. An external trigger 3520 establishes a new milestone, such as Milestone 3 3528, that would not have existed within the SIEA in the absence of such a trigger.

A randomly-occurring process trigger generates an additional set of events that are associated with the trigger in question. These additional events may be deterministic insofar as they are associated with the trigger. That is, a particular trigger may generate additional events that follow a predetermined and sequential pattern. Alternatively, the additional events generated may be stochastic in nature. When an external process trigger generates a new milestone, that milestone can be processed either parallel to existing milestones or as an additional sequential milestone added to the structure of the SIEA.

When a newly-created triggered milestone is processed in sequence with existing milestones, all the events of the newly created milestone should be completed prior to advancing to the next milestone (or exiting the system, depending on the sequential position of the triggered milestone). This concept is illustrated in the SEQUENTIAL PROCESSING OF A TRIGGERED MILESTONE flowchart 3530 of FIG. 35C. As illustrated, a bankruptcy filed during a post-foreclosure eviction may have a sequentially triggered milestone 3538 between Milestone 2 3533 and Milestone 3 3534. In such a situation, the triggered milestone 3538 should be completed before Milestone 3 3534.

Depending on the characteristics of a newly created milestone, the newly created milestone may be processed in parallel to the SIEA milestone existing at the occurrence of that milestone generation. As illustrated in FIG. 35D, Parallel process of a triggered milestone flowchart 3540 illustrates an example of a parallel processed milestone. The parallel processed triggered milestone 3548 is an independent legal action which attacks the validity of the foreclosure sale, while an eviction is pending. In this example, triggered milestone 3548 is completed at the same time that Milestone 3 3544 is completed.

A process trigger can have several potential impacts on an event completed prior to its occurrence. These can include a retroactive effect, which requires events to be redone. As an example, a retroactive effect of a process trigger 3550 is illustrated FIG. 35E. Using the example of a bankruptcy filed prior to the commencement of event completion on Milestone 3 3554 and discovered after the completion of all the events contained in Milestone 2 3553, the Triggered Milestone 3558 renders all events completed up to that point void, and the process should return to Milestone 1 3552.

Given the stochastic process structure of a SIEA, the size of T is dependent upon the time required to complete the events that actually take place. Many of these events are not known before hand. For example, in one embodiment, the fixed frequency events needed to complete each milestone should be completed in sequential order to proceed to the next milestone. Thus, minimizing T means minimizing the time to complete each event. In turn, the time to complete each event depends upon the ability to complete those events that actually occur in a given SIEA.

The time needed to complete an event depends on the level of control the LPM 18 has over the person who completes each event. In some instances, the LPM 18 will have a significant amount of control over the relevant third party, such as when that party is the attorney retained to commence and to complete a given SIEA. In other instances, the LPM 18 will have no control whatsoever over the relevant third party—for example, whenever that party is the opposing counsel, the opposing party, a court officer, or a Judge. Events for which the LPM 18 controls event completion or occurrence are distinct from the events which the LPM 18 only manages event completion or occurrence.

Thus, in an operational sense, there are two distinct event types: managed events (ME) and controlled events (CE). For all CE, the LPM has direct control over the relevant third party; for all ME, the LPM 18 lacks that direct control and can only manage the event completion. An example of a CE is the drafting of a simple legal pleading. The person who controls the completion of the drafting of the pleadings is the attorney retained by the PM. An example of an ME is the service of a Summons & Complaint by a county Sheriff. In such an instance, the PM does not control the completion of service, as the LPM 18 can control neither when the Sheriff will attempt service of the documents nor whether the defendant will actually be home to receive service. The concept of a "relevant third party" establishes the perspective necessary to separate what is controlled and what can only be managed. In most applications of an EBMS, the relevant third party over which the LPM 18 has direct control will be the attorney responsible for either managing or completing the SIEA. The LPM 18 may also control other third party entities as well.

Figure 27:
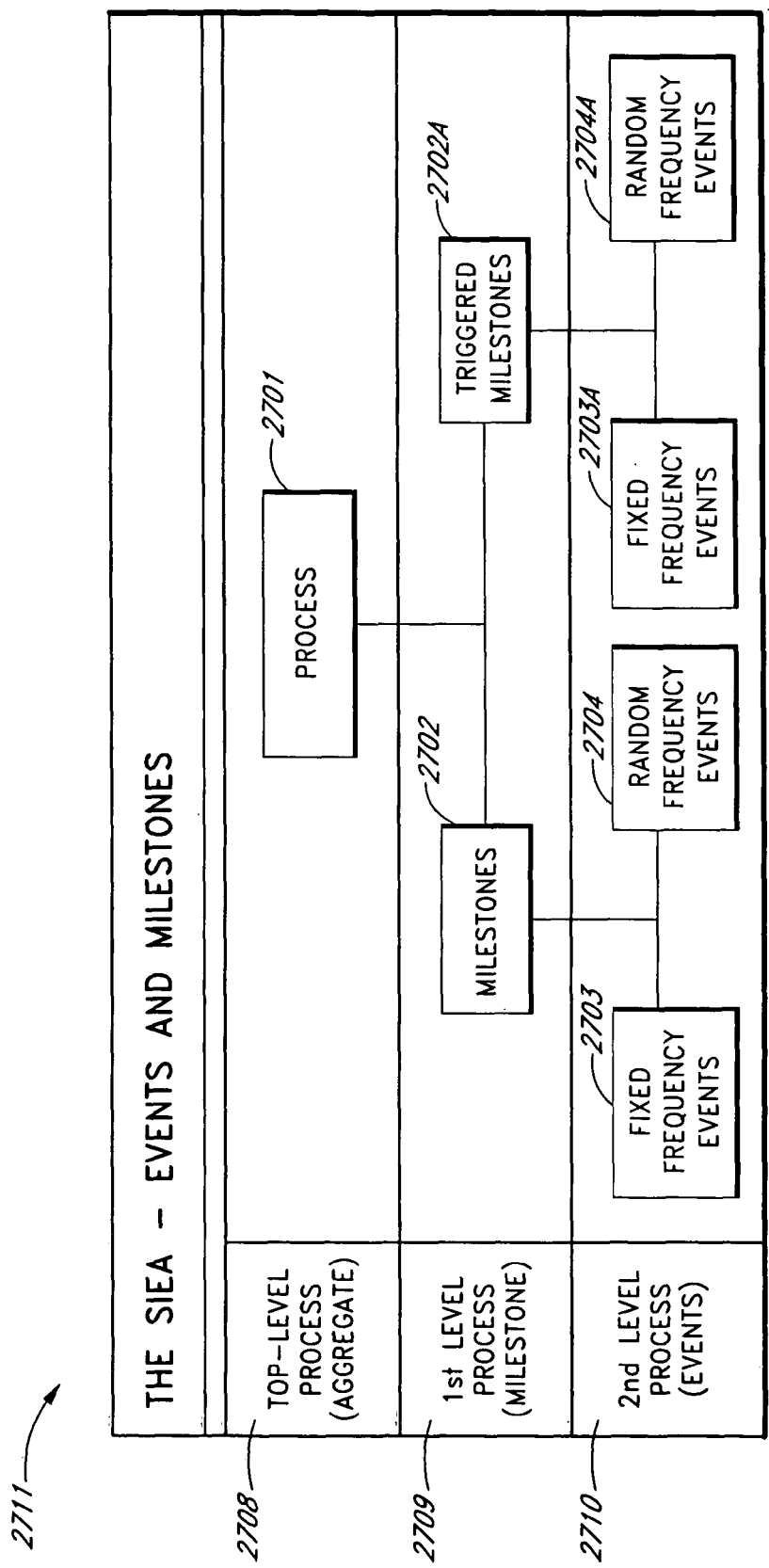
FIG. 27 shows different levels involved in a stochastic security enforcement action system.

FIG. 27 illustrates an event process structure. At the top level process 2708 the aggregate process 2701 is unknown at the outset, but can be estimated by splitting the top level process 2708 into first level process milestones 2702 and the second level fixed frequency events 2703 and random frequency events 2704.

Mathematical Summary

The process control mechanisms (aggregate process control, step process control) may be represented using mathematical notation. We have that, for any given jurisdiction j, with step milestones i∈(0, n), $$Y_j = \sum_i \alpha_{ij} X_j^i, \forall\, i \tag{1}$$

where $\alpha_{ij}$ is the time associated with step milestone i given jurisdiction j; $X_j^i=1$, if step i exists in jurisdiction j, and 0 otherwise; and $Y_j$ is the total time in the process.

The preferred embodiment can be described in the following terms: for any jurisdiction j, step milestone i∈(0, n), universe of events k∈(0, p) and subset of fixed-frequency events h∈k, we have:

$$\hat{\alpha}_{ij} = \mu_{hij} + \sum_{k \notin h}(\hat{\beta}_{kj} Z_i^k + \varepsilon_{ijk}), \forall\, k \tag{2}$$

where $\mu_{hij}$ is the mean time associated with fixed-frequency events associated with step milestone i, given jurisdiction j; $\hat{\alpha}_{ij}$ is the time associated with step milestone i, given jurisdiction j; $Z_i^k=1$ if event k occurs during step milestone i, and 0 otherwise; $\hat{\beta}_{kj}$ is the estimated time associated with event k, given jurisdiction j; and $\varepsilon_{ijk}$ is a measure of error for event k of milestone i, given jurisdiction j (assumed to be independent and identically distributed).

Equation 2 can be substituted back into Equation 1, replacing the $\alpha_{ij}$ coefficient in Equation 1 with the model employed in Equation 2. The combined model is presented in Equation 2a, below:

$$Y_j = \sum_i \left( \mu_{hij} + \sum_{k \notin h} (\hat{\beta}_{kj} Z_i^k + \varepsilon_{ijk}) \right) X_j^i, \forall\, i, k \qquad (2a)$$

where all terms are defined as described earlier.

The inclusion of the $\mu_{hij}$ term in Equation 2 means that the model describes an EBMS that uses deviation event identification—in particular, any deviation from the fixed mean is assumed to be a function of events not captured in the $\mu_{hij}$ term, and the impact of these events is estimated (via $\hat{\beta}_{kj}$) with some associated error in estimation ($\varepsilon_{ijk}$). In order to adapt the model in Equation 2 for an EBMSS employing granular event identification, $\mu_{hij}$ would drop out, leaving all events in the SIEA to be estimated via a series of $\hat{\beta}_{kj}$ coefficients, as Equation 3 demonstrates:

$$\hat{\alpha}_{ij} = \sum_k (\hat{\beta}_{kj} Z_i^k + \varepsilon_{ijk}), \forall\, k \qquad (3)$$

where $\hat{\alpha}_{ij}$=time associated with step milestone i, given jurisdiction j; $Z_i^k$=1, if event k occurs during step milestone i, and 0 otherwise; $\hat{\beta}_{kj}$ is the time associated with event k, given jurisdiction j; and $\varepsilon_{ijk}$=is a measure of error for event k in milestone i, given jurisdiction j (assumed to be independent and identically distributed).

Equation 3 can be substituted into Equation 1 for $\alpha_{ij}$, rendering Equation 3a as shown below:

$$Y_j = \sum_i \left( \sum_{k \notin h} (\hat{\beta}_{kj} Z_i^k + \varepsilon_{ijk}) \right) X_j^i, \forall\, i, k \qquad (3a)$$

where all terms are defined as described earlier.

Both Equations 2 and 3 are capable of reducing to the constant $\alpha_{ij}$ employed in Equation 1, depending upon the events that do or do not take place in a given SIEA. The elegance of these particular formulae also permits events to have a positive or negative effect on each step milestone. Further, this model provides greater power to explain a random or quasi-random process by modeling individual step milestones (the $X_j^i$ in Equation 1) as a function of randomly-occurring events ($Z_i^k$ in Equations 2 and 3).

A Preferred LPM—The Events Based Management System (EBMS)

An EBMS manages two distinct components: (1) the completion of the SIEA legal process in question (which is done by the assigned attorney) and (2) the reporting of the progress of the completion of that process (which is done by the assigned attorney to the LPM 18). The two components, while distinct, are related. While the completion of the legal process is the ultimate goal, the reporting is intertwined with the completion. Reporting acts as an accountability tool to make certain the attorney is doing the work in a timely and competent manner. Reporting also provides data to other parties in the process to allow for more effective and efficient resolution of forced collateral liquidation without resort to litigation. Alternatives to litigation include voluntary vacates for post-foreclosure evictions and deed-in-lieu of foreclosure in real estate foreclosure actions. Reporting allows for identification of problems which can impact the amount recovered, or lost, such as a Borrower's claim that the foreclosure sale is invalid due to improper notice. In addition, reporting provides data to the client and investor in the form of reports, which allow for future referral of business and pricing of future transactions.

Figure 30:
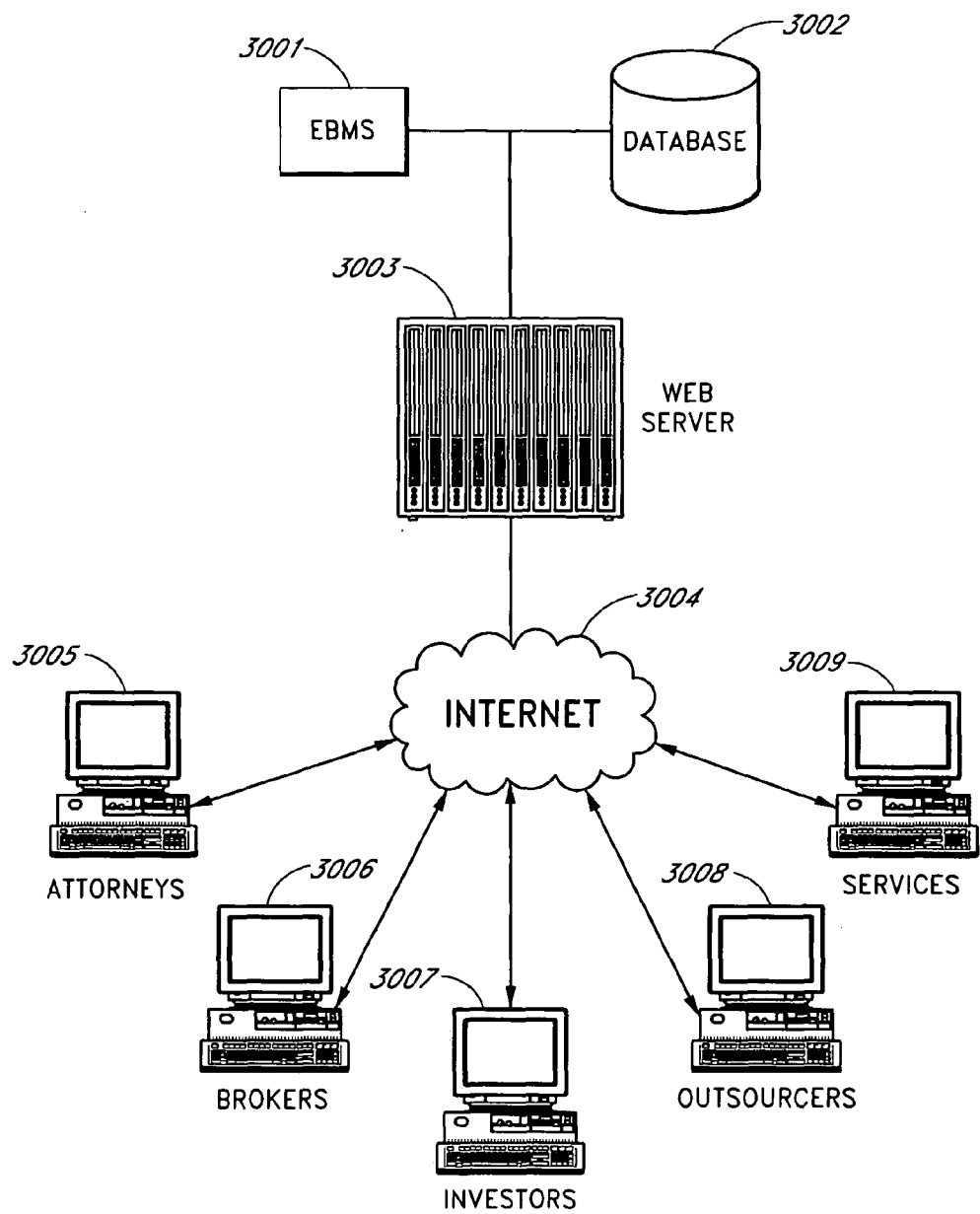
FIG. 30 shows a web-based EBMS system.

Referring to FIG. 30, an EBMS 3001 can be based on the use of a relational database 3002. The preferred relational database is SQL 2000, but other relational databases, such as Oracle, may be used. Although the database 3002 is discussed as a single database, it may be comprise a plurality of databases, including some or all of the databases discussed above. As shown in FIG. 30, the EBMS communicates with the relational database 3002. The EBMS then communicates and receives information via a network such as the internet through a web server. Attorneys 3005, Brokers 3006, Investors 3007, Outsourcers 3009, other Services 3009, and other person who are given access to the EBMS all communicate with the EBMS through a network, such as the internet.

Figure 31:
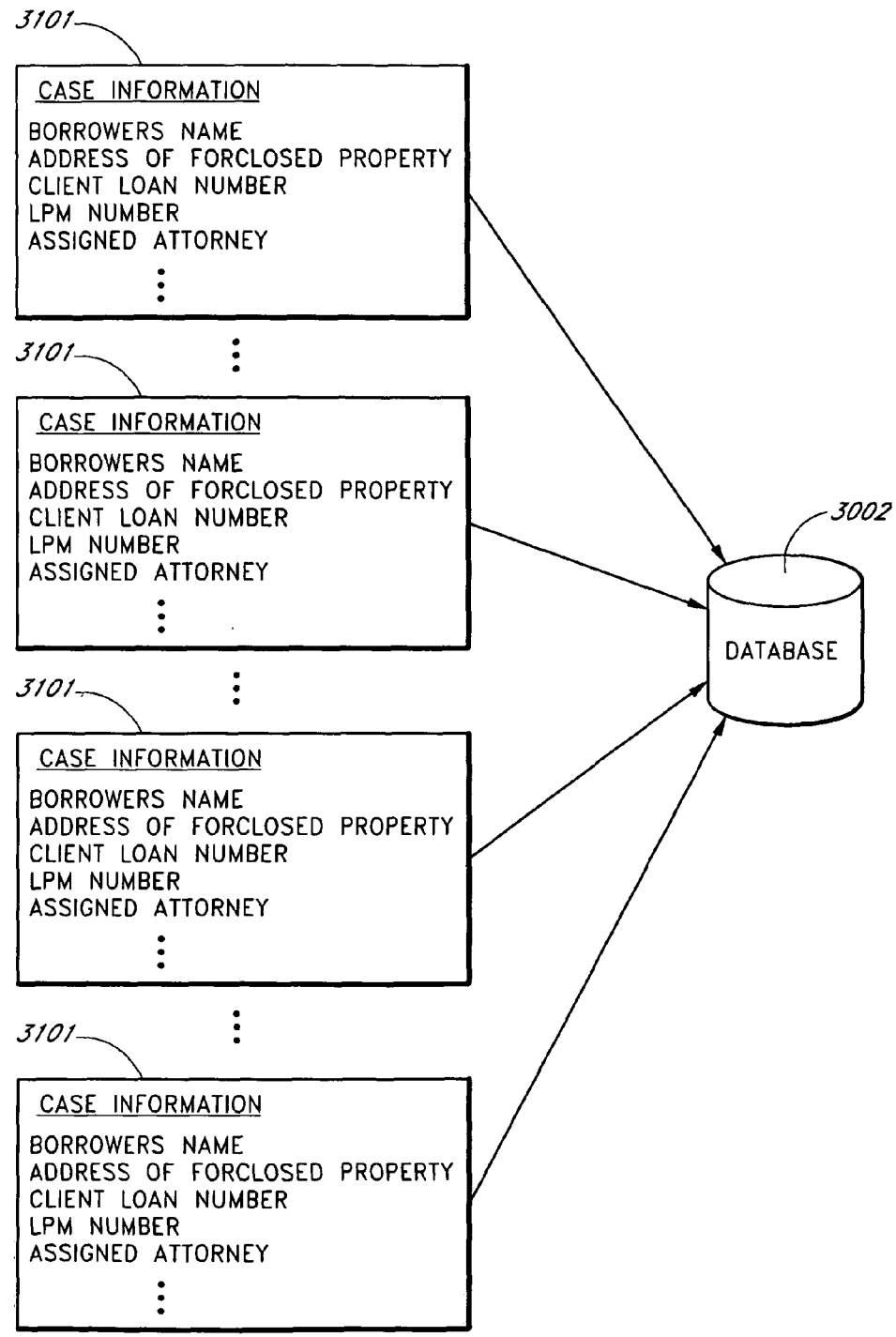
FIG. 31 shows case information entry in a database.

Referring to FIG. 31, a relational database 3002 would have various entries 3101 available for case management. Under such a system, each SIEA is loaded into its particular set of entries 3101, which contain basic case information. For example, in a post-foreclosure eviction, a typical case entry would contain the borrower's name, the address of the foreclosed property, the client loan number, the LPM number, the identity of the assigned attorney, and other information. Databases used in case management systems can be constructed from scratch or purchased in an off the shelf format such as Pro Law, Amicus, or Time Matters, each of which require some additional customizing.

An EBMS preferably communicates via a network system. However, other modes of communication with the EBMS can be employed. These modes include faxes, phones, or emails. A network based system is preferably because it allows authorized users such as attorneys, LPMs, clients, investors, brokers, field services companies, and others access to the same data. User access to the data is restricted based on user authorization. For example, a broker is allowed access to the data on a post-foreclosure eviction on a particular property, but is not allowed access to the data on a post-foreclosure Relief from Stay motion on that same property.

Figure 32:
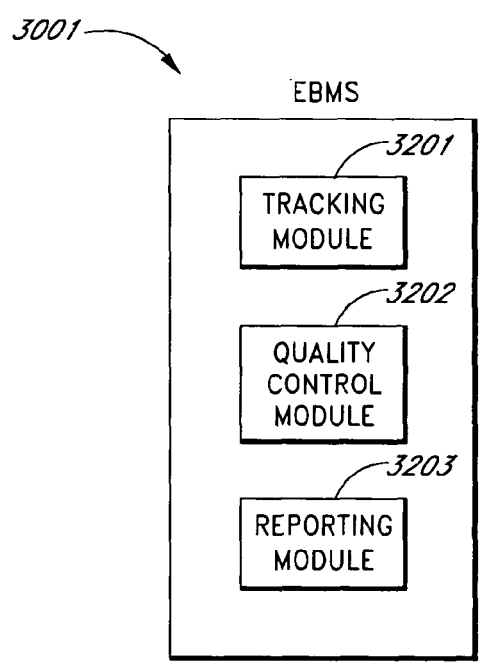
FIG. 32 shows components of an EBMS system.

As illustrated in FIG. 32, one embodiment of an EBMS 3001 consists of three components: (1) a TRACKING module 3201, (2) QUALITY CONTROL module 3202, and (3) REPORTING module 3203. In the following sections, two SIEA types will be used as examples: (a) a post-vesting RFS to complete a post-foreclosure eviction and (b) post-foreclosure evictions, with an RFS being the primary example. Although the present system is described in relation to these two SIEA, any SIEA can be used. A "Post-Foreclosure Evictions" is a state court proceeding to obtain possession of an occupied property by the purchaser at a foreclosure sale which transfers title to that property to that owner. A "Post-Foreclosure Relief from Stay Motion" is required when an occupant files a bankruptcy petition while (a) residing in a home which is (b) owned by a third party which third party (c) obtained title via foreclosure and (d) has or is about to commence eviction process to obtain possession of that real property. In this circumstance, the "automatic stay" provision of federal bankruptcy law will, in most instances, require the approval of an appropriate bankruptcy Judge for the eviction to be commenced or continued. The Order granting this approval is called a "Relief from Stay Order" (RFS). While a RFS can be used in other contexts (to complete a foreclosure or to repossess an automobile), the below sections of this application will discuss the construction of an EBMS to manage RFS required to commence or complete a post-foreclosure eviction.

Referring to FIG. 32, the first building block of any EBMS 3001 is a TRACKING module 3201. One embodiment of a TRACKING module 3201 tracks the completion of the legal process. In doing so, this module alerts the LPM 18 to any failure on the part of the attorney to proceed in a timely or competent manner, any difficulties with the case, and any other useful information. The EBMS 3001 contains events that actually occur. Thus the EBMS 3001 is more accurate in tracking attorney performance because it only tracks events which should be completed. The EBMS 3001 reports an exception, in the form of an alert, whenever an attorney exceeds an assigned τ for a given Attorney Managed Events (AME), with the estimated time to complete a managed event will henceforth be referred to as τ. Thus, an EBMS 3001 TRACKING module can track events as such actually occur in any given SIEA.

In some embodiments, the EBMS TRACKING module 3201 is a "hybrid" module which consists of a milestone tracking module combined with an event tracking module. Both of which are supplemented by a reporting system. The goal of such a system is to quickly identify the events as each occurs and then to quickly implement resolution and completion of that event. The occurrence of some of these events is known in advance while the occurrence of others is random and unknown.

Figure 33:
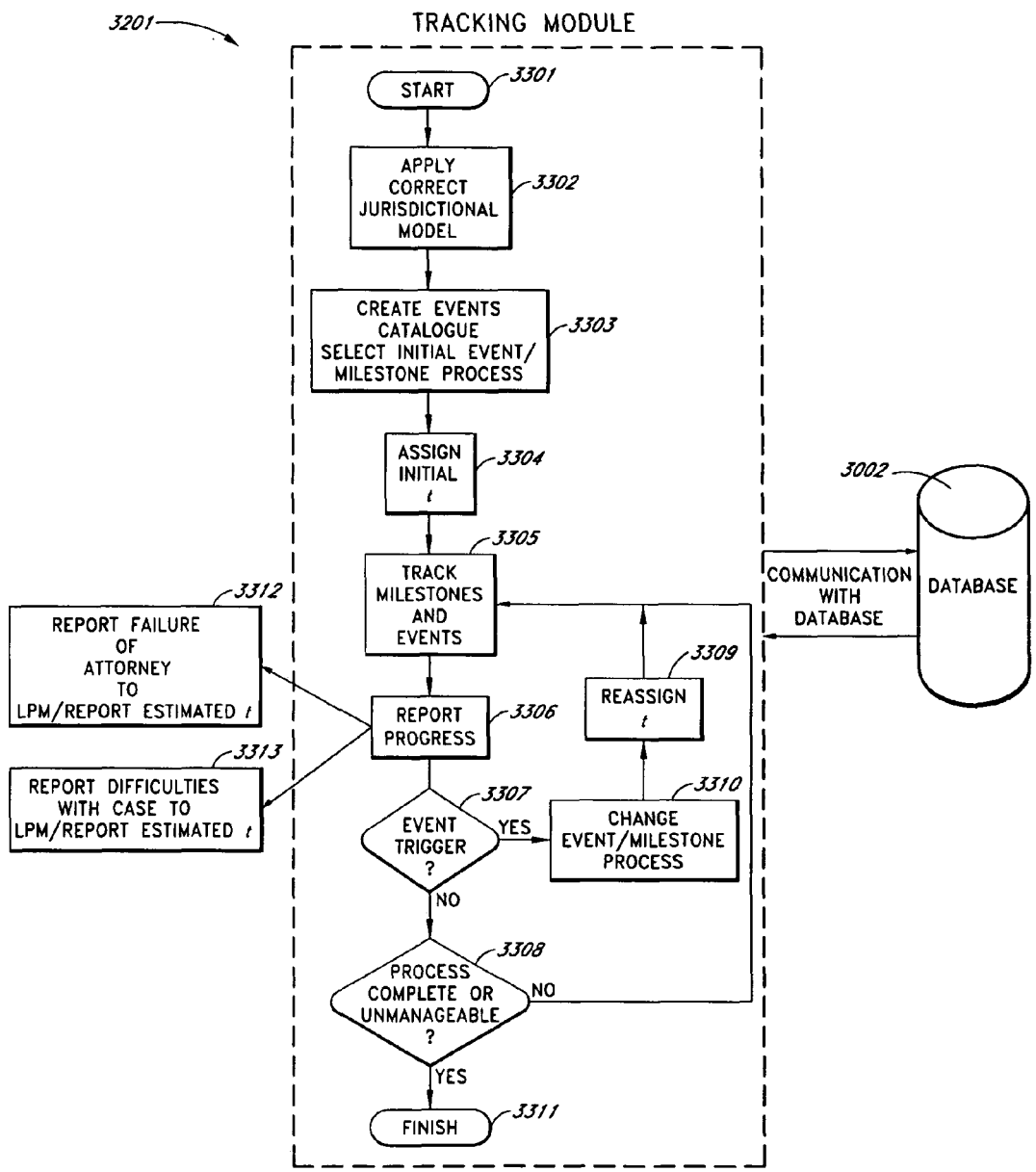
FIG. 33 shows a method for an EBMS tracking module.

Referring to FIG. 33, A hybrid EBMS TRACKING module 3201 tracks the completion of each SIEA. The TRACKING module 3201 begins at START block 3301. It then proceeds to JURISDICTIONAL MILESTONE TEMPLATE module 3302. In the JURISDICTIONAL TEMPLATE module 3302, a design template type is selected from the design templates for the various jurisdictional milestone structures. In addition to being designed for specific SIEA jurisdictional type (a post foreclosure eviction as compared to a judicial foreclosure), these templates can be customized to allow for differences within a jurisdiction, as granular as the county in which the SIEA is filed, the courthouse in which the SIEA is filed, or the courthouse in which the SEIA is filed, or the Judge in front of whom the SIEA is pending.

There are two distinct ways to load templates into an individual case: manual or automated. In a manual system, the LPM staff would be required to choose a jurisdictional template type as part of the case set. In an automated system, the LPM staff would choose the Bankruptcy Court District (such as the Middle District of Tennessee), the Bankruptcy Judge (such as Judge Jones) and the bankruptcy type (Chapter 7 or Chapter 13) and the EBMS would then automatically load the template.

Figure 34:
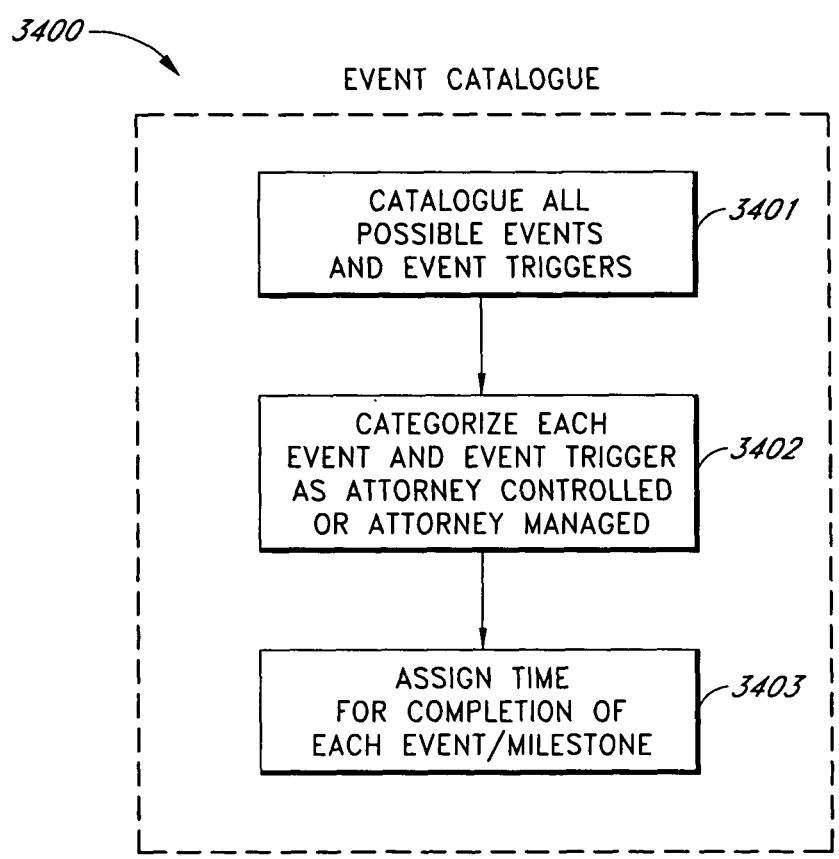
FIG. 34 shows a flow chart for an Events Catalogue system.

After the jurisdictional templates have been designed, the next step 3303 is to create the Events Catalogue. As illustrated in FIG. 34, an EVENTS CATALOGUE module 3400 contains three modules: a CATALOGUE ALL POSSIBLE EVENTS AND EVENT TRIGGERS module 3401, a CATEGORIZE EACH EVENT AND EVENT TRIGGER AS ATTORNEY CONTROLLED OR ATTORNEY MANAGED module 3402, and an ASSIGN TIME FOR COMPLETION OF EACH EVENT/MILESTONE module 3403. The CATALOGUE ALL POSSIBLE EVENTS AND EVENT TRIGGERS module 3401 catalogues all possible events and event triggers within the jurisdictional template. The CATEGORIZE EACH EVENT AND EVENT TRIGGER AS ATTORNEY CONTROLLED OR ATTORNEY MANAGED module 3402 looks at each possible event or event trigger and categorizes it as attorney-controlled or attorney-managed. The ASSIGN TIME FOR COMPLETION OF EACH EVENT/MILESTONE module 3403 looks at each event or event milestone and assigns a time for completion of each event or event milestone, and then calculates a total estimated time to complete each milestone.

Referring again to FIG. 33, after the EVENTS CATALOGUE module 3400 creates the EVENTS CATALOGUE in step 3303, the tracking system of TRACKING module 3201 assigns an initial time t module in step 3304. The goal of the tracking module is to manage the completion of an event or a series of related events via an assigned time (t). First, a t is assigned to each milestone, which in turn is done by assigning an individual t to each set of fixed frequency events. This t is best considered as a goal or a filter to be used in conjunction with other modules to create the EBMS hybrid tracking system.

In one embodiment, the goal t for each milestone is calculated by assigning a t for each jurisdiction. In another embodiment, the goal t for each milestone is assigned with a uniform t for similar jurisdictional milestones. In some embodiments, t for each milestone is calculated at the lowest level for each jurisdiction. In the setting of a RFS, that would mean assigning an individual t for each Bankruptcy Judge. The t would be adjusted seasonally, i.e. the t for December is much different than the t for August. In other embodiments, all bankruptcy process types would have the same t assigned in all jurisdictions for all times of the year. For example, there are three general structures for setting hearing and granting Relief from Stay motions, which we will define as RFS-1, RFS-2, and RFS-3. Under one embodiment, all courts using the RFS-1 type would have the same t for all months; all courts using the RFS-2 type would have the same t for all months, and all courts using the RFS-3 type would have the same t for all months of the year. In another embodiment, the t would be seasonally adjusted based on actual data for t based on the time of year.

After a time t is assigned for each milestone, the tracking process of TRACKING module 3201 tracks the milestones and events in step 3305, which tracks the occurrence and resolution of random frequency events and event triggers. Since the standard milestone tracks the completion of the fixed frequency events, this feature supplements and integrates with the fixed frequency tracking so that, working together, all event types that are capable of occurring in an SIEA, fixed frequency and, random frequency, are tracked and managed. FIGS. 36A, 36B, and 36C show three fields associated with step 3305: Milestone Impacted field 3603, Days Added field 3604, and Reason field 3605.

The Milestone Impacted field 3603 links the occurrence of a random event or event trigger to the milestone impacted by that occurrence. The Days Added field 3604 lists the goal t for the random event or event trigger which has occurred. The Days Added field 3604 in the EVENT TRACKING module 3602 is linked to the t field 3614 in the Milestone TRACKING module 3601, such that an entry into the Days Added field 3604 of the EVENT TRACKING module 3602 is added to the t field 3614 on the Milestone TRACKING module 3601. The Reason field 3605 identifies the random event or event trigger which occurred. This field is not linked to the Milestone TRACKING module 3601. It is used to identify the reason for additional t and to gather data on the t for the occurrence in question.

The database architecture for the EVENT TRACKING module takes into account the possibility that more than one random event or event trigger can occur per milestone. In one embodiment each random event/trigger event occurrence has its own distinct set of fields. In another embodiment, each of the random event/trigger event occurrences is tracked in one field as illustrated in FIG. 36C.

In one embodiment, for example, in the embodiments of FIGS. 36A, 36B, and 36C, the event user interface is set up such that the MILESTONE TRACKING module 3601 is at the top of the user interface and the EVENT TRACKING module 3602 is on the bottom. Such a structure minimizes confusion and maximizes efficiency in integrating the MILESTONE TRACKING module 3601 and the EVENTS TRACKING module 3602. In one embodiment, the t filed 3614 would not be shown on the MILESTONE TRACKING Module 3601, rather the column would be kept hidden and used only to calculate the projected dates in the projected dates field 3614. FIG. 36A illustrates an example in which only fixed frequency events occur. FIG. 36B illustrates an example in which one event trigger occurred. FIG. 36C illustrates an example in which an event trigger and a random event occurred within the same milestone.

As shown in FIG. 36C, the filing of an opposition effected the completion of the default date milestone as shown in the default date field 3612. Hence, the additional timeline days are added to the t field 3614 for that Milestone. In this case, the EVENT TRACKING Module 3602 shows the impact of the event trigger occurrence as adding 20 days to t for that Milestone. Those additional 20 days are added to the t field 3614 in the MILESTONE TRACKING module 3601 and the projected date for the completion of the Milestone is adjusted by adding 20 days to the projected completion date as shown in the projected completion date field 3615. These adjustments are highlighted in bold.

The event occurrence type is then noted in the reason field 3605. The EVENT TRACKING module 3602 can be used by manual entry or automated entry. In some embodiments, for example in the automated entry embodiment, the LPM staff would choose a reason code (such as opposition in this court is a TE 6) and the system would then automatically fill in the columns on both the EVENT TRACKING module 3602 and the MILESTONE TRACKING module 3601 user interfaces. This data would then be used to readjust the t for this type of event trigger (including creating seasonal adjustments). In some embodiments, for example in the embodiment of a manual system, the LPM staff would have a table to follow and would adjust the Days Added field 3604 according to the table listings.

Referring again to FIG. 33, after the step 3305, the tracking system reports progress in step 3306. This step reports on the EBMS progress status. In some embodiments, for example, in the embodiment of FIG. 33, the tracking system sends status reports to LPM staff. The status report may include such information as a revised estimated time for completion, as well as the reason for the delay or difficulty. For instance, in ATTORNEY FAILURE block 3312, the report contains a message that the attorney failed to complete a task, or in REPORT DIFFICULTIES block 3313, the report contains a message that some difficulty out of the attorney's hands is causing delay. By reporting these delays, the LPM 18 and LPM staff can choose to allow the process to continue, or can intervene in the process.

After the step 3306, the tracking system detects the presence of an event trigger in step 3307. If an event trigger has occurred, the process moves to step 3310, where the event and milestones for the SIEA are re-chosen. The process then moves to step 3309 where a time t is reassigned for each milestone and an estimated completion time is recalculated. The process then returns to step 3305. If an event trigger has not occurred at decision block 3307, then the process moves to decision block 3308, where the system decides if the SIEA is complete, or whether an event which requires the SIEA be ceased ("unmanageable event") has occurred. If the SIEA is incomplete and an unmanageable event has not occurred, the process returns to step 3305. If the SIEA is complete, or if an unmanageable event occurs, the system moves to FINISH block 3311.

In some embodiments, the REPORTING module 3203 is combined with an attorney calendar and/or a text query and response system via an online application. This type of reporting system allows added control over attorney performance, because the LPM 18 can manage the completion of an event on whatever level of granularity the LPM staff desires. The flexibility of the REPORTING module 3203 using the reporting system provides is shown in FIG. 38. The query from the LPM 18 is in normal text. The response by the attorney is in bold italics. This system of question and answer allows the LPM to manage the flow of the SIEA, by identifying events as such occur and then proposing or managing event or event trigger completion. A reporting system of this type allows the LPM 18 flexibility in the level of events the LPM 18 wishes to manage, and gives the LPM 18 the ability to control for unexpected impacts.

Query #3 of FIG. 38 shows the flexibility to control for unexpected events. The t for the hearing in the event catalogue is 20 days. Thus, the LPM 18 could have chosen to accept that 20 day figure, skipping Query #3 and going directly to Query #4. Instead, the LPM 18 asked for the actual hearing date, to allow the event to be tracked as it occurs. The REPORTING module 3203 allowed the LPM 18 the flexibility to make a choice as to the level of granularity it wished to obtain and control when an unexpected event occurs. This flexibility is further demonstrated in the choice of Query in Query #4. The LPM 18 in Query #4 has gone into greater detail by questioning the grounds of opposition.

In some embodiments, the level of granularity used can be controlled by a variety of systems. In one embodiment, if a certain t is exceeded in a given milestone, random event, or event trigger milestone, a corresponding granularity level is used. In one embodiment the granularity is based on the prior performance of the attorney and/or on prior conduct of this particular defendant. In one embodiment, the granularity is based on the value of the asset. In one embodiment, the granularity is based on the client's requirement. In one embodiment, the level of granularity can also be chosen solely by the database 3002 or it can be done by phone, fax and/or email supplementing the online database 3002.

Quality Control

Figure 39:
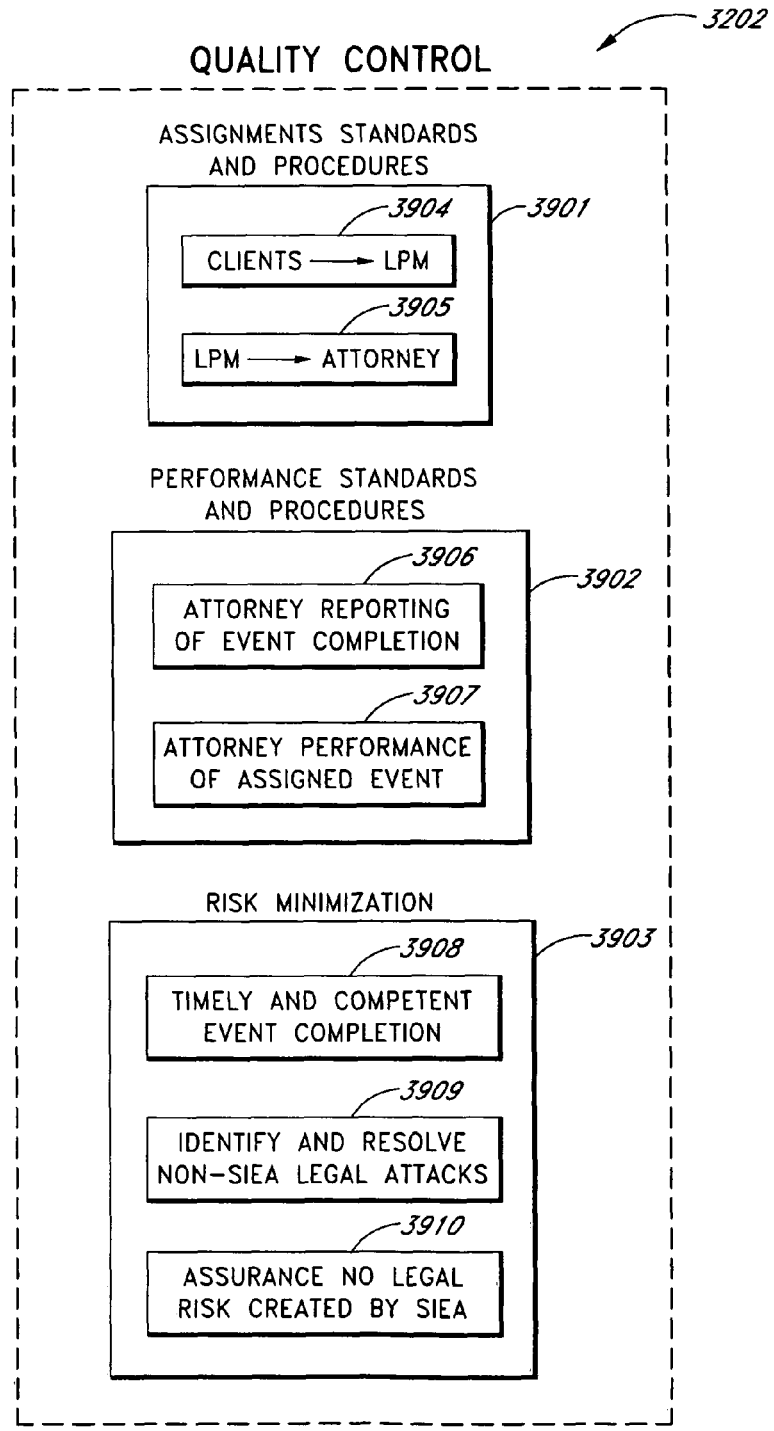
FIG. 39 shows a Quality Control module of an EBMS.

The next component of the EBMS 3001 is the QUALITY CONTROL module 3202. In one embodiment, for example, in the embodiment of FIG. 39, the QUALITY CONTROL module 3202 has three distinct elements. The first element is an ASSIGNMENT STANDARDS AND PROCEDURES module 3901. The second element is a PERFORMANCE STANDARDS AND PROCEDURES MODULE 3902, and the third element is a RISK MINIMIZATION module 3903.

In one embodiment, the ASSIGNMENT STANDARDS AND PROCEDURES module 3901 includes two modules, a CLIENTS TO LPM MODULE 3904, and a LPM TO ATTORNEY module 3905. The CLIENTS TO LPM MODULE 3904 refers to the procedures and standards by which an SIEA are referred by clients to an LPM 18. The LPMS TO ATTORNEYS module 3905 refers to the procedures and standards by which an SIEA are referred by an LPM 18 to attorneys.

In one embodiment, the PERFORMANCE STANDARDS AND PROCEDURES module 3902, includes two modules, an ATTORNEY REPORTING OF EVENT COMPLETION module 3906, and an ATTORNEY PERFORMANCE OF ASSIGNED EVENTS module 3907. The ATTORNEY REPORTING OF EVENT COMPLETION module 3906 reports how the attorney reports to the LPM 18 on progress toward completing the assigned SIEA legal process. The attorney performance of assigned events module reports whether the attorney performed the assigned SIEA legal process in a timely and competent manner.

In one embodiment, the risk minimization module contains three modules, a TIMELY AND COMPETENT EVENT COMPLETION module 3908, AN IDENTIFY AND RESOLVE NON-SIEA LEGAL ATTACKS module 3909 and an ASSURANCE NO LEGAL RISK CREATED BY SIEA module 3910. The TIMELY AND COMPETENT EVENT COMPLETION module 3908 reports on whether the SIEA was timely and competently completed. The IDENTIFY AND RESOLVE NON-SIEA LEGAL ATTACKS module 3909 identifies and aids in resolving a non-SIEA legal attack. The ASSURANCE NO LEGAL RISK CREATED BY SIEA module 3910 identifies and makes sure that the SIEA process is not creating additional legal risk.

Figure 40:
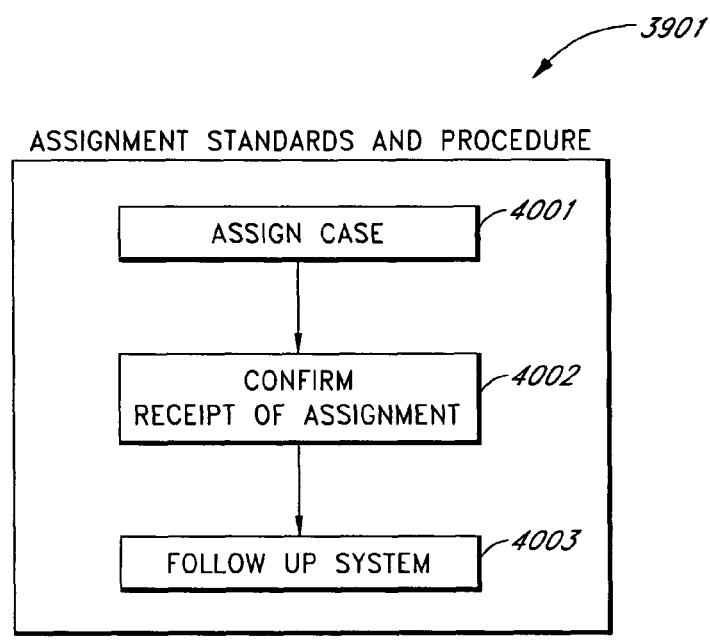
FIG. 40 shows an Assignment Standards and Procedure module.

In one embodiment, SIEA management starts with an assignment. The file should be assigned by the client to the LPM 18, as in CLIENT TO LPM module 3904, and from the LPM 18 to the attorney, as in LPM TO ATTORNEY module 3905. The assignments set the "start" of the timeline and the commencement of the initial t. It is like the start gun going off at the commencement of a race. In one embodiment, the CLIENTS TO LPM module 3904 tracks how the SIEA gets to the LPM 18. It tracks how the assigning party knows the case was sent and received, and it follows up when the LPM 18 does not confirm receipt. In one embodiment, the LMP TO ATTORNEY module 3905 performs virtually the same functions as the CLIENTS TO LPM module 3904, except that it tracks the flow of the SIEA from the LPM 18 to the attorney. This type of system is illustrated in FIG. 40. Within the ASSIGNMENT STANDARDS AND PROCEDURE module 3901 are three modules ASSIGN CASE module 4001, CONFIRM RECEIPT OF ASSIGNMENT module 4002, and FOLLOW UP SYSTEM module 4003. The ASSIGN CASE module 4001 regulates the assigning of SIEA events to LPMs 18 and attorneys. The CONFIRM RECEIPT OF ASSIGNMENT module 4002 confirms the receipt of the assigned case. The FOLLOW UP SYSTEM module 4003 keeps track of how well the assigned cases are picked up including how quickly, as well as why an LPM 18 or attorney has not picked up a case.

Systems for assigning SIEAs can include automated downloads, email notifications, fax assignments, and email assignments. Under the automated downloads system, the assignments are automatically downloaded from the Client database to the LPM database or from the LPM database to the attorney database. Under the email notifications system, the assignment is loaded into the LPM database and made available to the attorney via a Web based application. After the assignment is preloaded into the LPM online database, the assigned attorney is notified of this assignment via email and is asked to "pick it up" by logging into the Website. Under the fax assignment system, the client faxes the assignment on a case-by-case basis to the LPM 18 or the LPM 18 faxes the assignment on a case-by-case basis to the attorney. The email assignment system is essentially the same as the fax assignment system, except that the assignment is done via email rather than fax.

Systems for confirming receipt of an SIEA can be separate or integrated into the assignment systems. For instance, in an automated assignment system, when a client downloads an assignment, the system confirms receipt. In an email notification assignment system, if an assignment is not confirmed within a given period of time, the system can follow up via phone calls, emails, or fax. In a fax assignment system, the fax can contain a signature line that can be faxed back confirming receipt. In an email assignment, a reply email can be sent, either by the LPM 18 or attorney manually sending a reply email or by automatically requested email replies.

A measurement system and/or a follow up system can be used to track the acceptance of assignments. In a measurement system, the LPM 18 measures how quickly the attorney "picks up" the assignment, in some case, to the seconds. The attorney is then rewarded with additional assignments or a better evaluation based on the speed with which the attorney "picks up" assignments. In the follow up system, the LPM or client assigns a given time period, for example, one business day, and if the attorney has failed to confirm acceptance within that time period, the LPM then contacts the attorney directly and inquires as to the reason for the delay. In the follow up system, an attorney which consistently fails to confirm assignments within the allotted time period is punished by a lower number of assignments, a lesser performance evaluation, or some combination thereof.

In one embodiment, PERFORMANCE STANDARDS AND PROCEDURES module 3902 includes metrics by which SIEA completion is tracked, managed and measured. In one embodiment of an EBMS, the performance standards and procedures module measures the timeliness and effectiveness of completion of the events which actually occur in a given SIEA. To do this, an EBMS can use two sets of performance standards: reporting standards and action standards.

In one embodiment, the ATTORNEY REPORTING OF EVENT COMPLETION module 3906 measures reporting standards. Reporting standards measure and report the timeliness and accuracy of the case progress by the attorney to the LPM 18. An efficient reporting standard is important to an EBMS. The ATTORNEY REPORTING OF EVENT COMPLETION module 3906, in one embodiment, is in an attorney calendar text query and response format, or calendar query response system, as described earlier in this application. Reporting standards can include timeliness and completeness.

In setting a reporting standard, the following factors should be considered: (1) Reporting is not an end in itself. The final goal of all EBMSs is the timely and competent completion of SIEA Legal Process, not the reporting of what the attorney is doing. Reporting is simply an end to that means, not an end in and of itself. (2) One of the primary purposes of reporting is to supply the LPM with accurate information as to how well the attorney is completing the assigned legal process so as to allow the LPM to evaluate and correct, as needed, those services. (3) Event completion reporting should not be the primary method by which the LPM 18 learns of the occurrence of unusual or significant event triggers or unexpected events which significantly impact legal risk and exposure. The assigned attorney should be charged with the primary responsibility to contact the LPM 18 via email, phone or fax with such significant events. The reporting system should only act as a back up to catch those matters that are missed by the assigned attorney. (4) The cost to the attorney in reporting and attorney staff time used in reporting status should be minimized. (5) The cost to the LPM 18 of managing the reporting module should also be minimized. (6) The goal of reporting is to provide both a rough level of accountability as well as management control over the legal process.

In the end, the attorney is judged on the actual completion of the legal process. If, the attorney is not completing the legal process in a timely and competent fashion, the attorney will lose assignments. Thus, it is far more important that the attorney complete the legal process well than report well.

In one embodiment, there are three separate standards for reporting under a Calendar Query System: (a) the calendar date for the query; (b) the requested due date for the response, and (c) the required due date for the response, after which both manual follow up and consequences will be imposed.

The difference between a requested due date and a required due date is one of cost and consequences. A requested due date can be followed up with an automated follow up, such as emails or a set of escalating emails. A required due date means that the information needed is significantly overdue and the attorney has failed to supply the needed information within a time needed to evaluate action performance. The setting of these two dates is a balancing act.

In one embodiment, different criteria can be used for setting calendar dates, requested response dates, and required response dates. In one embodiment, the calendar reporting system is based on one week increments. Calendar dates can be set depending on event type: for attorney controlled event (ACE), the calendar date is set for date of expected completion (usually one business day); for AMEs, the calendar date is set for the estimated date of completion. In this manner, the Calendar acts as a true "Calendar" and gives the attorney a daily set of tasks to be completed.

In one embodiment, the requested reporting response date is two days after the calendar date. This is only a requested date and the requested reporting response date is not policed. The requested response date can be varied by the LPM 18 depending on event type. For example, an LPM 18 could set the response time for an ACE at one day and an AME at two or three days. In one embodiment, the requested response due date for both an ACE and an AME is the same day.

In one embodiments, every thursday, an email remainder for all uncleared, meaning no response given to an outstanding query, items on that attorney's calendar is sent out. This reminder email helps keep the LPM management costs at a minimum. Thursday can be used as the reminder date as it is two business days from Monday and should act an effective reminder to the attorney to complete all tasks set for that week.

In one embodiment, the required response date is Sunday. For example, all responses for the Calendar for the week of Nov. 14, 2005 through Nov. 18, 2005 are due by Sunday Nov. 20, 2005. All updates for the week of Nov. 14, 2005 through Nov. 18, 2005 not received by Nov. 20, 2005 are deemed late and will result in the offending attorney being charged with violating the reporting standard. Failure to report by Sunday may result in individual follow up on Monday of the following week, which can be escalated on Tuesday. These violations can then be used to evaluate the amount of future business that will be referred to that attorney. This approach is consistent with the emphasis on the actual completion of the legal process rather than complying with strict reporting standards.

Preferably, all reporting should be complete, clear and accurate. It can include the dates of actions taken, and, when available, the relevant due dates for the next anticipated event. In one embodiment, if a response is not clear or appears not to be accurate, an LPM 18 can follow up via phone, email or fax.

In one embodiment, an EBMS sets separate action standards for different types of events. In one embodiment, those action standards include ACEs and AMEs. Different performance standards can be applied to the different action standards.

The following are one embodiment of a set of action standards for ACEs in post-foreclosure evictions, post-foreclosure RFS motions, and post-foreclosure Objection to Chapter 13 Plan matters.

Eviction Matters

A. Commencement of First Legal Step:

(1) First business day after title documents to start the eviction have been received.

B. All Subsequent Legal Process after First Legal Step Under Attorney Control:

(1) For simple legal documents which should be automated, within one business day of each step's availability per local statute or custom. These documents include Notices to Quit, Summons, Complaints, defaults, judgments, and similar documents. (2) For other legal documents which require separate non-automated preparation, three business days from receipt of information needed to prepare the motion or declarations in support of the motion, unless proper research and preparation requires additional time.

Relief from Stay Motions

A. Motion filing: (1) If ECF filings allowed, two business days. (2) If ECF filings not allowed, motion should completed and sent for filing within two business days and filed as quickly as is practicable.

B. Hearing Dates:

(1) The first possible on regular notice under the court's calendar.

Objection to Plans

A. If the Objection filing deadline is at least 15 days after the effective date of a Relief from Stay Order, then two business days after the effective date of the companion Relief From Stay motion.

B. If the Objection filing deadline does not allow, within five (5) business days of confirmation of the need to file an Objection or prior to Objection filing deadline, whichever first occurs.

C. If the assignment is less than 3 days from the Objection filing deadline, within one business day of the assignment. If time allows, all objections should be filed at a minimum of ten business days prior to the Objection filing deadline.

D. The goal of this section is to have all Objections assigned prior to the expiration of the filing deadline.

The following are one embodiment of a set of action standards for AMEs in post-foreclosure evictions, post-foreclosure RFS motions, and post-foreclosure Objection to Chapter 13 Plan matters:

Receipt of Title Documents to Commence the Eviction:

A. In jurisdictions for which deed recordation or execution is not required to commence the eviction, the title documents should be obtained within two business days after the completion of the final step of the foreclosure process.

B. In redemption states, if the matter is assigned after redemption has expired, one business day from assignment. If assigned prior to redemption expiring, the next business day after the failure to redeem and occupancy has been confirmed.

C. In states in which deed recordation is required, within five business days of deed recordation.

D. In states in which deed execution, but not recordation, is necessary, within five business days of deed execution.

Hearing, Motion and Trial Dates:

A. First practicable.

Service of Process:

A. The most effective available means. If this requires the retention of a private process servers retained by supervised attorney, such retention shall be done, unless state law mandates use of Sheriffs/Constables.

B. For private process servers, all process to be served on individuals is to be served within five (5) business days of placement of documents and pleadings with the process server. If not so served, then LPM expects to be presented with a request for alternative methods of service, such as a motion for posting and mailing.

C. For state-mandated process servers, the timeline is the customary time frame for service on individuals (i.e. in Pennsylvania, uniformed state officers must serve the process and are allowed by state law 30 days for same).

D. While the service of process on individuals is an attorney-managed function, the placement of documents for service is an attorney-controlled function. Thus, the placement of the documents for service is controlled by Part I, Section C, and should be placed by no later than the first business day the documents can be placed for service.

Filing of Documents with the Court:

A. The documents shall be sent for filing with the Court within one (1) business day of the first date possible for such filing.

B. Actual filing dates will depend on the method used to file the particular document with the court. LPM prefers use of a courier service (most process service firms provide this service for a fee) for critical documents which can be picked up and returned the same day. If this level of service involves additional costs, please contact LPM for approval of such costs.

Picking up Documents from the Court:

A. If practicable, documents are to be picked up within one (1) business day of availability. The key in picking up documents is to not prevent the next step from taking place because a document is sitting in a clerk's "out" box. If the next step is not impacted, this performance standard does not apply.

B. If the documents are being mailed back by the court clerk AND the court clerk allows for pick up of the documents AND that pick up will save more than two days of timeline, and then please call LPM to discuss the additional cost of pick up.

Continuances:

Supervised attorney is given the authority to continue hearings and trials. In some instances, the trial court procedure will require a continuance. Continuances should be granted only for cause, and which cause should be explained to LPM at the time the continuance is reported to LPM. All continuances are to be for the shortest time practicable under the circumstances. In most jurisdictions, continuances over 30 days should be done only on LPM approval.

Follow-Up with Courts & Clerks on Submitted Documents and Matters:

Weekly, unless a reason exists to do such follow ups less frequently. LPM understands that frequently contacting a Court Clerk or a Judge for a discretionary ruling or document process can sometimes be counter-productive. If less than weekly contact is recommended by the supervised attorney, please contact LPM to explain the reasons and the suggested follow-up schedule.

The EBMS allows the use of data to set action standards, particularly AME action standards. As an attorney does not control an AME, but simply manages it, data will be extremely helpful in setting an AME action standard. Thus, data on how long it has taken to obtain an Order to Post for service of a summons and complaint in Philadelphia, Pa. should be used to set the performance standard for that AME.

An EBMS can allow for flexibility in setting Reporting and Action standards. Some clients may demand very strict Reporting response standards or wish to set differing actions standards for the various AMEs or ACEs. EBMS design allows for different clients to set different standards and allow the LPM to administer those differing standards.

Referring again to FIG. 39, in one embodiment RISK MINIMIZATION module 3903 includes a TIMELY AND COMPETENT EVENT COMPLETION module 3908, AN IDENTIFY AND RESOLVE NON-SIEA LEGAL ATTACKS MODULE 3909, and an ASSURANCE NO LEGAL RISK CREATED BY SIEA MODULE 3910. In one embodiment, the TIMELY AND COMPETENT EVENT COMPLETION module 3908 acts to minimize the total time T to complete an SIEA. The minimization of T reduces the risk inherent to time: additional claims carry cost, damage to the property, and the like.

Figure 41:
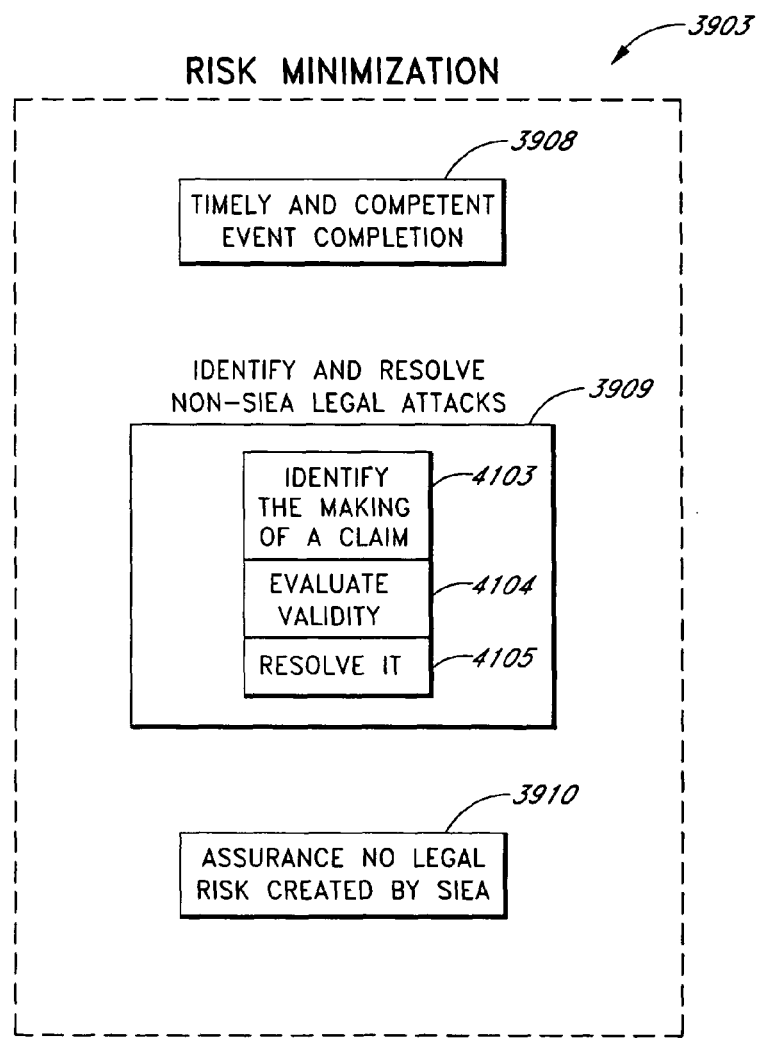
FIG. 41 shows a Risk Minimization module.

In one embodiment, the IDENTIFY AND RESOLVE NON-SIEA LEGAL ATTACKS module 3909 acts to reduce the legal liability claimed for conduct outside the particular SIEA. For example, the occupant in a post foreclosure eviction claims that the foreclosing lender engaged in fraudulent and illegal practices in originating and servicing the loan. Such a claim does not arise out of the post-foreclosure eviction, and in most jurisdictions, cannot be raised as a defense to it. Such a claim, however, can give rise to significant liability to the foreclosing lender if the LPM 18 proceeds to evict the occupant without investigating and evaluating the grounds for the claim. This process is illustrated in FIG. 41. RISK MINIMIZATION module 3903 can contain three modules including a TIMELY AND COMPETENT EVENT COMPLETION module 3908, an IDENTIFY AND RESOLVE NON-SIEA LEGAL ATTACKS module 3909, and an ASSURANCE NO LEGAL RISK CREATED BY SIEA module 3910. The IDENTIFY AND RESOLVE NON-SIEA LEGAL ATTACKS module 3909 can also contain three modules, an IDENTIFY THE MAKING OF A CLAIM module 4103, an EVALUATE VALIDITY module 4104, and a RESOLVE IT module 4105. The IDENTIFY THE MAKING OF A CLAIM module 4103 identifies the making of a non-SIEA legal attack. The EVALUATE VALIDITY module 4104 automatically, or with assistance, manually evaluates non-SIEA legal attack. The RESOLVE IT module 4105 then takes steps to resolve the SIEA.

In one embodiment, the ASSURANCE NO LEGAL RISK CREATED BY SIEA module 3910 minimizes risks in the SIEA in question within the context of all the processes actually used by the client at the stage of the forced collateral liquidation process. These issues are generally specific to the SIEA in question and the client internal processes. As to being SIEA specific, the same risks present in a post-foreclosure eviction are not present in a foreclosure action. For example, the federal Fair Debt Collection Practice Act applies to foreclosures but does not apply to post-foreclosure evictions. The same applies to client internal processes. In addition, some clients will negotiate sales of foreclosed property to the occupants while the post-foreclosure eviction is being prosecuted. Should such a client actually close a sale to an occupant, the client will not wish to evict the owner. If the client does not sell to occupants while the post-foreclosure eviction is being prosecuted, the eviction after sale is not a risk that needs be addressed by the LPM 18.

Referring again to FIG. 39, in one embodiment, the QUALITY CONTROL module 3202 can evaluate how well an attorney or performs the legal services of completing a particular SIEA on an event by event basis, and/or after completion. By using different action standards for ACEs and AMEs, the LPM 18 is able to evaluate both the timeliness and effectiveness of an attorney's handling of an SIEA. ACE action performance can be tracked through the "hybrid" EBMS tracking system. Because of the inherent nature of an ACE, to track performance of an ACE is to evaluate compliance.

In one embodiment, an EBMS can evaluate an AME based on data for similar AMEs in that, or similar jurisdictions. AMEs whose completion time exceeds the assigned t can then be viewed on a case-by-case basis. In some embodiments, if an LPM 18 or client wish, the initial review for all cases where t exceeds the allowable figure by less than a given number is reviewed by lower staff and is escalated when t exceeds the threshold for management review. In such a system, for example, if t for completing the event OBTAIN A POST AND MAIL ORDER in Philadelphia, Pa. is 20 days, and that event is not completed by the $21^{st}$ day, then the LPM staff are responsible for resolution until the $27^{th}$ day. If it is not resolved by the $27^{th}$ day, the file is then moved to an LPM manager for review and resolution. This type of system can be implemented and controlled by weekly quality control reports.

By differentiating between an ACE and an AME, an EBMS can provide an effective and pro-active quality control for evaluation of attorney performance, both during the actual SIEA process and after completion. The impact of AMEs can be estimated, and a variety of parameter estimation techniques exist for precisely this purpose, including simple means, OLS, GLS, 2SLS, ML, MCMC, and Bayesian methods. The estimated time to complete a managed event will henceforth be referred to as $\tau$.

In one embodiment, the ASSURANCE OF NO LEGAL RISK CREATED BY SIEA module 3910 first identifies legal claims originating outside the SIEA. There are many sources of legal risk that originate outside of the SIEA. A source of legal risk for clients includes a legitimate claim for conduct which occurred prior to the SIEA being pursued, for example an attack on the validity of the foreclosure sale. If such a claim is made during a post-foreclosure eviction, an EBMS can have a system in place which identifies the making of the claim; evaluates the validity of such a claim; and proceeds to resolve it.

In one embodiment, claim evaluation can be done on a case-by-case basis. If the evaluation shows the claim has potential merit and provides legal exposure to the client, then the LPM 18 can invoke a client specific set of procedures. Once again, how a client wishes to respond to such a claim can be decided on a case-by-case and client-by-client basis. If the evaluation shows the claim lacks merit or client decision is to proceed with the post-foreclosure eviction, then the opposition to the eviction can be an event trigger and can be managed accordingly. For example, opposition to a post-foreclosure eviction based on the claim of invalidity of foreclosure sale can be treated as a type of opposed eviction, with the opposition being assigned a t.

In one embodiment, the client, on a weekly or daily basis, sends the LPM 18 a complete list of all files that the client's database shows are in eviction status. The LPM then reconciles the client's data set with the set of files that the LPM shows it has in eviction status for that client. This ensures that the LPM's 18 list of files in eviction matches the client's list, which avoids legal risk in having the LPM 18 go forward on files the client has removed from eviction status. Some reasons for removal from eviction status are: sale to occupant; foreclosure sale vacated and file removed to redo foreclosure sale; foreclosure sale voided by pre-sale bankruptcy, file moved to client Bankruptcy Department; or file transferred to client Litigation Department due to ongoing litigation. In many instances, the client will sell or transfer a property and not advise either the LPM 18 or the eviction attorney. This report prevents the LPM 18 from proceeding with files that it should have closed due to non-eviction related conduct.

This reconciliation also has the added bonus of identifying for the client all the properties that the LPM 18 knows are vacant but the client still has in active eviction status. Thus, the client is assured that files are moved quickly from eviction status to marketing status so as to avoid any delays in the sale of that asset.

In one embodiment, the EBMS can provide a system to alert other parties involved in the SIEA to place a hold on the SIEA. For example in a post-foreclosure bankruptcy, in addition to mandating the obtaining of a Relief from Stay Order to proceed with a post-foreclosure eviction, the filing of a post-vesting Bankruptcy stays the client related Loss Mitigation efforts. In a post-foreclosure eviction context, all clients engage in loss mitigation while the eviction is being processed. Loss mitigation normally consists in contacting the occupant to negotiate a voluntary vacate in exchange for a cash payment. This process is run concurrently with the eviction process and is normally performed by third parties not managed by the LPM 18.

In one embodiment, if a client or its representative contact an occupant of foreclosed property after that occupant has filed bankruptcy, even in a Loss Mitigation context, that contact is a violation of the automatic stay and can result in legal exposure to the client. To minimize the risk of the client or a third party violating the automatic stay with Loss Mitigation efforts, it is necessary for the LPM 18 to broadcast a "hold" on all loss mitigation efforts to both the client and the third party responsible for the loss mitigation. In one embodiment a special screen is provided in the online EBMS which alerts all parties as to the filing. FIG. 42 illustrates the screen on which a post-foreclosure bankruptcy filing is communicated to the EBMS. The screen 4201 includes date entry 4202, type entry 4203, update entry 4204, and submit button, 4205.

The LPM 18 or the attorney can supply the pertinent information in the update field 4204 and then push the submit button 4205 to upload the update. This filing of the bankruptcy and the need for all parties to cease contract with the Borrower and all legal process can then be emailed to all affected parties. Giving this notice can then be listed in an appropriate notes field of the online database application.

Many clients run their Loss Mitigation efforts concurrent with the post foreclosure eviction. Post-foreclosure eviction Loss Mitigation is called "Cash for Keys". Under this type of program, the client offers to pay the occupant if the occupant will voluntarily vacate the foreclosure realty by an agreed date. In one embodiment, a provision is placed in all Cash for Keys Agreements under which (1) the eviction continues but (2) the client agrees not to proceed to lock out after the agreed vacate date. A "lock out" is the forcible removal of the occupant and his property by a court officer. Under this agreement, the occupant is given to a date certain, such as 10/15, to vacate the property. If the occupant vacates by 10/15, then the client will pay the agreed sum; if the occupant fails to vacate by 10/15, then the client can hopefully lock out on 10/16. The key understanding is that no lock out can occur prior to the agreed vacate date. In this example, if the client were to proceed to lock out prior to 10/14, then the client would be liable for breach of contract damages. The goal is to have the lock outs set for the day after the agreed vacate date.

Thus, the LPM 18 needs to have a system to make certain that upon being advised of the existence of a cash for keys agreement that the LPM 18 does not allow the eviction to proceed to lock out prior to the agreed vacate date. In one embodiment, a lockout notification and tracking system is provided. A field can be provided in the database 3002 which lists all agreed cash for keys vacate dates.

One of the final steps in an eviction is a "lock out." At a lock out, the Sheriff forcibly removes any occupants and their personal property from the premises. Lock outs are usually done by court officer set appointment. For most lock outs to occur, the court officer requires that a client representative be at the property at the date and time set by the court officer. In most jurisdictions, the failure of a client representative to be present at the property at the date and time set by the court officer for the lock out will result in the lock out being cancelled and the eviction process being restarted from the beginning. Thus, an entire post-foreclosure eviction can be lost if the client representative fails to attend the lock out.

In one embodiment, a system is provided to advise the client representative of the lock out date and time and confirm attendance at the lock out. Information useful to a client representative for a lock out confirmation includes: the date and time of the lock out; the local law enforcement contact information; the local requirements for the lock out crew, for example, the District of Columbia requires a 25 person crew for all lock outs; and the local requirements for disposal of personal property.

Figure 43:
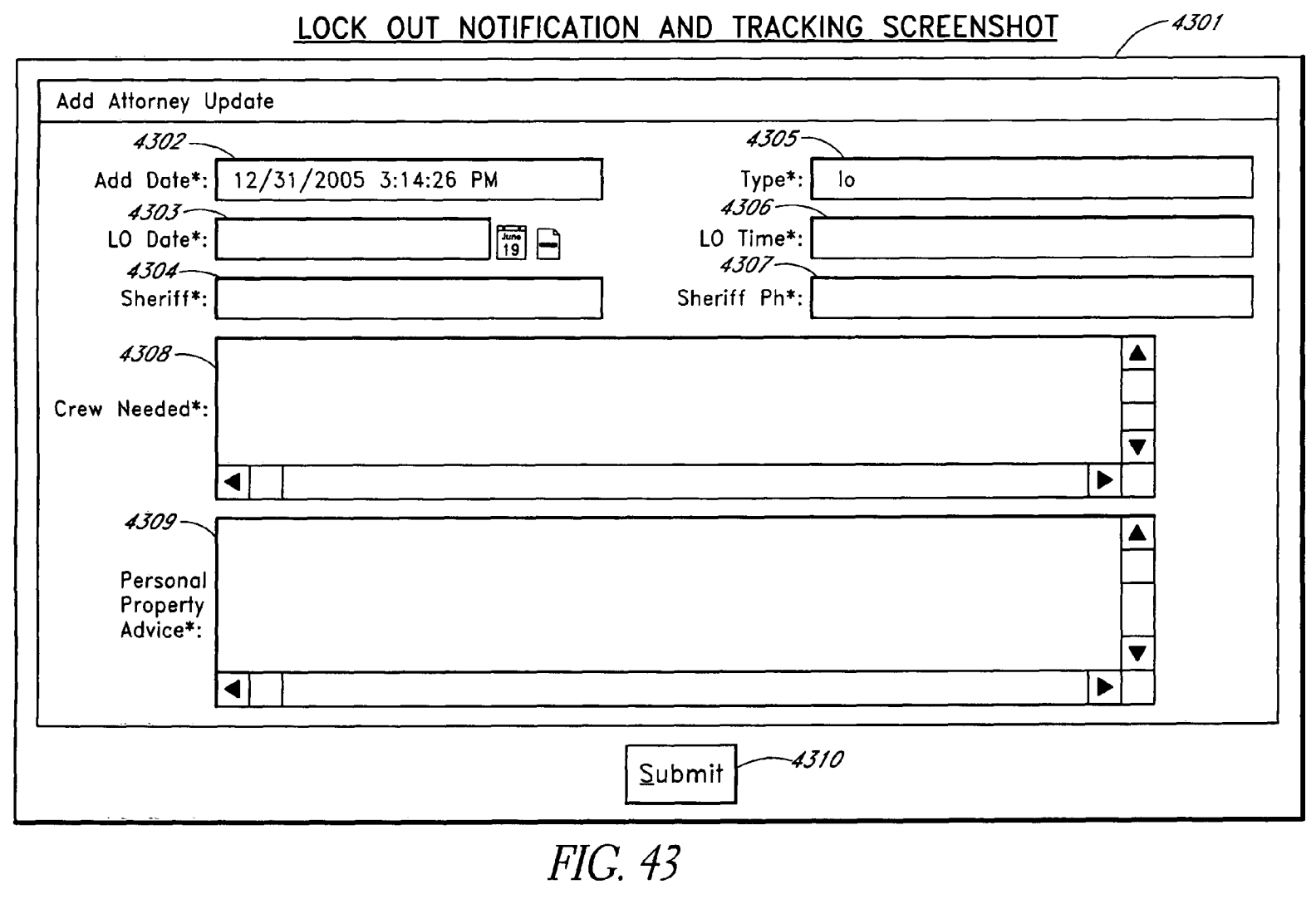

In one embodiment, for example, in the embodiment of FIG. 43, a screen is provided to assist in entering information useful to client representatives at a lock out. The local attorney or LPM staff can fill out the screen and send the information to the database 3002. Lock out screen 4301 includes add date field 4302, lock out date field 4303, sheriff field 4304, type field 4305, lock out time field 4306, sheriff phone number field 4307, crew needed field 4308, personal property advise box 4309, and submit button 4310. Access to this form can be provided to the attorney via a drop down menu. Once the attorney completes the form, then the attorney can click the "submit" button and the information contained in the lock out notification screen can be emailed to the client assigned party responsible for the lock out, to the client, to the LPM 18, or to any other person designated by the client or the LPM 18. If any party receiving email notification has a separate database with fields for this information, this information can then be automatically downloaded into that database. In one embodiment, the automatic lock out notification is confirmed manually by a phone call, fax, or email confirmation.

One of the greatest sources of legal risk in post-foreclosure eviction is disposal of personal property. In order to combat this risk, in some embodiments, a Personal Property Advice Box is provided. An exemplary web page of a Personal Property Advice Box 4401 is shown in FIG. 44. The web page 4401 includes an Add Date interface 4402, a Lock Out Date interface 4403, a Sheriff identity interface 4404, a Lock Out Type interface 4405, a Lock Out Time interface 4406, and a Sheriff Phone Number interface 4407, each of which allows the user to enter information relating to the lock out. The web page 4401 further includes a Crew Needed interface 4408 and a Personal Property Advice interface 4409, each of which allows the user to enter information relating to the lock out. The web page 4401 further includes a Submit Button 4410, which allows the user to submit the information entered through the various interfaces discussed above. In this system, the client assigned party responsible for personal property disposal can log onto an online system and be advised of the recommend method for disposal of personal property. How to dispose of personal property remaining at lock out can be supplied by the personal property advice box included as part of the lock out notification screen.

Two types of personal property confronted in a post-foreclosure eviction are untitled and title motor vehicles. The Personal Property Advice Box can be used for both types. In one embodiment, two components make up the Personal Property Advice Box. These are a table which contains the law of personal property disposal, jurisdiction by jurisdiction, and a way to access this information online or via email. Disposal of untitled personal property can vary depending on whether or not the personal property is disposed of prior to commencement of eviction process, during the eviction process, or at lock out.

Using the information in the database 3002, the Reporting Module 3203 provides the Personal Property Advice Box 4401 with the recommended method for disposal of personal property at the various stages of the post-foreclosure eviction process. The database 3002 preferably includes information on the jurisdictional requirements for the disposal of personal property in all possible circumstances, including the termination of a landlord/tenant relationship, an involuntary transfer of title, and a voluntary transfer of title.

The database 3002 also preferably includes information on the jurisdictional requirements for the disposal of untitled personal property depending on whether or not the personal property is disposed of prior to commencement of the eviction process, during the eviction process, or at lock out. The LPM staff or the assigned attorney may be given editing rights to modify this "default" based on the circumstances of each particular case. These screens may be made available online for use during the eviction process or at lock out. This system may also be used at the pre-lock out stages of the eviction process. In one embodiment, an attorney licensed in the state in question approves this disposal method on a case-by-case basis prior to the recommendation being sent to the client.

Reports

Figure 37:
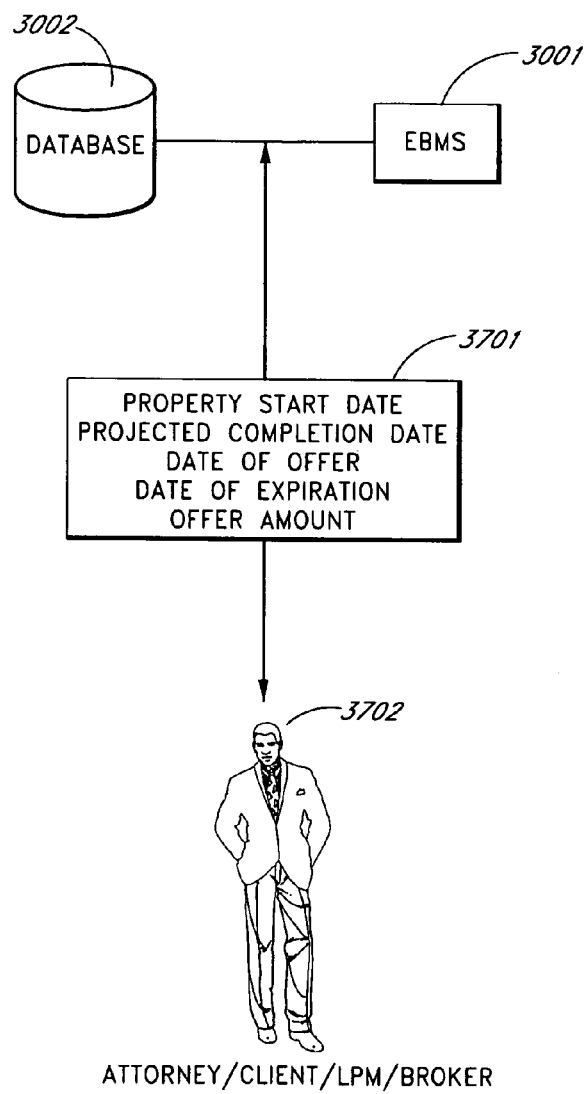
FIG. 37 shows a Reporting System of a SIEA.

In some embodiments, an EBMS is configured to allow for reports to be generated including information on completion date, performance evaluation, and default impact. An example of such a report and reporting system is illustrated in FIG. 37. EBMS module 3001 communicates with DATABASE 3002 in order to create a REPORT 3701, which is communicated to the ATTORNEY, CLIENT, LPM, OR BROKER 37. The report can include any pertinent information such as the date the property entered the SIEA system, the projected completion date, the date the last offer was made, the date of the expiration of the last offer and the last offer amount. Other information may also be included such as a recommended offer amount for a new offer, or a recommended offer date for a new offer.

Completion date refers to the date that a given case is expected to be completed in a given jurisdiction. This type of report can be based on a fixed frequency set of events plus other events as such occur. Or this type of report can be based on the estimated likelihood of trigger events or random events occurring in the SIEA based on the data showing event occurrence for the type of SIEA in the given jurisdiction and the type of asset class and borrower class.

The estimated date of completion is important to client Loss Mitigation efforts. For example, in a post foreclosure eviction, the time estimated to complete the eviction process can be used to set the amount of the Cash for Keys Offer. Thus, T is of significant value to these efforts. In one embodiment, as other events not accounted for in the set of fixed frequency events occur, then an EBMS can provide realistic projections of T based on what actually occurs in a case. For example, the T of a post-foreclosure eviction in Pittsburgh, Pa. is set at 120 days. If the occupant dodges service, then an order to post and mail is required. This event trigger is an AME not included in the initial estimate of T. If one assumes the $\tau$ for that AME is 22 days, then the correct estimation of the completion of the post-foreclosure eviction would be 142 days, being the sum of T+$\tau$. This type of information could be listed in a report available to the client online or submitted at client set intervals to the client.

The structure of these reports can vary. In one embodiment, the report is emailed in a spreadsheet format when a file is opened or the projected completion date is modified by an event occurrence. In one embodiment, it can be available online and show changes and the reasons for changes. In one embodiment, it can be included as part of a data calculator which sets the cash for keys offer. For example, assuming the clients assigned cost for carrying this property is set at $20 per day and cost to lock out is set at $1,000. The report can include a client approved cash for keys offer which could adjust over time.

An EBMS allows for a more sophisticated report. In one embodiment, an EBMS calculates the likelihood of the occurrence of events in addition to the fixed frequency events and the estimated impact of those events on T. The EBMS calculation can be built using a variety of estimation techniques and statistical software. Using the estimation technique, a cash for keys offer can be calculated at the beginning of the eviction process based on the statistically modeled likely completion date. Projected completion dates for SIEA are used regularly in valuing the loans which are secured by the assets. These projections include the likelihood of default, the time to complete an SIEA, and the estimated net value of the collateral at liquidation. The reports generated by an EBMS can be used for such estimations. These values can include more accurate estimates of the time to complete the fixed frequency events, as all AMEs would be based on τ, and to complete the entire SIEA based on the frequency of occurrence of events other than the fixed frequency event set.

In one embodiment, a variety of reports can be generated to evaluate the in process progress of a case. The reports can track how timely an attorney is reporting, how timely and competently an attorney is completing the SIEA legal process, or both. The most critical reports can list the cases which are exceeding t for an assigned event or series of events. The report can be based on the events that actually occur as such occur. In some embodiments, a report card is generated using the EBMS, which evaluates performance based upon specific case details. For example, an EBMS may assess performance on case with four external process triggers differently than a case in which no external process triggers occurred.

The EBMS report card can be based on the reporting and action standards of the LPM or client. The attorney can be graded on how well the attorney meets the mandatory reporting dates and/or how timely and competently the attorney actually performed the legal services in question. Normally, a letter or number grade is given by report cards. The EBMS can allow for accurate grading based on how much time the attorney took to complete ACEs and/or how well the attorney managed AMEs.

The EBMS can also provide a conversion report that displays both a conventional industry report and an EBMS report card. Other embodiments of a conversion report can include aggregate time (T) or step milestone (t). In such conversion reports, cases which exceed T could be listed while giving the reason, and all cases which have milestone which exceed t could be listed, giving the reasons. Conversion reports are useful to help industry players understand EBMS reports.

Various systems and methods that employ the stochastic modeling of SIEA's described above will now be discussed in connection with FIGS. 46 through 54.

Assessing Time for Completion of an SIEA

Figure 45:
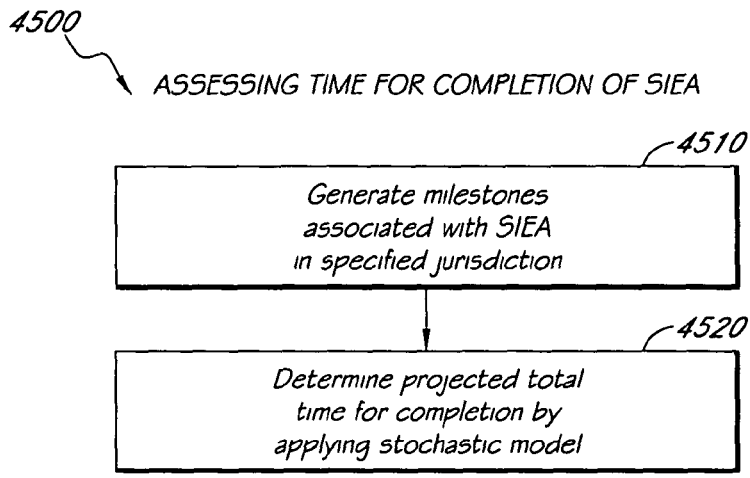
FIG. 45 shows a method associated with assessing the time for completion of a security interest enforcement action.

FIG. 45 illustrates a method 4500 for one embodiment for assessing the time required for completing an SIEA. The method 4500 applies generally, and may be used before the beginning of an SIEA, or at any point during the prosecution of the SIEA. In a first step 4510, milestones are generated for the particular type of SIEA being prosecuted within the specified jurisdiction in which the SIEA is being prosecuted. In a second step 4520, a total projected time is determined for completion of the SIEA by applying a stochastic model. In the preferred embodiment, the stochastic model discussed at length above is used. One of ordinary skill in the art would appreciate that other stochastic models could be used.

Figure 46:
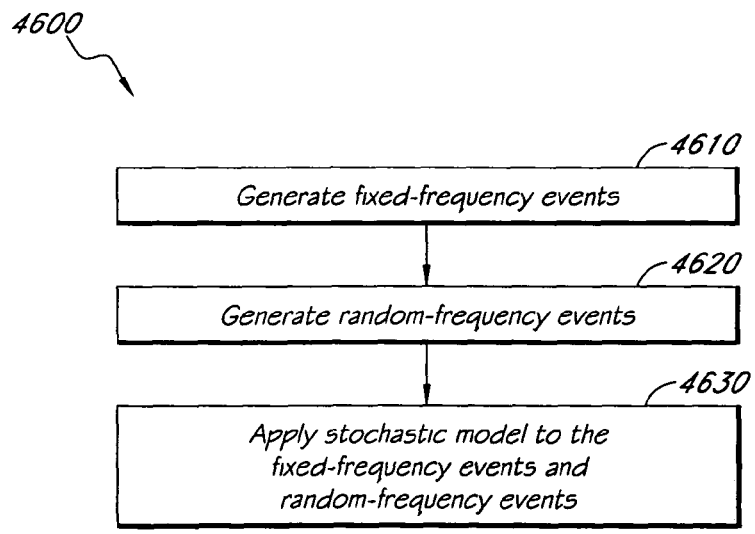
FIG. 46 shows a method associated with assessing the time for completion of a security interest enforcement action.

FIG. 46 illustrates a method 4600 associated with one embodiment for determining the time required for completing an SI EA. The method 4600 includes a first step 4610, in which fixed-frequency events are generated for milestones associated with the SIEA being prosecuted. In a second step 4620, random-frequency events are generated for milestones associated with the SIEA being prosecuted. In practice, the steps 4610, 4620 may be conducted in either order or in parallel. The events may include "managed events" (as defined and discussed above) having projected durations determined from statistical analysis on historical data on the actual durations associated with the events. The events may further include "controlled events" (as defined and discussed above) having projected durations determined from procedural requirements for the SIEA in the specified jurisdiction, court, etc. In a third step 4630, the stochastic model of method 4500 is applied to the fixed-frequency and random-frequency events generated in the first and second steps 4610, 4620. That stochastic model preferably includes summing the projected durations associated with the fixed-frequency events and summing, for the random-frequency events, a projected duration for the random-frequency event multiplied by a weighting factor associated with the random-frequency event, wherein the weighting factor is a measure of the likelihood of occurrence of the random-frequency event. Preferably, the likelihood of occurrence of random-frequency events is determined from statistical analysis on historical data of the occurrence of such events. In a preferred embodiment, the summing of durations is performed using the mathematic model set forth above in Equations 1, 2, and 3. In a preferred embodiment, the method 4600 further includes "event triggers" (as defined and discussed above) that generate additional fixed-frequency events and/or random-frequency events associated within a milestone. In a preferred embodiment, the method 4600 also includes event triggers that generate additional milestones associated with the SIEA.

Figure 47:
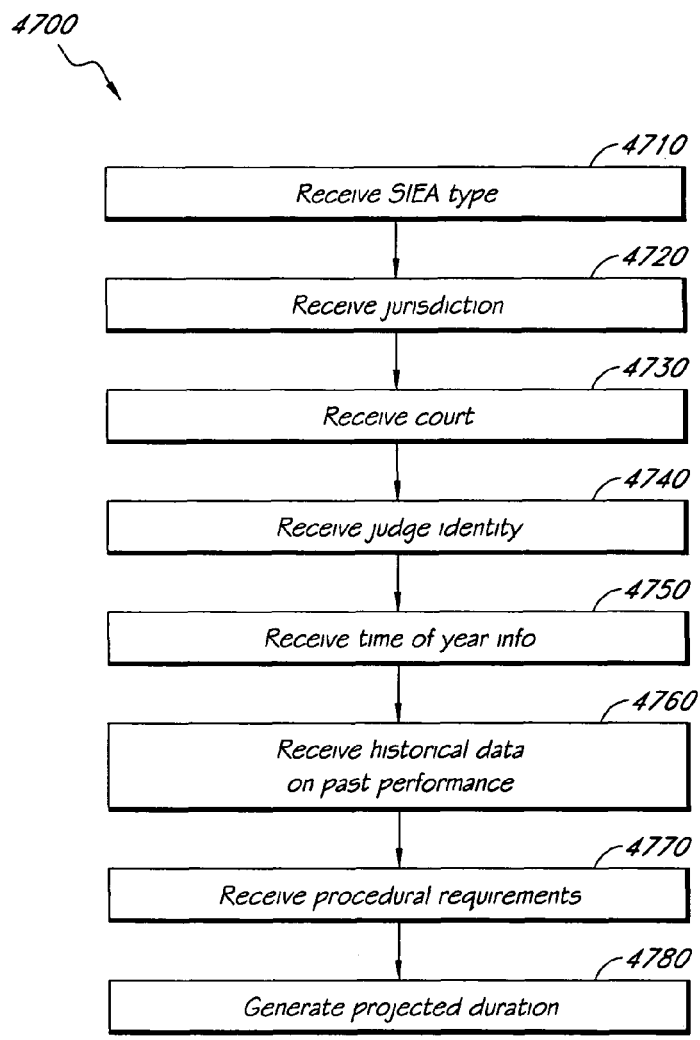
FIG. 47 shows a method associated with assessing the time for completion of a security interest enforcement action.

FIG. 47 illustrates a method 4700 associated with one embodiment for determining the time required for completing an SIEA. The method 4700 includes a first step 4710, in which the type of SIEA being prosecuted is identified. For example, one type of SIEA is a post-foreclosure eviction action. In a second step 4720, the specific jurisdiction in which the SIEA is being prosecuted is identified. For example, the specific jurisdiction may be a state, such as California. In a third step 4730, the specific court in which the SIEA is being prosecuted is identified. For example, a specific court may be Santa Clara Superior Court, in San Jose, Calif. In a fourth step 4740, the specific judge in which the SIEA is being prosecuted is identified. For example, the judge may be identified as Judge Joseph J. Jones of Santa Clara Superior Court. In a fifth step 4750, the time of year in which the SIEA is being prosecuted is identified.

In a sixth step 4760, historical data on past performance of the prosecution of SIEA's is retrieved. The historical data retrieved in the sixth step 4760 may be filtered to take into account one or more of the following limitations: (1) the type of SIEA being prosecuted; (2) the jurisdiction within which the SIEA is being prosecuted; (3) the court within which the SIEA is being prosecuted; (4) the judge presiding over the SIEA being prosecuted; and/or (5) the time of year that the SIEA is being prosecuted. The historical data includes information on the durations associated with events associated with the SIEA. The duration information may include, for each event, statistical measures including but not limited to a mean duration value, a median duration value, a mode duration value, and a standard deviation value. The duration information may also include a histogram of historic duration values. These statistical measures may be filtered by jurisdiction, judge, etc. as discussed above. This historical information is particularly useful for projecting durations for managed events, for which the prosecuting attorney does not have direct control.

In a seventh step 4770, information on procedural requirements associated with prosecution of the SIEA is retrieved. These procedural requirements are associated with the statutes, procedural rules, etc. associated with the legal process. As such, these requirements depend on the SIEA type and the specific jurisdiction retrieved in the first and second steps 4710, 4720. Some requirements may also depend upon the specific court identified in the third step 4730 (because of local rules specific to different courts). Some requirements may also depend upon the specific judge identified in the fourth step 4740 (because of local rules specific to different judges). Some requirements may also depend upon the time of year information retrieved in the fifth step 4750 (because of Court closings for holidays, etc.). The seven steps discussed above need not be done in any particular order. Likewise, the steps may be done in parallel or in series. Further, in some embodiments, not all seven steps are utilized.

In an eight step 4780, the information retrieved in the first through seventh steps 4710-4770 is applied in step 4630 to the fixed-frequency and random-frequency events using the stochastic model described at length above.

Managing Completion of an SIEA

Figure 48:
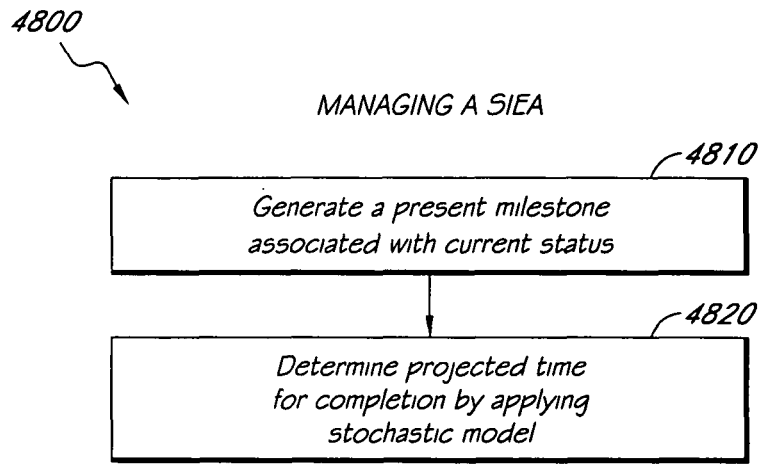
FIG. 48 shows a method associated with managing a security interest enforcement action.

FIG. 48 illustrates a method 4800 for one embodiment for managing the completion of an SIEA. The method 4800 applies generally, and may be used at any point before or during prosecution of a SIEA. In a first step 4810, the next milestone to be completed is generated for the particular type of SIEA being prosecuted within the specified jurisdiction in which the SIEA is being prosecuted. In a second step 4820, a projected time is determined for completion of the milestone by applying a stochastic model. In the preferred embodiment, the stochastic model discussed at length above is used.

The method of FIG. 46 (discussed above) may be used to determine the projected duration for completing the next milestone within method 4800. That is, the method 4800 may include the first step 4610, in which fixed-frequency events are generated for the milestone at issue. In the second step 4620, random-frequency events are generated for the milestone at issue. In practice, the steps 4610, 4620 may be conducted in either order or in parallel to determine the duration for completion of the next milestone. In the third step 4630, the stochastic model discussed at length above is applied to the fixed-frequency and random-frequency events generated in the first and second steps 4610, 4620.

The method of FIG. 47 (discussed above) may also be used to determine the projected duration for completing the next milestone within method 4800. That is, the determination of a projected duration preferably takes into account the type of SIEA being prosecuted (identified in first step 4810), the specific jurisdiction in which the SIEA is being prosecuted (identified in second step 4720), the specific court (identified in third step 4730), the specific judge (identified in fourth step 4740), and the time of year (identified in fifth step 4750). The determination of a projected duration also preferably takes into account historical data on past performance of the prosecution of SIEA's (retrieved in sixth step 4760). The determination of a projected duration also takes into account information on procedural requirements associated with prosecution of the SIEA in the specific jurisdiction (retrieved in seventh step 4770). The information retrieved in the first through seventh steps 4710-4770 is applied to the fixed-frequency and random-frequency events of the milestone at issue using the stochastic model described at length above.

Figure 49:
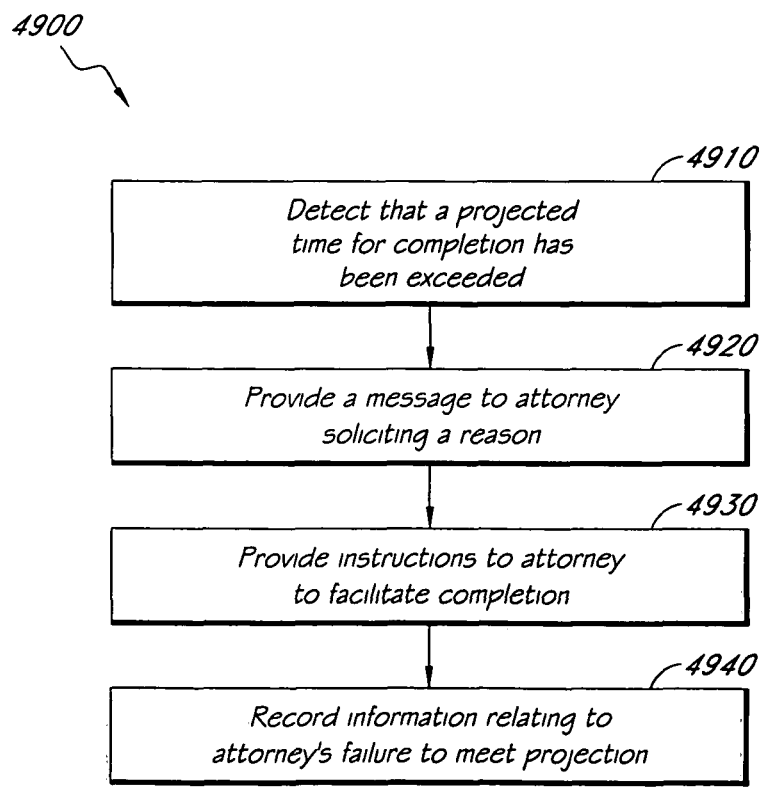
FIG. 49 shows a method associated with managing a security interest enforcement action.

FIG. 49 illustrates an optional method 4900 that may be used to facilitate management of the SIEA. In a first step 4910, a missed deadline is detected when an attorney fails to indicate completion of a milestone by a projected time for completion. In a second (optional) step 4920, the system provides a message to the attorney soliciting a reason for the missed deadline for the milestone. In a third (optional) step 4930, the system provides instructions to the attorney to facilitate completion of the milestone. In a fourth (optional) step, information relating to the attorney's failure to meet the projected deadline is recorded.

Assessing Attorney Performance in Completing SIEA's

Figure 50:
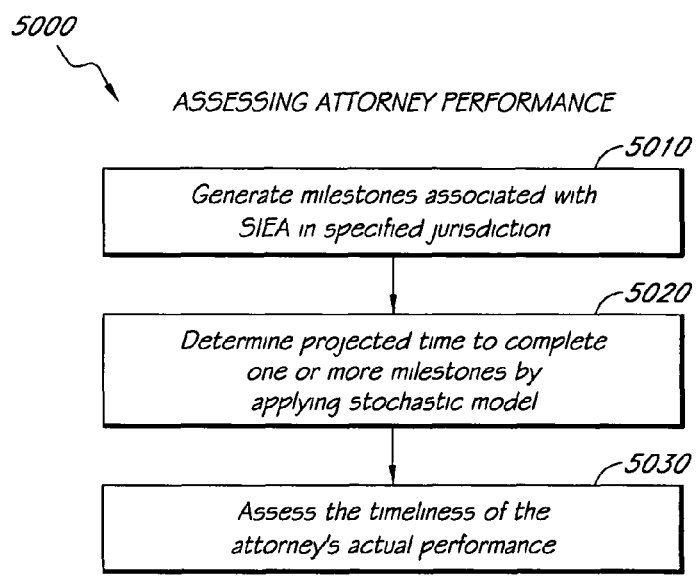
FIG. 50 shows a method associated with assessing attorney performance in the prosecution of a security interest enforcement action.

FIG. 50 illustrates a method 5000 for one embodiment for assessing attorney performance in prosecuting SIEA's. The method 5000 applies generally, and may be used at any point before or during prosecution of a SIEA, and may be used on multiple SIEA's handled by an attorney (in parallel and/or in series). In a first step 5010, one or more milestones and/or events are generated for the SIEA's that are being, and/or have been, prosecuted by the attorney being assessed. In a second step 5020, a projected time is determined for completion of the one or more milestones and/or events by applying a stochastic model.

The method of FIG. 46 (discussed above) may be used to determine the projected durations for completing the one or more milestones and/or events within method 5000. That is, the method 5000 may include the first step 4610, in which fixed-frequency events are generated for the one or more milestone at issue. In the second step 4620, random-frequency events are generated for the one or more milestone at issue. In practice, the steps 4610, 4620 may be conducted in either order or in parallel to determine the duration for completion of the next milestone. In the third step 4630, the stochastic model discussed at length above is applied to the fixed-frequency and random-frequency events generated in the first and second steps 4610, 4620.

The method of FIG. 47 (discussed above) may also be used to determine the projected duration for completing the one or more milestones and/or events within method 5000. That is, the determination of a projected duration preferably takes into account the type of SIEA being prosecuted (identified in first step 4810), the specific jurisdiction in which the SIEA is being prosecuted (identified in second step 4720), the specific court (identified in third step 4730), the specific judge (identified in fourth step 4740), and the time of year (identified in fifth step 4750). The determination of a projected duration also preferably takes into account historical data on past performance of the prosecution of SIEA's (retrieved in sixth step 4760). The determination of a projected duration also takes into account information on procedural requirements associated with prosecution of the SIEA in the specific jurisdiction (retrieved in seventh step 4770). The information retrieved in the first through seventh steps 4710-4770 is applied to the fixed-frequency and random-frequency events of the milestone at issue using the stochastic model described above.

Referring to FIG. 50, in a third step 5030, the attorney's timeliness is determined by comparing the attorney's actual performance (i.e. times of completion) for the one or more milestones and/or events to the projected times of completion (calculated using the stochastic model). The attorney's timeliness may be quantified in a number of ways including but not limited to (1) determining the percentage of milestones or events completed by the attorney on or before the projected deadline; (2) determining the ratio of actual time to projected time for completing individual milestones or events; (3) determining the percentage of SIEA's fully completed on or before the projected deadline; and (4) determining the ratio of actual time to projected time for full completion of the SIEA's. The timeliness may be determined separately and/or collectively for (a) different SIEA types; (b) different jurisdictions; (c) different judges; (d) controlled events and managed events; (e) fixed-frequency events and random-frequency events.

Using Past Performance to Select an Attorney to Prosecute a SIEA

Figure 51:
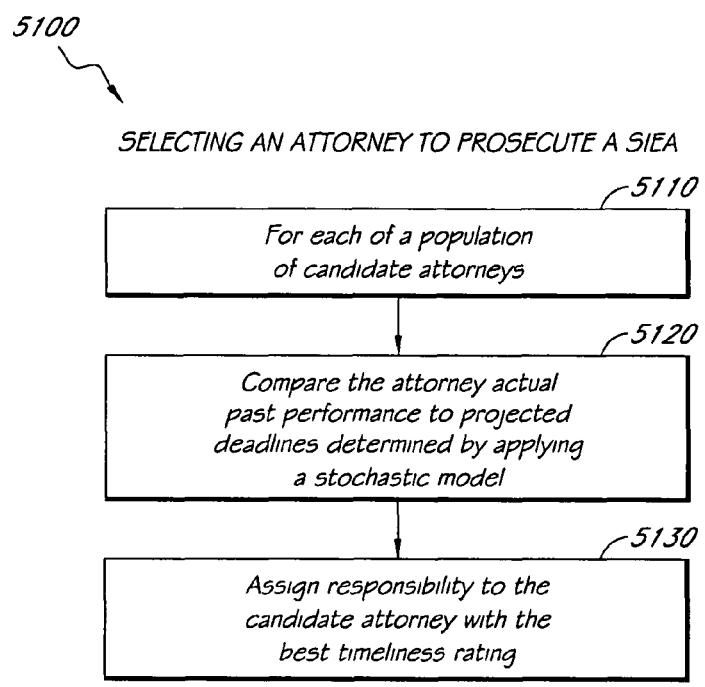
FIG. 51 shows a method associated with selecting an attorney to prosecute a security interest enforcement action.

FIG. 51 illustrates a method 5100 for one embodiment for using past performance to facilitate the selection of an attorney from a population of candidate attorneys to prosecute a SIEA. In a first attorney selection step 5110, a population of candidate attorneys is identified for consideration in prosecuting a SIEA. The population may be identified, for example, by considering all attorneys with past experience prosecuting SIEA's who are licensed to practice law in the jurisdiction in which the SIEA will be prosecuted. The population may be further limited by other criteria, such as limiting the population to attorneys who have worked previously for a given loan servicer, who have appeared in front of a particular judge, or who meet some minimum experience criteria in prosecuting the particular type of SIEA at issue. Once the population of attorneys is identified, the first step 5110 the method continues, considering each attorney individually.

In a second attorney selection step 5120, information on the attorney's past performance is received, and the attorney's performance in prosecuting SIEA's is compared to projected deadlines for those SIEA's. The method of FIG. 46 (discussed above) may be used to determine the projected durations for completing the one or more milestones and/or events within method 5100. That is, the method 5100 may include the first step 4610, in which fixed-frequency events are generated for the one or more milestone at issue. In the second step 4620, random-frequency events are generated for the one or more milestone at issue. In practice, the steps 4610, 4620 may be conducted in either order or in parallel to determine the duration for completion of the next milestone. In the third step 4630, the stochastic model discussed at length above is applied to the fixed-frequency and random-frequency events generated in the first and second steps 4610, 4620.

The method of FIG. 47 (discussed above) may also be used to determine the projected duration for completing the one or more milestones and/or events within method 5100. That is, the determination of a projected duration preferably takes into account the type of SIEA being prosecuted (identified in first step 4810), the specific jurisdiction in which the SIEA is being prosecuted (identified in second step 4720), the specific court (identified in third step 4730), the specific judge (identified in fourth step 4740), and the time of year (identified in fifth step 4750). The determination of a projected duration also preferably takes into account historical data on past performance of the prosecution of SIEA's (retrieved in sixth step 4760). The determination of a projected duration also takes into account information on procedural requirements associated with prosecution of the SIEA in the specific jurisdiction (retrieved in seventh step 4770). The information retrieved in the first through seventh steps 4710-4770 is applied to the fixed-frequency and random-frequency events of the milestone at issue using the stochastic model described above.

Referring to FIG. 51, in a third attorney selection step 5130, responsibility for prosecuting the SIEA is assigned to an attorney determined to have the best timeliness rating. The attorney's timeliness rating may be determined in a number of ways including but not limited to (1) the percentage of milestones or events completed by the attorney on or before the projected deadline; (2) the ratio of actual time to projected time for completing individual milestones or events; (3) the percentage of SIEA's fully completed on or before the projected deadline; and (4) the ratio of actual time to projected time for full completion of the SIEA's. The timeliness rating may be determined separately and/or collectively for (a) different SIEA types; (b) different jurisdictions; (c) different judges; (d) controlled events and managed events; (e) fixed-frequency events and random-frequency events.

Assessing Loan Servicer Performance in Completing SIEA's

Figure 52:
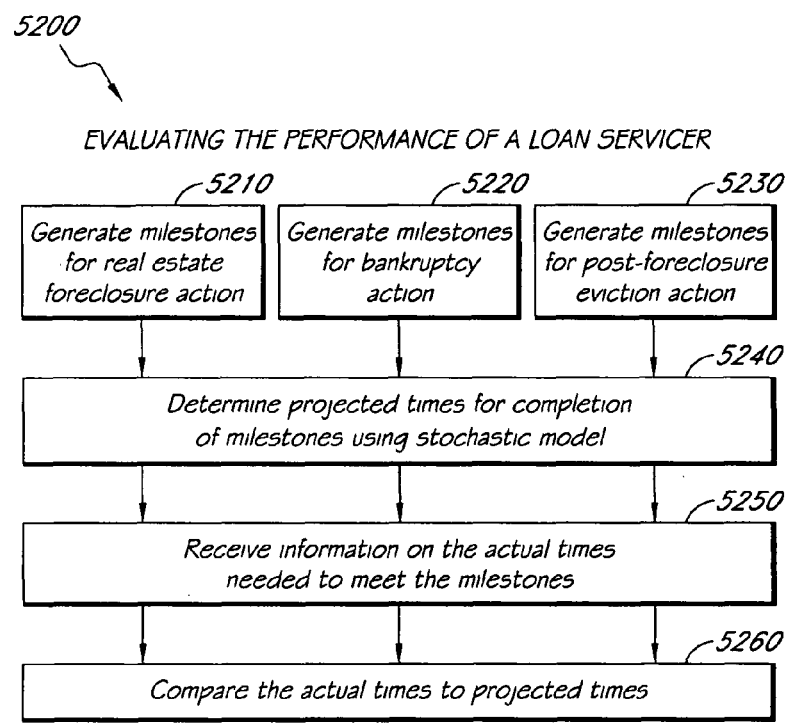
FIG. 52 shows a method associated with evaluating the performance of a loan servicer overseeing prosecution of security interest enforcement actions.

FIG. 52 illustrates a method 5200 for one embodiment for assessing loan servicer performance in overseeing the prosecution of SIEA's associated with foreclosed real estate secured by loans serviced by the loan servicer. The method 5200 applies generally, and may be used at any point before or during prosecution of a SIEA, and may be used on multiple SIEA's handled by one or more attorneys (in parallel and/or in series). There are three SIEA's that are most commonly associated with foreclosed real estate: (1) a real estate foreclosure action; (2) a bankruptcy action; and (3) a post-foreclosure eviction action. The foreclosure action is mandatory, while the bankruptcy and post-foreclosure eviction actions may or may not be necessary, depending upon the circumstances of each individual case.

In a first foreclosure step 5210, one or more milestones and/or events are generated for a foreclosure action that is being prosecuted, or was prosecuted, under the management of the loan servicer being assessed. If the real estate at issue is also associated with a bankruptcy action, the method includes a first bankruptcy step 5220, wherein one or more milestones and/or events are generated for the bankruptcy action that is being prosecuted, or was prosecuted, under the management of the loan servicer being assessed. If the real estate at issue is also associated with a post-foreclosure eviction action, the method includes a first post-foreclosure eviction step 5220, wherein one or more milestones and/or events are generated for the post-foreclosure eviction action that is being prosecuted, or was prosecuted, under the management of the loan servicer being assessed.

In a second assessment step 5240, a projected time is determined for completion of the one or more milestones and/or events of the foreclosure action and (if necessary) of the bankruptcy action and (if necessary) of the post-foreclosure eviction action. The projected times are determined by applying a stochastic model. In the preferred embodiment, the stochastic model discussed at length above is used. The method of FIG. 46 (discussed above) may be used to determine the projected durations for completing the one or more milestones and/or events within method 5200. That is, the method 5200 may include the first step 4610, in which fixed-frequency events are generated for the one or more milestone at issue. In the second step 4620, random-frequency events are generated for the one or more milestone at issue. In practice, the steps 4610, 4620 may be conducted in either order or in parallel to determine the duration for completion of the next milestone. In the third step 4630, the stochastic model discussed at length above is applied to the fixed-frequency and random-frequency events generated in the first and second steps 4610, 4620.

The method of FIG. 47 (discussed above) may also be used to determine the projected duration for completing the one or more milestones and/or events within method 5200. That is, the determination of a projected duration preferably takes into account the type of SIEA being prosecuted (identified in first step 4810), the specific jurisdiction in which the SIEA is being prosecuted (identified in second step 4720), the specific court (identified in third step 4730), the specific judge (identified in fourth step 4740), and the time of year (identified in fifth step 4750). The determination of a projected duration also preferably takes into account historical data on past performance of the prosecution of SIEA's (retrieved in sixth step 4760). The determination of a projected duration also takes into account information on procedural requirements associated with prosecution of the SIEA in the specific jurisdiction (retrieved in seventh step 4770). The information retrieved in the first through seventh steps 4710-4770 is applied to the fixed-frequency and random-frequency events of the milestone at issue using the stochastic model described above.

Referring to FIG. 52, in a third assessment step 5250 the actual times for completion of the one or more milestones and/or events is received for the foreclosure action, the bankruptcy action (if necessary) and the post-foreclosure eviction action (if necessary). In a fourth assessment step 5260, the actual times received in the third step 5250 are compared to the projected times determined in the second assessment step 5240 in order to assess the timeliness of the prosecution of the SIEA's. The timeliness is determined by comparing the loan servicer's performance (i.e. times of completion by attorneys managed by the loan servicer) for the one or more milestones and/or events to the projected times of completion (calculated using the stochastic model). The loan servicer's timeliness may be quantified in a number of ways including but not limited to (1) determining the percentage of milestones or events completed by the attorneys being managed by the loan servicer on or before the projected deadline; (2) determining the ratio of actual time to projected time for completing individual milestones or events being managed by the loan servicer; (3) determining the percentage of SIEA's fully completed on or before the projected deadline for SIEA's managed by the loan servicer; and (4) determining the ratio of actual time to projected time for full completion of the SIEA's being managed by the loan servicer. The timeliness may be determined separately and/or collectively for (a) different SIEA types; (b) different jurisdictions; (c) different judges; (d) controlled events and managed events; (e) fixed-frequency events and random-frequency events.

Valuing a Loan Secured by Real Estate Associated with a SIEA

Figure 53:
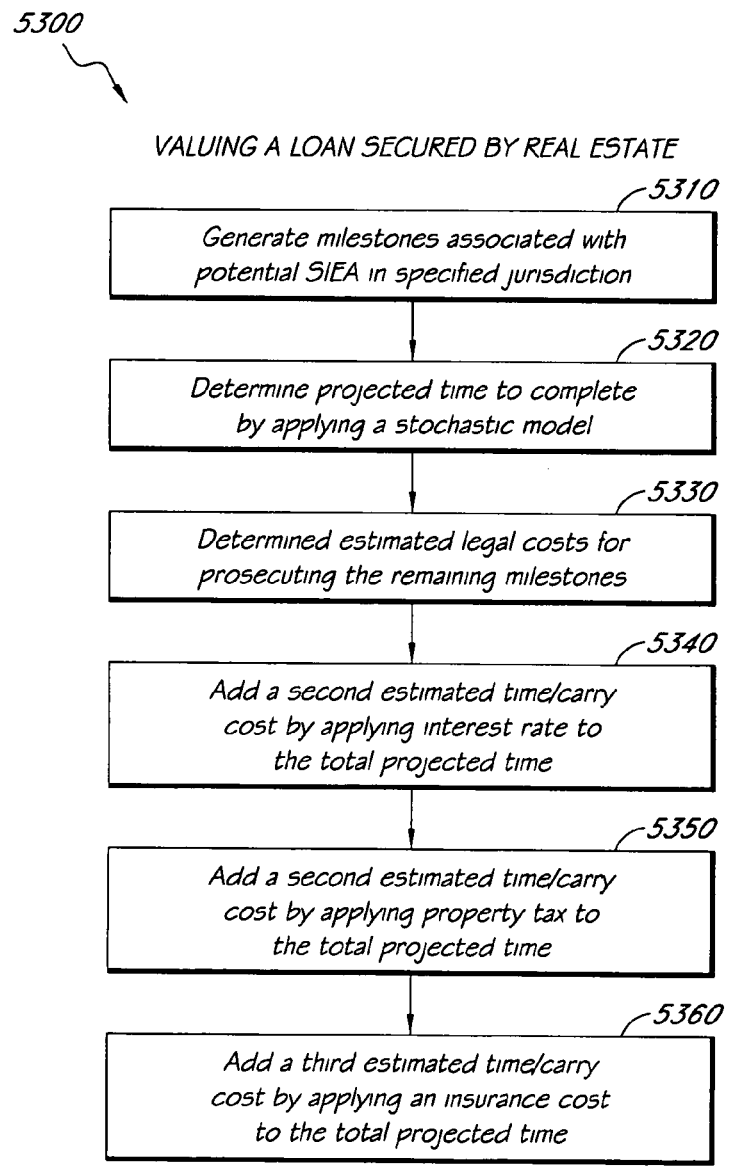
FIG. 53 shows a method associated with valuing a loan secured by real estate.

FIG. 53 illustrates a method 5300 for one embodiment for assessing the value of a loan that is securing real estate associated with one or more existing or potential SIEA's. The method 5300 applies generally, and may be used at any point before or during prosecution of the one or more SIEA's, and may be applied multiple SIEA's in parallel and/or in series. As discussed above, there are three SIEA's that are most commonly associated with foreclosed real estate: (1) a real estate foreclosure action; (2) a bankruptcy action; and (3) a post-foreclosure eviction action.

In a first loan valuation step 5310, the remaining milestones are generated for completing the SIEA's at issue. In a second loan valuation step 5320, a projected time is determined for completion of the milestones by applying a stochastic model. In the preferred embodiment, the stochastic model discussed at length above is used. The method of FIG. 46 (discussed above) may be used to determine the projected durations for completing the one or more milestones and/or events within method 5300. That is, the method 5300 may include the first step 4610, in which fixed-frequency events are generated for the one or more milestone at issue. In the second step 4620, random-frequency events are generated for the one or more milestone at issue. In practice, the steps 4610, 4620 may be conducted in either order or in parallel to determine the duration for completion of the next milestone. In the third step 4630, the stochastic model discussed at length above is applied to the fixed-frequency and random-frequency events generated in the first and second steps 4610, 4620.

The method of FIG. 47 (discussed above) may also be used to determine the projected duration for completing the milestones within method 5300. That is, the determination of a projected duration preferably takes into account the type of SIEA being prosecuted (identified in first step 4810), the specific jurisdiction in which the SIEA is being prosecuted (identified in second step 4720), the specific court (identified in third step 4730), the specific judge (identified in fourth step 4740), and the time of year (identified in fifth step 4750). The determination of a projected duration also preferably takes into account historical data on past performance of the prosecution of SIEA's (retrieved in sixth step 4760). The determination of a projected duration also takes into account information on procedural requirements associated with prosecution of the SIEA in the specific jurisdiction (retrieved in seventh step 4770). The information retrieved in the first through seventh steps 4710-4770 is applied to the fixed-frequency and random-frequency events of the milestone at issue using the stochastic model described at length above.

Referring to FIG. 53, in a third loan valuation step 5330, the legal costs are estimated for completing the remaining milestones. This may include fees associated with attorney time (hourly or flat fee) and costs (e.g., court costs, filing costs, etc.). In a fourth loan valuation step 5340, a first estimated time/carry cost is determined by applying an interest rate to the projected time determined in the second loan valuation step 5320. The interest rate may be based on standard rates (e.g. the prime lending rate), on the borrower's credit score, and/or on any other risk assessment associated with the loan at issue. This first estimated time/carry cost is added to the estimated legal costs determined in the third loan valuation step 5330.

In a preferred embodiment, the method further includes a fifth loan valuation step 5350, wherein a second estimated time/carry cost is determined by applying a property tax rate to the projected time determined in the second loan valuation step 5320. The property tax rate is determined from the requirements of the jurisdiction associated with the real estate at issue. This second estimated time/carry cost is added to the estimated legal cost and the first estimated time/carry cost determined in the third and fourth loan valuation steps 5330, 5340.

In a preferred embodiment, the method further includes a sixth loan valuation step 5360, wherein a third estimated time/carry cost is determined by applying an insurance rate to the projected time determined in the second loan valuation step 5320. The insurance rate is determined by the insurance policy(ies) associated with the real estate at issue. This third estimated time/carry cost is added to the estimated legal cost and the first and second estimated time/carry costs determined in the third, fourth, and fifth loan valuation steps 5330, 5340, 5350.

By adding together the costs discussed above, the cost of the loan due to the one or more SIEA's is determined. This cost may be used by the loan servicer to assess the value of the loan when considering the price to charge to sell the loan.

Valuing a Settlement Offer Associated with a SIEA

Figure 54:
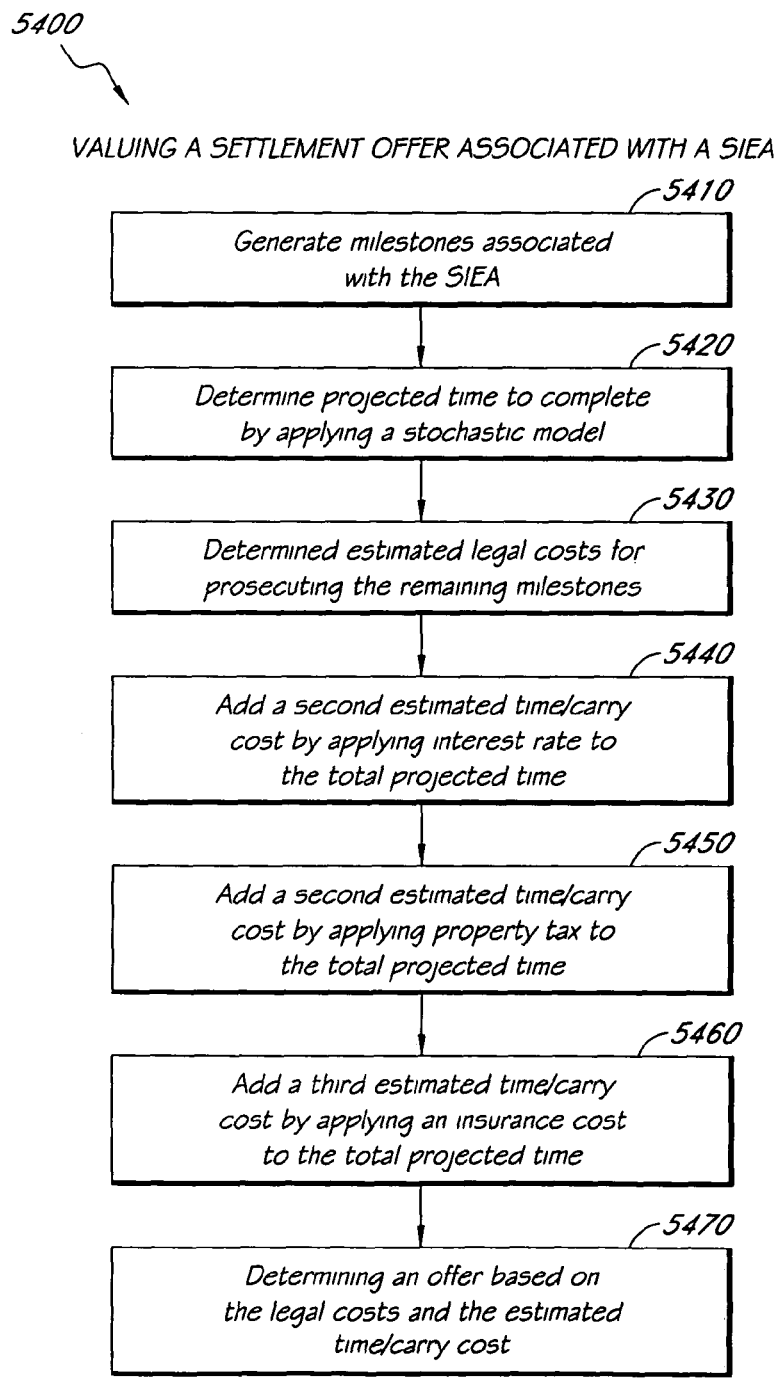
FIG. 54 shows a method associated with valuing a settlement offer in connection with a security interest enforcement action.

FIG. 54 illustrates a method 5400 for one embodiment for assessing the settlement value of a SIEA litigation. The method 5400 applies generally, and may be used at any point before or during prosecution of a SIEA, and may be applied to multiple SIEA's in parallel and/or in series. In a first settlement valuation step 5410, the remaining milestones are generated for completing the SIEA at issue. In a second settlement valuation step 5420, a projected time is determined for completion of the milestones by applying a stochastic model. In the preferred embodiment, the stochastic model discussed at length above is used. The method of FIG. 46 (discussed above) may be used to determine the projected durations for completing the one or more milestones and/or events within method 5400. That is, the method 5400 may include the first step 4610, in which fixed-frequency events are generated for the one or more milestone at issue. In the second step 4620, random-frequency events are generated for the one or more milestone at issue. In practice, the steps 4610, 4620 may be conducted in either order or in parallel to determine the duration for completion of the next milestone. In the third step 4630, the stochastic model is applied to the fixed-frequency and random-frequency events generated in the first and second steps 4610, 4620.

The method of FIG. 47 (discussed above) may also be used to determine the projected duration for completing the milestones within method 5400. That is, the determination of a projected duration preferably takes into account the type of SIEA being prosecuted (identified in first step 4810), the specific jurisdiction in which the SIEA is being prosecuted (identified in second step 4720), the specific court (identified in third step 4730), the specific judge (identified in fourth step 4740), and the time of year (identified in fifth step 4750). The determination of a projected duration also preferably takes into account historical data on past performance of the prosecution of SIEA's (retrieved in sixth step 4760). The determination of a projected duration also takes into account information on procedural requirements associated with prosecution of the SIEA in the specific jurisdiction (retrieved in seventh step 4770). The information retrieved in the first through seventh steps 4710-4770 is applied to the fixed-frequency and random-frequency events of the milestone at issue using the stochastic model described at length above.

Referring to FIG. 54, in a third settlement valuation step 5430, the legal costs are estimated for completing the remaining milestones. This may include fees associated with attorney time (hourly or flat fee) and costs (e.g., court costs, filing costs, etc.).

In a fourth settlement valuation step 5440, a first estimated time/carry cost is determined by applying an interest rate to the projected time determined in the second settlement valuation step 5420. The interest rate may be based on standard rates (e.g. the prime lending rate), on the borrower's credit score, and/or on any other risk assessment associated with the loan at issue. This first estimated time/carry cost is added to the estimated legal costs determined in the third settlement valuation step 5430.

In a preferred embodiment, the method 5400 further includes a fifth settlement valuation step 5450, wherein a second estimated time/carry cost is determined by applying a property tax rate to the projected time determined in the second settlement valuation step 5420. The property tax rate is determined from the requirements of the jurisdiction associated with the real estate at issue. This second estimated time/carry cost is added to the estimated legal cost and the first estimated time/carry cost determined in the third and fourth settlement valuation steps 5430, 5440.

In a preferred embodiment, the method 5400 further includes a sixth settlement valuation step 5460, wherein a third estimated time/carry cost is determined by applying an insurance rate to the projected time determined in the second settlement valuation step 5420. The insurance rate is determined by the insurance policy(ies) associated with the real estate at issue. This third estimated time/carry cost is added to the estimated legal cost and the first and second estimated time/carry costs determined in the third, fourth, and fifth settlement valuation steps 5430, 5440, 5450.

The method 5400 further includes a seventh settlement valuation step 5470, wherein a settlement value is determined from the costs summed from the previous settlement valuation steps 5430, 5440, 5450, 5460. Typically, the settlement value of the case will be above the cost of litigation for the SIEA (as determined from the previous settlement valuation steps) and below the resale value of the real estate.

Although this invention has been described in terms of certain preferred embodiments, other embodiments that are apparent to those of ordinary skill in the art are also within the scope of this invention. In addition, methods, processes, and functions described herein are not limited to any particular sequence, and the acts or blocks relating thereto can be performed in other sequences that are appropriate. For example, described acts or blocks may be performed in an order other than that specifically disclosed, or multiple acts or blocks may be combined in a single act or state. Accordingly, the scope of the present invention is intended to be defined only by reference to the appended claims.

What is claimed is:

1. A method for determining a monetary value for a loan secured by real estate associated with an actual or potential security interest enforcement action, the method comprising:
storing in a computer-readable medium a plurality of milestones associated with completion of the security interest enforcement action in a specified jurisdiction for the real estate securing the loan;
determining, using one or more computer processors in communication with the computer-readable medium, from said plurality of milestones a total time projected for completing the security interest enforcement action by applying a stochastic model that accounts for the occurrence of one or more fixed-frequency events and one or more random-frequency events associated with completion of said plurality of milestones;
determining estimated legal costs associated with prosecuting said plurality of milestones; and
determining a monetary value for the loan, using said one or more computer processors, comprising adding to said estimated legal costs a first estimated time/carry cost determined by applying an appropriate interest rate to said total time projected for completing the potential security interest enforcement action.

2. The method of claim 1, wherein determining the monetary value for the loan further comprises adding a second estimated time/carry cost associated with property tax costs during said total time projected for completing the security interest enforcement action.

3. The method of claim 2, wherein determining the monetary value for the loan further comprises adding a third estimated time/carry cost associated with insurance costs during said total time projected for completing the security interest enforcement action.

4. The method of claim 1, wherein applying a stochastic model that accounts for the occurrence of one or more fixed-frequency events and one or more random-frequency events associated with said plurality of milestones comprises:

generating one or more fixed-frequency events associated with completing said one or more milestones, said fixed-frequency events having associated projected durations for completion;

generating one or more random-frequency events associated with completing said one or more milestones, said random-frequency events having associated projected durations for completion; and applying a stochastic model to said generated fixed-frequency and random-frequency events to determine a total time for completing the security interest enforcement action.

5. The method of claim 4, wherein applying a stochastic model to said generated fixed-frequency and random-frequency events comprises:

summing the projected durations associated with said one or more fixed frequency events; and summing, for said random-frequency events, the projected duration associated with said random-frequency event multiplied by a weighting factor associated with said random-frequency event.

6. The method of claim 5, wherein said weighting factor comprises a measure of the likelihood of occurrence of said random-frequency event.

7. The method of claim 5, wherein the potential security interest enforcement action is an action to enforce a lien secured by real property, an action to take possession of real property, or a bankruptcy action.

8. The method of claim 4, wherein applying a stochastic model to said generated fixed-frequency and random-frequency events comprises applying the mathematical formula:

$$T = \sum_i \left( \sum_k (\hat{\beta}_k Z_i^k) \right), \forall\, i, k,$$

wherein

T is the time associated with completion of the security interest enforcement action;

i is an index over said one or more milestones associated with the security interest enforcement action;

k is an index over said one or more fixed-frequency and random-frequency events;

$\hat{\beta}_k$ is a duration associated with event k;

for events k that are fixed-frequency events, $Z_i^k$ equals 1; and for events k that are random-frequency events, $Z_i^k$ is a measure of the frequency of occurrence of event k, such that $0 \le Z_i^k \le 1$.

9. The method of claim 4, wherein applying a stochastic model to said generated fixed-frequency and random-frequency events comprises applying the mathematical formula:

$$T = \sum_i \left( \sum_k (\hat{\beta}_k Z_i^k + \varepsilon_{ik}) \right), \forall\, i, k,$$

wherein

T is the time associated with completion of the security interest enforcement action;

i is an index over said one or more milestones associated with the security interest enforcement action;

k is an index over said one or more fixed-frequency and random-frequency events;

$\hat{\beta}_k$ is a duration associated with event k;

for events k that are fixed-frequency events, $Z_i^k$ equals 1;

for events k that are random-frequency events, $Z_i^k$ is a measure of the frequency of occurrence of event k within milestone i, such that $0 \le Z_i^k \le 1$; and $\varepsilon_{ik}$ is a measure of duration uncertainty associated with event k of milestone i.

10. The method of claim 1, wherein said interest rate takes into account a credit score of a borrower associated with the loan.

11. The method of claim 4, wherein one or more of said projected durations depend on the specified jurisdiction.

12. The method of claim 4, wherein the security interest enforcement action is being prosecuted within a specified court, and one or more of said projected durations depends on the specified court, a specified judge of the court, or both.

13. The method of claim 4, wherein one or more of said projected durations takes into account the time of year that said events take place.

14. A method for determining a monetary value for an offer to settle a security interest enforcement action in a specified jurisdiction, the method comprising:

storing in a computer-readable medium a plurality of milestones associated with completion of the security interest enforcement action;

determining, using one or more computer processors in communication with the computer-readable medium, from said plurality of milestones a total time projected for completing the security interest enforcement action by applying a stochastic model that accounts for the occurrence of one or more fixed-frequency events and one or more random-frequency events associated with completion of said plurality of milestones;

determining, using said one or more computer processors, estimated legal costs associated with completing prosecution of said plurality of milestones;

adding to said estimated legal costs, using said one or more computer processors, a first estimated time/carry cost determined by applying an appropriate interest rate to said total time projected for completing the security interest enforcement action; and determining, using said one or more computer processors, an offer based on said estimated legal costs and said first estimated time/carry cost.

15. The method of claim 14, further comprising:

adding, using said one or more computer processors, a second estimated time/carry cost associated with property tax costs during said total time projected for completing the security interest enforcement action; and determining, using said one or more computer processors, said offer based in part on said second estimated time/carry cost.

16. The method of claim 15, further comprising:

adding, using said one or more computer processors, a third estimated time/carry cost associated with property insurance costs during said total time projected for completing the security interest enforcement action; and determining, using said one or more computer processors, said offer based in part on said third estimated time/carry cost.

17. The method of claim 14, wherein applying a stochastic model that accounts for the occurrence of one or more fixed-frequency events and one or more random-frequency events associated with said plurality of milestones comprises:

generating one or more fixed-frequency events associated with completing said one or more milestones, said fixed-frequency events having associated projected durations for completion;

generating one or more random-frequency events associated with completing said one or more milestones, said random-frequency events having associated projected durations for completion; and applying a stochastic model to said generated fixed-frequency and random-frequency events to determine a total time for completing the security interest enforcement action.

18. The method of claim 17, wherein one or more of said projected durations depend on the specified jurisdiction.

19. The method of claim 17, wherein the security interest enforcement action is being prosecuted within a specified court, and one or more of said projected durations depends on the specified court, a specified judge of the court, or both.

20. The method of claim 17, wherein one or more of said projected durations takes into account the time of year that said events take place.

\* \* \* \* \*